(12) United States Patent
Simons

(10) Patent No.: US 9,718,160 B2
(45) Date of Patent: Aug. 1, 2017

(54) AUTOMATED LOADING OF WORK PIECES VIA STAGING REGIONS INTO ADVERSE ENVIRONMENTS ASSOCIATED WITH HORIZONTAL MILLING MACHINES AND CONTROLLERS AND METHODS FOR SAME

(71) Applicant: Stephen Simons, Los Altos, CA (US)

(72) Inventor: Stephen Simons, Los Altos, CA (US)

(73) Assignee: Simons Design Innovation, LLC, Los Altos, CA (US)

(*) Notice: Subject to any disclaimer, the term of this patent is extended or adjusted under 35 U.S.C. 154(b) by 0 days.

(21) Appl. No.: 14/998,692

(22) Filed: Feb. 2, 2016

(65) Prior Publication Data

US 2017/0100808 A1     Apr. 13, 2017

Related U.S. Application Data

(60) Continuation of application No. 14/595,162, filed on Jan. 12, 2015, now Pat. No. 9,248,538, which is a
(Continued)

(51) Int. Cl.
*B23Q 11/00* (2006.01)
*B23Q 7/06* (2006.01)

(52) U.S. Cl.
CPC .............. *B23Q 7/06* (2013.01); *B23Q 11/005* (2013.01); *B23Q 11/0057* (2013.01)

(58) Field of Classification Search
CPC ................................ B23Q 7/06; B23Q 11/005
See application file for complete search history.

(56) References Cited

U.S. PATENT DOCUMENTS 1,958,793 A     5/1934   Lee
2,251,948 A *   8/1941   Oberhoffken ............ B23Q 7/14
                                                   29/38 C
(Continued)

FOREIGN PATENT DOCUMENTS

DE          9110427 U1    10/1991
DE         10204327 A1     8/2003
(Continued)

OTHER PUBLICATIONS

"Darton ProfitCell: 5-azis CNC machining and automatic tool charger," Datron AG, Accessed Sep. 21, 2011, http://www.datron.de/en/products/machine-tools/milling-machines/profitcell-milling-automation.html.
(Continued)

*Primary Examiner* — Thomas Randazzo
(74) *Attorney, Agent, or Firm* — Kokka & Backus, PC

(57) ABSTRACT

Embodiments relate generally to milling machines and milling techniques, and more particularly, to apparatuses, milling machines and methods to control automatic loading and/or unloading of work pieces in relation to the adverse milling machine environments. In one embodiment, an apparatus includes a subset of guide members constituting a staging region, a loader member configured to impart a loading force unto the work piece to transition the work piece from the staging region, and an effector coupled to the loader member. The effector is configured to apply a cleaning force to a path in a first interval of time and is configured further to transfer the loading force from the loader member to the work piece in a second interval of time, and an alignment device configured to align the subset of guide members and the effector to form a portion of the path in a first mode.

19 Claims, 48 Drawing Sheets

Related U.S. Application Data division of application No. 13/234,123, filed on Sep. 15, 2011, now Pat. No. 8,931,622.

(60) Provisional application No. 61/383,303, filed on Sep. 15, 2010.

(56) References Cited

U.S. PATENT DOCUMENTS

| | | | |
|---|---|---|---|
| 2,434,750 A | | 1/1948 | Trecker et al. |
| 3,355,799 A | * | 12/1967 | Daugherty ............ B23Q 13/00 33/1 L |
| 3,485,138 A | | 12/1969 | Staehle |
| 3,602,090 A | | 8/1971 | Whetham |
| 4,355,938 A | | 10/1982 | Page |
| 4,477,754 A | | 10/1984 | Roch et al. |
| 4,947,538 A | * | 8/1990 | McMurtry ......... B23Q 3/15706 483/14 |
| 5,318,396 A | | 6/1994 | Babel et al. |
| 5,615,984 A | | 4/1997 | Oberbreckling |
| 5,730,195 A | * | 3/1998 | Riesmeier ............ B23Q 3/002 144/114.1 |
| 6,189,424 B1 | * | 2/2001 | Wheeling ............... B23B 13/02 82/1.11 |
| 6,193,048 B1 | | 2/2001 | Keith |
| 6,638,362 B2 | | 10/2003 | Dobner et al. |
| 6,638,363 B2 | | 10/2003 | Erdmann |
| 7,419,460 B2 | | 9/2008 | Bonfert et al. |
| 8,931,622 B2 | | 1/2015 | Simons |
| 9,248,538 B2 | * | 2/2016 | Simons .................... B23Q 7/06 |
| 9,278,415 B1 | | 3/2016 | Simons |
| 9,278,416 B2 | * | 3/2016 | Simons .................... B23Q 7/06 |
| 2003/0172510 A1 | | 9/2003 | Geiger et al. |
| 2004/0182680 A1 | | 9/2004 | Stave |
| 2005/0005419 A1 | * | 1/2005 | Lutz ........................ B23Q 7/00 29/563 |
| 2007/0179033 A1 | * | 8/2007 | Bonfert .................... B23Q 7/04 483/14 |
| 2008/0234855 A1 | | 9/2008 | Haas et al. |
| 2008/0243299 A1 | | 10/2008 | Johnson et al. |
| 2009/0165621 A1 | | 7/2009 | Tzschentke et al. |
| 2009/0248194 A1 | | 10/2009 | Lammering et al. |
| 2010/0293739 A1 | | 11/2010 | Imaura et al. |

FOREIGN PATENT DOCUMENTS

| | | |
|---|---|---|
| EP | 0286546 A1 | 10/1988 |
| EP | 0865866 A2 | 9/1998 |
| EP | 2616203 A1 | 7/2013 |
| EP | 2616924 A1 | 7/2013 |
| JP | 63089249 | 4/1988 |
| JP | 2013-529349 A | 10/2013 |
| JP | 5982378 B | 8/2016 |
| KR | 10-2013-7009481 | 4/2013 |
| KR | 10-2013-7009507 | 4/2013 |
| TW | M377280 | 4/2010 |
| TW | 201221290 | 6/2012 |
| TW | 2012221291 | 6/2012 |
| WO | 2012037415 A1 | 3/2012 |
| WO | 2012037418 A1 | 3/2012 |

OTHER PUBLICATIONS

Datron Image, Datron AG, Accessed Sep. 21, 2011, http://www.datron.de/index.php?eID=tx_cms_showpic&file=uploads%2Fpics%2FCNC_Profitcell_popup_03.jpg&md5=88c7ac1d6ba23bb0cc16b48e 44be90b704bc7437¶meters[0]=YTo0Ontz0jU6IndpZHRoljtzOjQ6IjgwMG0iO3M6NjoiaGVpZ2h0IjtzOjQ6IjY
w¶meters[1]=MG0iO3M6NzoiYm9keVRhZyI7czoyMjoiPGJvZHkgYmdjb2xvcj0id2hpdGUiPil7¶meters[2]=czo0OiJ3cmFwIjtzOjM3OiI8YSBocmVmPSJqYXZhZ2NyNyaXB0OmNsb3NlKCl7Ij4g¶meters[3]=fCA8L2E%2Bljt9.
Midaco Corporation, "Y-Axis Automatic Pallet Systems: Affordable State of the Art Technology.", Accessed Sep. 28, 2011; http://www.midaco-corp.com/pdfs/Y-Axis%204%20pg%20PDF.pdf.
Toellner Systems, Inc. "Automated Loading Solutions: Turning, Milling, Grinding, Roll Threading, Assembly & More." Sep. 28, 2011, http://www.romheld.com.au/updf/toellner%20brochure_pdf_231.pdf.
Midaco Corporation, "Robotic Part Loading/Unloading System: Featuring FANUC Robotics LR Mate 200iC/5L." Accessed Sep. 28, 2011, http://www.midaco-corp.com/pdfs/Robot%20FANUC%20PDF%20email%20&%20web.pdf.
Copenheaver, Blaine R.; Notification of Transmittal of the International Search Report and the Written Opinion of the International Searching Authority, or the Declaration; Written Opinion of the International Searching Authority, International Application No. PCT/US2011/051853, Mailed Feb. 8, 2012.
Young, Lee W.; Notification of Transmittal of the International Search Report and the Written Opinion of the International Searching Authority, or the Declaration; Written Opinion of the International Searching Authority, International Application No. PCT/US2011/051849, Mailed Feb. 14, 2012.
Snyder, Alan W., Office Action for U.S. Appl. No. 13/233,004 mailed Sep. 9, 2014.
Randazzo, Thomas, Office Action for U.S. Appl. No. 13/234,123 mailed Sep. 16, 2013.
Randazzo, Thomas, Office Action for U.S. Appl. No. 13/234,123 mailed Apr. 8, 2014.
Randazzo, Thomas, Notice of Allowance for U.S. Appl. No. 13/234,123 mailed Sep. 8, 2014.
DE10204327A1, Machine Translation.
Snyder, Alan, Office Action for U.S. Appl. No. 13/234,115 mailed Aug. 15, 2014.
Snyder, Alan, Office Action for U.S. Appl. No. 13/233,004 mailed May 1, 2015.
Snyder, Alan, Notice of Allowance for U.S. Appl. No. 13/233,004 mailed Oct. 27, 2015.
Snyder, Alan, Office action for U.S. Appl. No. 13/234,115 mailed May 1, 2015.
Snyder, Alan, Notice of Allowance for U.S. Appl. No. 13/234,115 mailed Oct. 27, 2015.
Randazzo, Thomas, Office Action for U.S. Appl. No. 13/234,123 mailed Apr. 30, 2013.
Randazzo, Thomas, Notice of Allowance for U.S. Appl. No. 14/595,162 mailed Sep. 18, 2015.
Lasa Goni, Andoni, European Patent Office, Supplementary Search Report for European Patent Application No. EP 11825985 mailed May 22, 2014.
Lasa Goni, Andoni, European Patent Office, Supplementary Search Report for European Patent Application No. EP 11825988 mailed May 20, 2014.
Taiwan Intellectual Property Office, Search Report for ROC (Taiwan) Patent Application No. 100133265 (Translation) mailed Apr. 7, 2016.

* cited by examiner

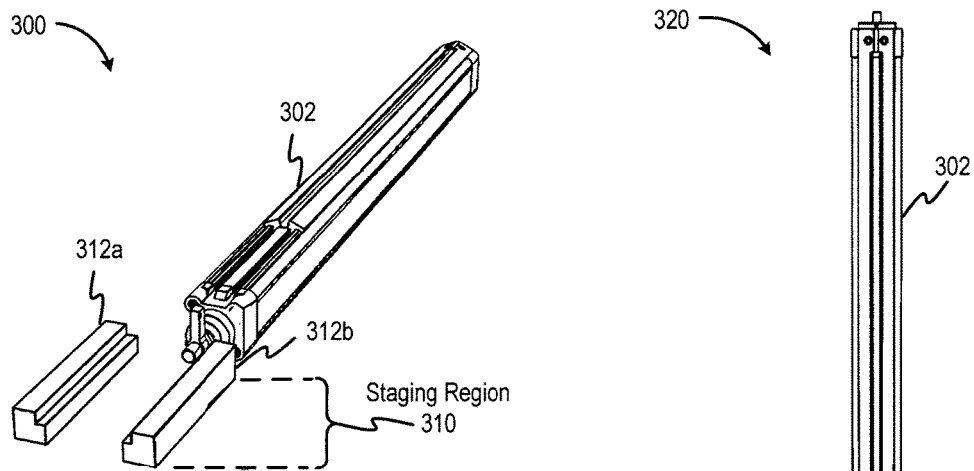
FIG. 3A
FIG. 3B
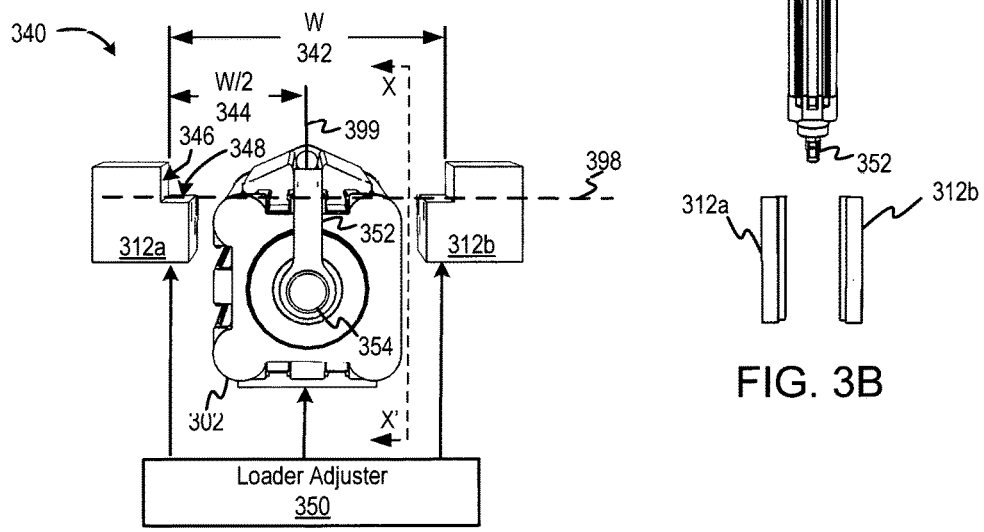
FIG. 3C
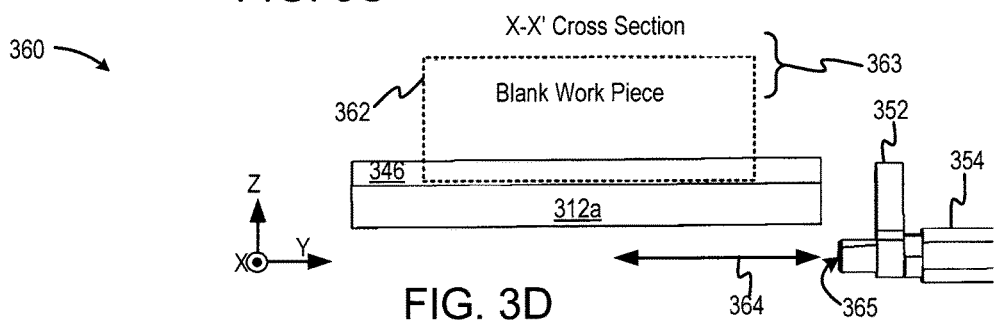
FIG. 3D

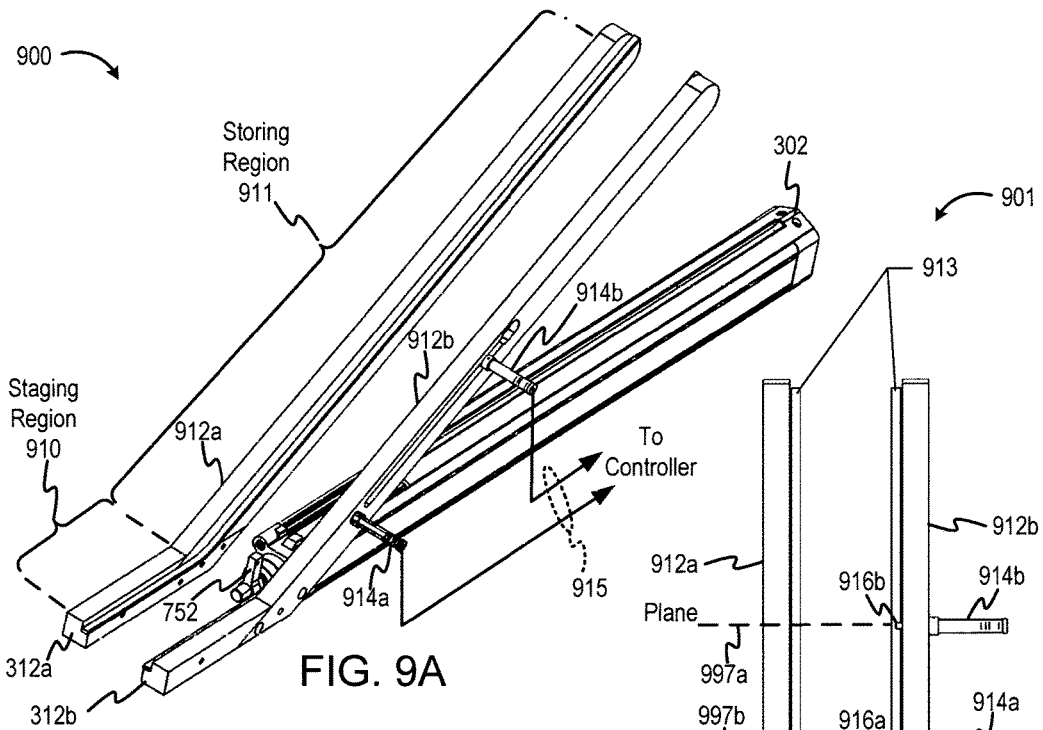
FIG. 9A
FIG. 9B
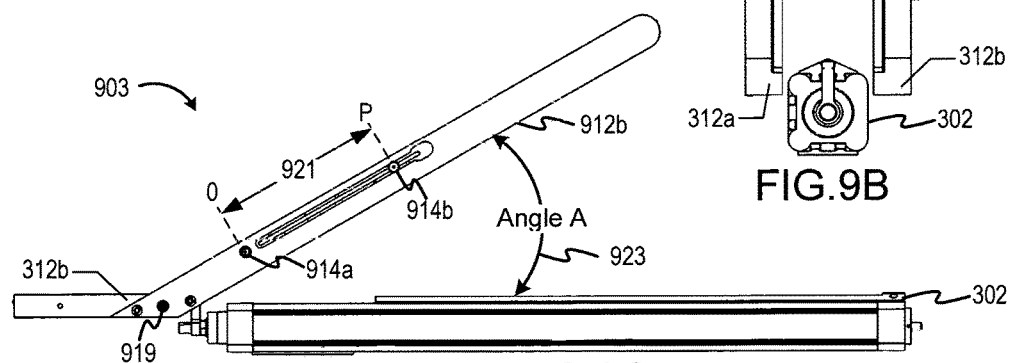
FIG. 9C
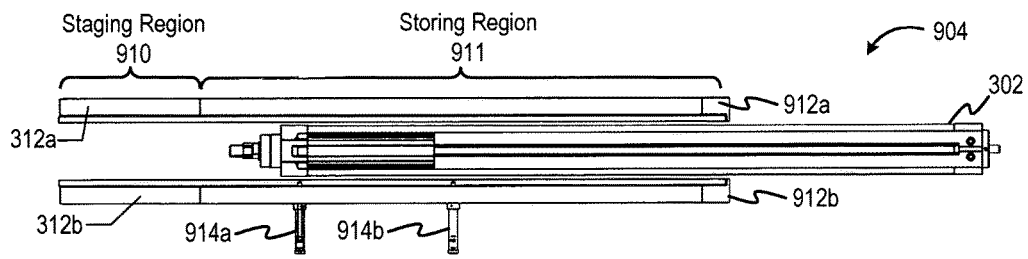
FIG. 9D

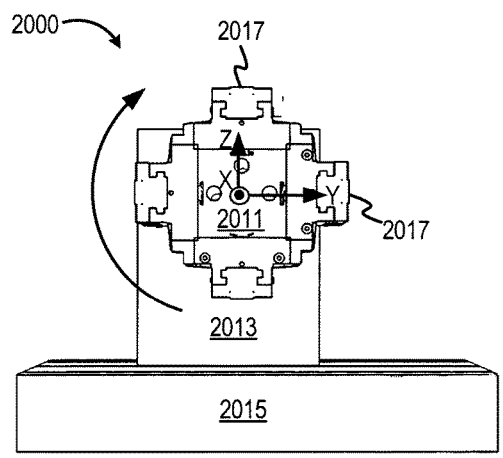
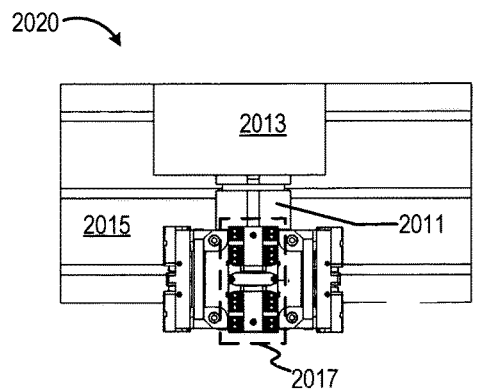
FIG. 20A    FIG. 20B
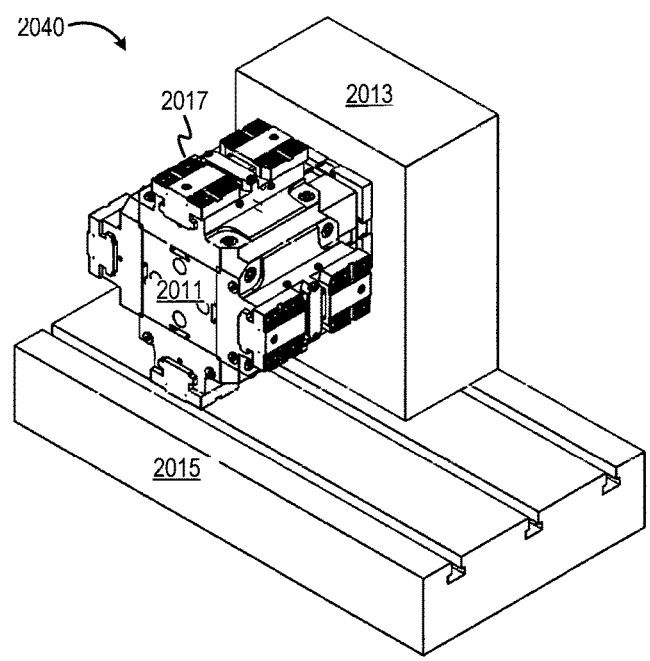
FIG. 20C

X-X' Cross Section

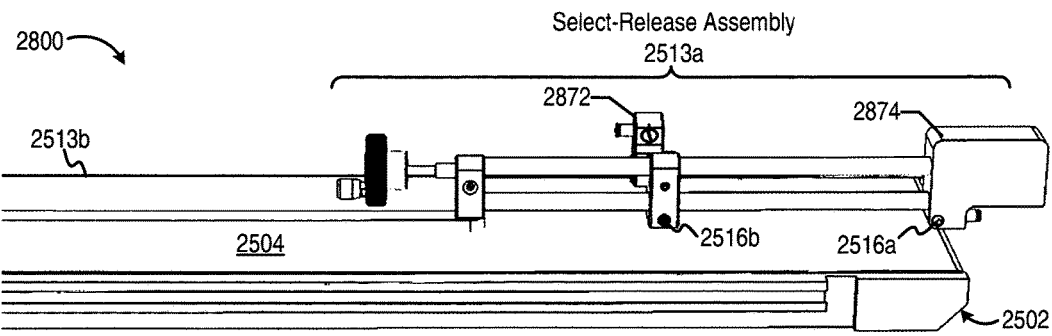
FIG. 28A
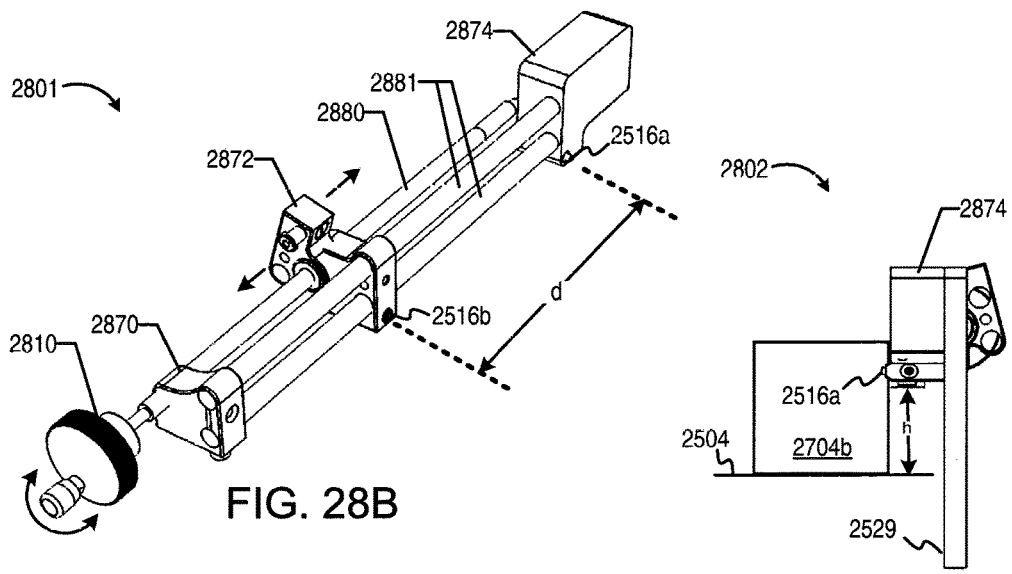
FIG. 28B
FIG. 28C
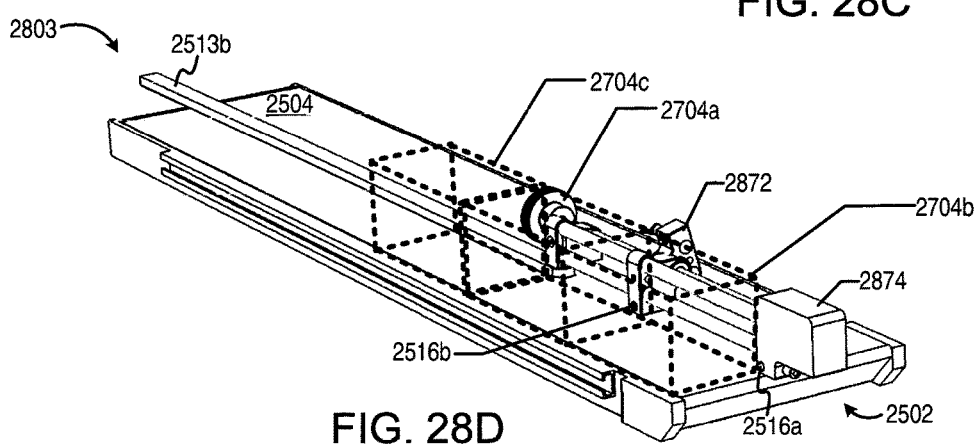
FIG. 28D

AUTOMATED LOADING OF WORK PIECES VIA STAGING REGIONS INTO ADVERSE ENVIRONMENTS ASSOCIATED WITH HORIZONTAL MILLING MACHINES AND CONTROLLERS AND METHODS FOR SAME

CROSS-REFERENCE TO RELATED APPLICATIONS

This U.S. Nonprovisional Patent Application is a continuation of copending U.S. Nonprovisional patent application Ser. No. 14/595,162, filed Jan. 12, 2015, which is a divisional of U.S. patent application Ser. No. 13/234,123, filed Sep. 15, 2011, now U.S. Pat. No. 8,931,622, which claims the benefit of U.S. Provisional Application No. 61/383,303, filed Sep. 15, 2010 and titled "Automated Loading of Work Pieces into Adverse Environments Associated with Milling Machines," all of which are incorporated herein by reference for all purposes.

FIELD

Embodiments relate generally to milling machines and milling techniques, and more particularly, to devices, integrated circuits, computer readable media, apparatuses, milling machines and methods to automatically load and/or unload work pieces in relation to the adverse milling machine environments.

BACKGROUND

Computerized milling machines execute software instructions to control the operation of powered mechanical devices, such as electrical motors, and the operation of milling tools to fabricate parts by selectively machining or removing material from a blank work piece. Computerized milling machines typically include a spindle that serves as a rotating axis of the milling machine, the spindle generally being oriented either horizontally or vertically. While computer technology has facilitated certain milling operations, some milling operations rely on human intervention. For example, work pieces may be loaded and unloaded manually in some conventional milling operations.

Some conventional approaches to computerized milling machines sought to reduce human intervention in the milling process. While functional, these conventional approaches suffer a variety of drawbacks. In one approach, robots have been introduced into in the milling process. Some of the milling-specific robots typically are relatively expensive, thereby limiting the use of robots to specific applications. Further, programming and maintenance of such robots require specialized knowledge. In other approaches, milling machines have been adapted to use proprietary loading techniques and structures that are limited to the particular machine for which they were designed. Such proprietary loading techniques usually are inapplicable for use with other milling machines. In some other approaches, groups of work pieces can be introduced partially in an automatic manner into a milling machine. But in these approaches, manual intervention is usually required to clamp the groups of work pieces into groups prior to the groups being automatically introduced. Manual intervention also is normally required to unload the groups of work pieces. There are also some traditional approaches to automation that are generally are not well-suited to address the effects of adverse environments. Adverse environments associated with milling machines typically include water, cutting fluids, oils, metal chips, and other material that otherwise might disrupt the milling processes.

It is desirable to provide devices, integrated circuits, computer readable media, apparatuses, milling machines and methods to minimize one or more of the drawbacks associated with conventional milling machines and techniques to, for example, facilitate the loading and unloading of work pieces in adverse milling machine environments.

BRIEF DESCRIPTION OF THE FIGURES

The invention and its various embodiments are more fully appreciated in connection with the following detailed description taken in conjunction with the accompanying drawings, in which:

FIGS. 3A to 3D depict various examples of structures configured to perform automated loading operations, according to some embodiments;

FIGS. 9A to 9J are diagrams illustrating various examples of automated loading of work pieces from a storage region, according to various embodiments;

FIGS. 20A to 20C depict milling surfaces for used with a loader, according to various embodiments;

FIGS. 28A to 28D are diagrams illustrating various views of an example of a select-release assembly, according to some embodiments;

Like reference numerals refer to corresponding parts throughout the several views of the drawings. Note that most of the reference numerals include one or two left-most digits that generally identify the figure that first introduces that reference number.

DETAILED DESCRIPTION

Various embodiments or examples of the invention can be implemented in numerous ways, including as a system, a process, an apparatus, or a series of program instructions on a computer readable medium such as a computer readable storage medium or a computer network where the program instructions are sent over optical, electronic, wireless, or other communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the examples has not been described in detail to avoid unnecessarily obscuring the description.

Figure 1A:
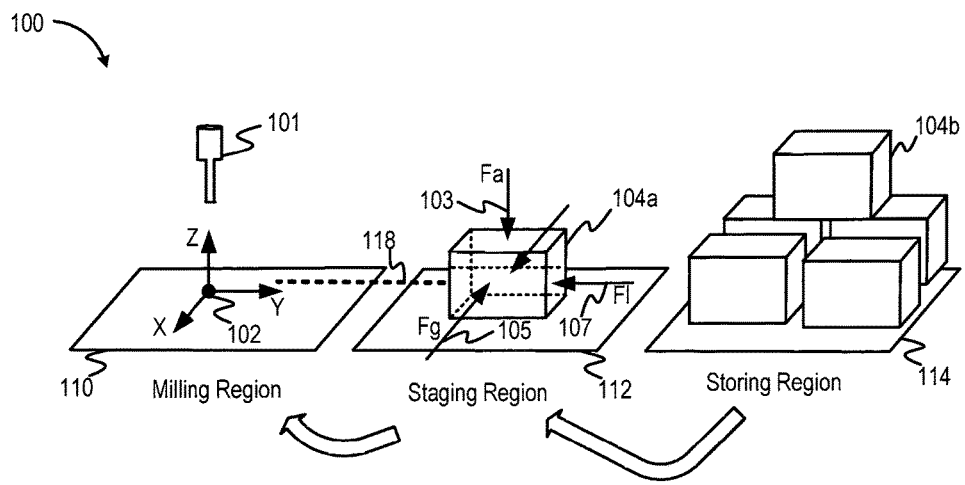
FIG. 1A is a diagram depicting an example of automated loading of a work piece, according to at least some embodiments.

FIG. 1A is a diagram 100 depicting an example of automated loading of a work piece, according to at least some embodiments. In one example, a loader is configured to select a work piece 104a from a group of work pieces 104b stored in a storing region 114 for transport to a milling region 110. A milling tool 101 is configured to perform machining operations on work pieces at a milling site 102 in milling region 110. According to some examples, a milling site 102 can be associated with one or more points accessible by tool 101 for machining work pieces. Milling region 110 can be associated with positions in a milling machine accessible by a milling table, which can be any surface or platform configurable to move relative to milling tool 101. A loader can include a staging region 112 at which a selected work piece can be transported in preparation for loading to a destination in milling region 110, according to one embodiment. Staging region 112 can serve as an intermediate location to prepare the loader and/or work piece 104a for transferring into milling region 110. According to one embodiment, the loader is configured to engage work piece 104a at staging region 112 and apply a loading force ("Fl") 107 to urge work piece 104a, for example, on path 118 into milling region 110. Further, one or more guiding force(s) 105 can be applied to work piece 104a to guide work piece 104a along path 118 during its travel. In some embodiments, one or more guiding force(s) 105 can be applied by one or more guide members (not shown). The guide members that provide the one or more guiding force(s) 105 can be associated with or located in either milling region 110 or staging region 112, or both. In at least one embodiment, path 118 resides in a common plane (e.g., an X-Y plane). In cases where path 118 lies in a plane perpendicular to (or substantially perpendicular) to the directions of gravity, gravity can provide for the application of an applied force ("Fa") 103. In these cases, tool 101 is generally associated with a vertical milling machine. By contrast, when path 118 is disposed in a plane parallel to (or substantially parallel) to the direction of gravity, a restraining member (not shown) can be configured to provide for the application of an applied force ("Fa") 103. Applied force 103 enables work piece 104a to contact the guide members to maintain the application of one or more guiding force(s) ("Fg")105, according to some examples. In these cases, tool 101 is generally associated with a horizontal milling machine. While staging region 112 can serve as an intermediate location, staging region can be disposed or otherwise associated with structures and/or functions of milling region 110 or storing region 114. Thus, milling regions 110 and staging regions 112 can be associated with the same or different structures, according to some embodiments. Or, staging regions 112 and storing regions 114 can be associated with the same or different structures. Note that while FIG. 1A depicts linear translation of work piece 104a from staging region 112 to milling region 110, the various embodiments are not limited to linear displacement within a plane. As such, path 118 over which work piece 104a traverses can be any path or number of path segments that traverses or includes motion in two or three dimensions (e.g., work piece 104a can traverse over a path that includes a displacement in the Z-axis), or the like.

Figure 1B:
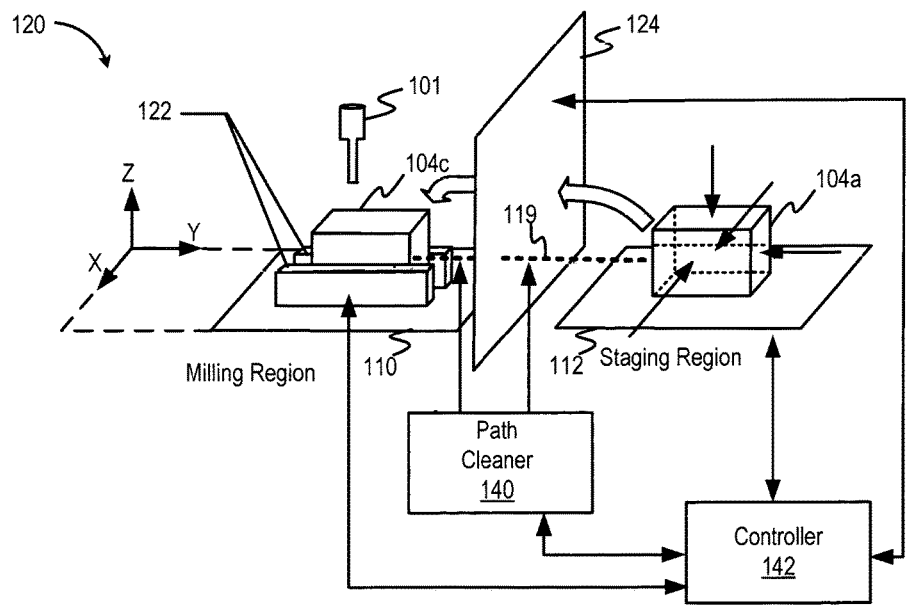
FIG. 1B is a diagram depicting another example of automated loading of a work piece, according to at least some embodiments.

FIG. 1B is a diagram 120 depicting another example of automated loading of a work piece, according to at least some embodiments. As shown, a loader is configured to transfer work piece 104a via path 119 to milling region 110. A work piece 104c in milling region 110 is clamped in a stationary position during a milling operation in which tool 101 contacts work piece 104c. In the example shown, clamping members 122 can be used to clamp work piece 104c. In some embodiments, clamping members 122 can be configured as guide members, or can be configured to include guide members to guide work pieces into clamping members 122, if the destination, or to guide work pieces through to other clamping members (not shown) to provide for multiple work piece milling operations in milling region 110. According to some embodiments, clamping members 122 are configured to clamp or otherwise engage one or more portions of work pieces to impart gripping force(s) to immobilize the work pieces during, for example, milling operations. Clamping members 122 can be configured grip a work piece on any one or more sides (e.g., lateral sides, top sides, etc.). The term "clamping member" can refer to a part of a clamping system including jaw assemblies, such as clamping jaws or vise jaws, configured to cooperate with or as a vise fixture. Clamping members can include moveable or stationary jaws, or a combination thereof (e.g., one moveable jaw and one stationary jaw).

Diagram 120 also depicts a controller 142 coupled to clamping members 122, to a path cleaner 140, and to a deflector shield 124, according to some embodiments. Deflector shield 124 and path cleaner 140 are configured to reduce or negate the effects of material generated by tool 101 when milling work piece 104c, whereby the material can include water, cutting fluids, oils, metal chips, or other material that otherwise might disrupt the milling processes. Path cleaner 140 can be configured to apply a cleaning force to or along path 119 to remove material on path 119. In some examples, path cleaner 140 can apply the cleaning force to portions of path 119 that include clamping members 122 to remove at least some or all of the material. Deflector shield 124 is configured to disrupt path 119 during milling operations. That is, deflector shield 124 can be oriented in a closed state to deflect material that might otherwise enter staging region 112 or a loader. When deflector shield 124 is oriented in an open state, path 119 is present over which the loader can transfer work pieces into milling region 110. For example, path 119 can be composed of a number of path segments arranged contiguously whereby deflector shield 124 does not obstruct the path segments between milling region 110 and either staging region 112 or storage region 114. A controller 142 is configured to control operations over various structures and to initiate various functions. For example, controller 142 can be configured to generate control signals to: (1.) activate path cleaner 140 to clean path 119 during a cleaning phase, (2.) activate the loader to transfer work piece 104a to milling region 110 during a loading phase, (3.) close deflector shield 124 during a milling operation, (4.) automatically activate clamping members 122 to clamp the work piece to perform milling-related operations and loading or unloading operations, and other like functions.

Figure 1C:
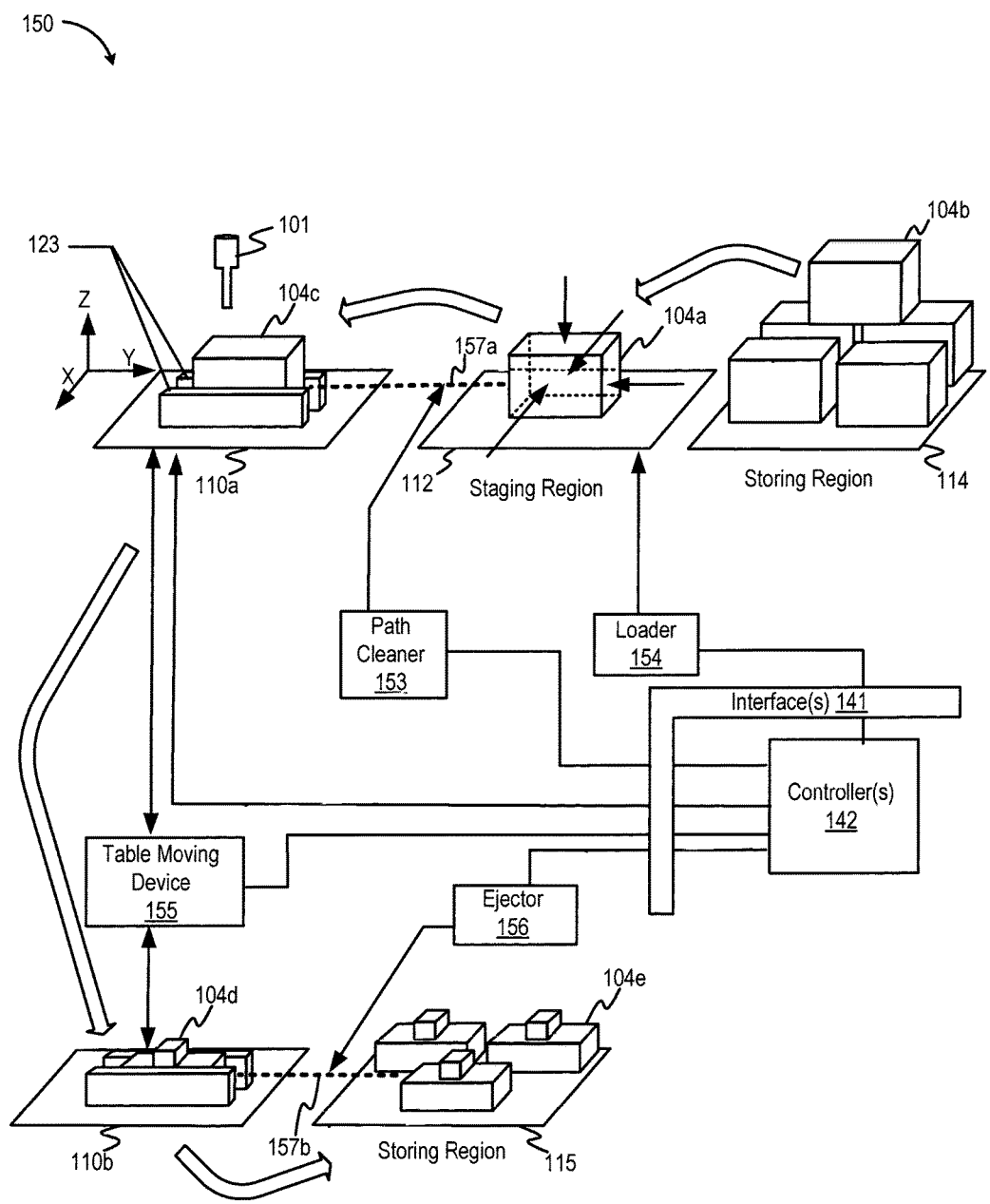
FIG. 1C is a diagram depicting an example of automated loading and automated unloading of a work piece, according to at least some embodiments.

FIG. 1C is a diagram 150 depicting an example of automated loading and automated unloading of a work piece, according to at least some embodiments. As shown, a loader 154, responsive to control signals from one or more controllers 142, is configured to transfer work piece 104a to staging region 112 from a storing region 114 that includes other work pieces 104b. Path cleaner 153, responsive to control signals from one or more controllers 142, is configured to apply a cleaning force to or along path 157a to remove material, debris, or otherwise prepare the path for loading work pieces. In this example, loader 154 also can be configured to transfer work piece 104a via guide members 123 to a destination on a table 110a in a milling region. In this example, the position of guide members 123 is the destination. Responsive to one or more controllers 142, guide members 123 can be configured to operate to apply pressure upon work piece 104c to clamp it in a stationary position during milling operations with tool 101. After milling is complete, one or more controllers 142 can transmit a control signal to table moving device 155 to move guide members 123 on table 110a to another position represented in FIG. 1C as table 110b. Table-moving device 155 can be any device, including devices used in milling operations, that can move work pieces 104c and 104d to two or more spatial positions for effecting loading, milling and unloading, among other things. As shown, table 110b includes a milled work piece 104d and is aligned with a path 157b extending from table 110b to a storing region 115. An ejector 156 is configured to extract milled work pieces 104d from guide members 123 for transport via path 157b to storage region 115, which includes other ejected work pieces 104e. In some embodiments, paths 157a and 157b can be parallel (or substantially parallel) to each other. According to some embodiments, the term "substantially parallel," as applied to paths 157a and 157b, can refer to any acute angle less than 90 degrees and can include 0 degrees referenced from one path to the other. Paths 157a and 157b can be arranged radially relative to, for example, a milling site 102, at any angle from 0 to 360 degrees. For example, when paths 157a and 157b are disposed 180 degrees from each other, the loading of work pieces occurs at a side opposite than the side used for ejecting the work pieces. Paths 157a and 157b can be disposed in a common plane, which may or may not include surfaces of guide members 123, according to at least some embodiments. According to alternate embodiments, paths 157a and 157b can extend non-linearly or can be disposed in three-dimensional space. One or more controllers 142 can be disposed in a common location or can be distributed over multiple locations. For example, a subset of the one or more controllers 142 can be disposed in or at a milling machine and another subset of the one or more controllers 142 can be disposed at a location including loader 154. One or more controllers 142 transmit control signal via one or more interfaces 141, subsets of which can be associated with a milling machine and loader 154. For example, a subset of interfaces 141 can facilitate transmission of control signals to table moving device 155 and to guide members 123, whereas another subset of interfaces 141 can facilitate transmission of control signals to path cleaner 153, loader 154, and ejector 156. Interfaces 141 can be software interfaces or hardware interfaces, or a combination thereof. In some examples, interfaces 141 can include connectors to connect, for example, electronic communication links to convey electrical signals. In at least one embodiment, interfaces 141 can include connectors to connect, for example, gas lines to convey pressurized gas as control signals. For example, one of controllers 142 can generate an electric signal to activate a valve (e.g., to either an open or close position, or a variable amount thereof), which, in turn may communicate a gas via one of interfaces 141 to activate a component or sub-component in a loader, unloader, milling machine, or any other device.

Figure 1D:
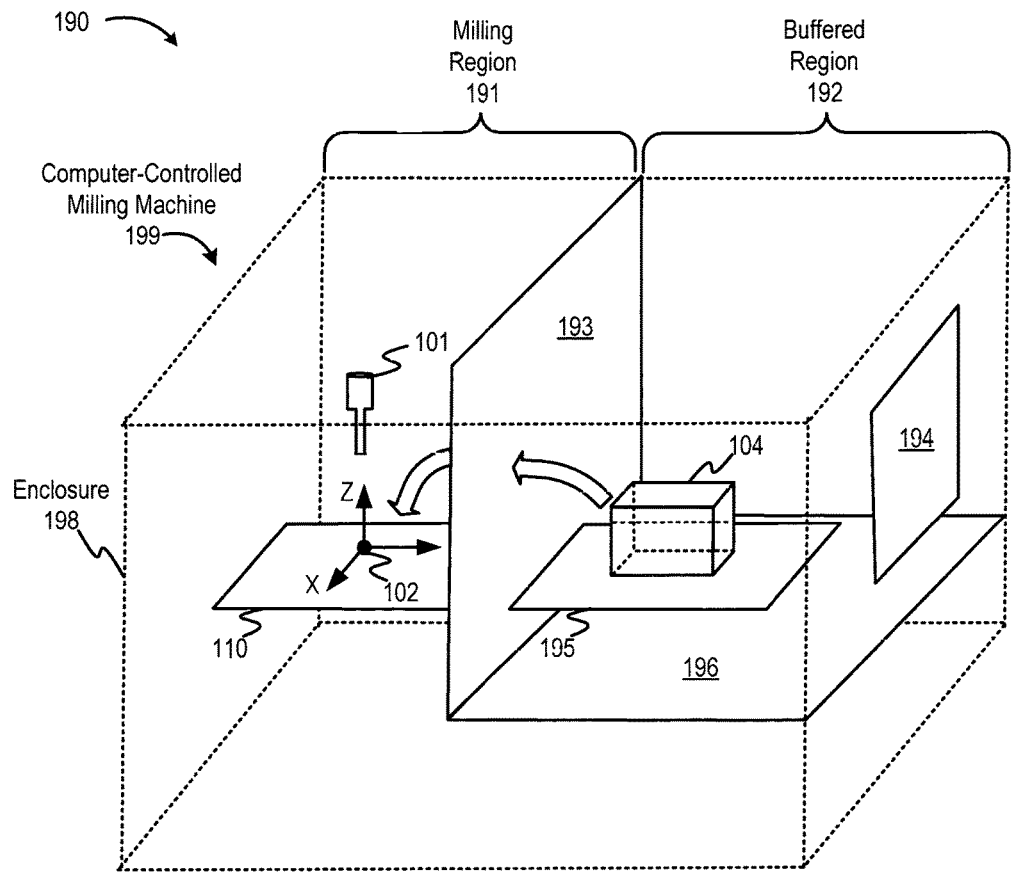
FIG. 1D is a diagram depicting an example of automated loading of a work piece from a buffered region, according to at least some embodiments.

FIG. 1D is a diagram 190 depicting an example of automated loading of a work piece from a buffered region, according to at least some embodiments. As shown, a computer-controlled milling machine 199 includes an enclosure 198 that is configured to contain material during milling operations within the interior of enclosure 198. Computer-controlled milling machine 199 includes a milling region 191 and a buffered region 192. Milling region 191 includes a tool 101 and a milling table 110, whereas buffered region 192 includes a work piece 104 disposed on a platform 195 that can represent, for example, a staging region. Buffered region 192 is formed by panels 193 and 196, or may include other barrier-like structures. Panel 193 can include a door for transferring work piece 104 to milling table 110. Buffered region 192 is configured to be antiseptic (or relatively clean) such that materials that might otherwise disrupt the automated loading and automated unloading operations. Thus, buffered region 192 is a clean environment and is substantially free from the material. A loader or an ejector, or both, can be disposed within buffered region 192. Or, the loader or ejector can be disposed partially within buffered region 192 with other portions of either the loader or ejector extending out through an access portal 194 formed in enclosure 198. In some embodiments, the loader or ejector can be disposed within buffered region 192, and buffered region 192 can be dispose partially within enclosure 198 or external thereto. As such, an automated loader and ejector (or portions thereof) can be integrated with computer-controlled milling machine 199, thereby preserving space that otherwise might be consumed external to enclosure 198.

In view of the foregoing, a loader and an ejector of the various embodiments, as well as the processes of using the same, can provide the structures and/or functionalities for automated loading into and unloading from an adverse environment. In some embodiments, a path cleaner can be used to reduce or eliminate materials disruptive to milling processes, such as water, cutting fluids, oils, metal chips, various liquids and solids, as well as other materials. Thus, the path cleaner can enhance the reliability of automated loading operations. In some embodiments, the loader can include the path cleaner, whereby the loader can have two modes of operation. In a cleaning mode of operation, the loader and path cleaner can apply a cleaning force to a path over which work pieces are loaded. In a loading mode of operation, the loader can displace work pieces to a milling region. The dual functionality can conserve resources that otherwise might be used to form a path cleaner separate from the loader. According to some embodiments, a deflector shield can be implemented to deflect the above-mentioned material from entering a space in which the loader and/or an ejector are disposed, thereby reducing opportunities of the material to disrupt operations of the loader and the ejector.

In some embodiments, the loader transfers work pieces into a milling region in a common plane with extraction of the work pieces by the ejector, thereby foregoing, at least in some cases, a third dimensional displacement (e.g., in the Z-axis in FIGS. 1A to 1D) between, for example, a staging region and the milling region (e.g., which can be coextensive with a milling table or more expansive than the milling table), and/or foregoing a third dimensional displacement between the milling region and a storage region into which ejected work pieces are transferred. In some embodiments, automated clamping of work pieces in the milling regions facilitates milling operations with multiple work pieces affixed to a milling table, thereby reducing cleaning operations and door activation operations that otherwise might accompany milling operations for a single work piece. In some embodiments, subsets of guide members can perform dual modes. In one mode, a pair of guide members can provide guiding forces for work pieces destined for other pairs of guide members during loading operations, whereas in another mode of operation the pair of guide members can operate as (or part of) a pair of clamping members during milling operations.

As discussed in FIG. 1D, a loader or an ejector, or both, can be disposed within a buffered region within an enclosure of a milling machine. Or, the loader or ejector can be disposed partially within the buffered region with other portions of either the loader or ejector extending out from the enclosure. Regardless, an automated loader and ejector can be integrated into or with a milling machine to conserve space that otherwise might be consumed external to the enclosure. In some embodiments, a storage region can be disposed at an angle to a plane including at least one pair of guide members. Thus, stored work pieces can be gravity fed (i.e., by sliding) to a staging region at which the loader engages work pieces for displacement. In some instances, gravity-fed work pieces can conserve energy that otherwise might be consumed by introducing a work piece to the staging region. In some embodiments, a loader implements self-centering device to adj ust the spatial positions of members in a storage region to approximate a dimension of stored work pieces, and to align either the loader or the path cleaner, or both, with a plane passing through a medial portion of a work piece at the staging region. By centering the path cleaner, equivalent cleaning forces can be generated and applied to guide members. By centering the loader, the loading force is applied approximately to the middle portion of a work piece, thereby reducing the application of loading forces offset from the center, which, in turn, might generate a force in a direction other than toward an intended destination. A loader can be used to interact with either vertical milling machines or horizontal milling machines with the use of, for example, a restraining member, according to some embodiments.

In various embodiments, the term "loader" can refer to one or more structures (e.g., a loader assembly) that interact cooperatively to engage a work piece and apply a locomotive force (e.g., a loading force) to influence movement from an initial location (e.g., a point at which the loader engages the work piece) to a point within a milling region (e.g., a point at which the loader disengages the work piece). A loader can include a loader member for imparting a loading force, and a loader actuator of generating a force to translate the loader member. In some embodiments, constituent components of a loader can be disposed external to a milling region, and may or may not include a controller. Constituent components of a loader (or a predominant amount of the components) can reside in a buffered region with or without an ejector, according to some examples. In some instances, a loader can include or otherwise be associated with a deflector shield or other barrier-like structures. The term "path cleaner" can refer to one or more structures, such as an effector (or a portion thereof), that operate to reduce or remove material along contacting surfaces in a path or over which work pieces travel during loading operations. A path cleaner, such as path cleaner 140 of FIG. 1B, can operate concurrently with a loader or a loader member. In some instances, a cleaning phase and a loading phase can be combined. According to alternate embodiments, a path cleaner can include a structure that operates independently from a loader or a loader member. As such, a cleaning phase and a loading phase can occur during separate intervals of time. A path cleaner can include structures that directly or indirectly apply a cleaning force to at least a portion of the path. For example, a path cleaner can emit cleaning elements, such as solids, liquids, or gas, or a combination thereof (e.g., under pressure) to apply the cleaning elements to the surfaces of the path. The cleaning elements are either less disruptive or not disruptive to the loading and unloading processes. Examples of cleaning elements include a pressurized gas, such as air. The path cleaner can also directly apply a cleaning force through mechanical cleaning elements, such as a brush, blade or the like.

The term "guide members" can refer to one or more structures that includes one or more contacting surfaces for guiding work pieces during engagement of either a loader or an ejector with a work piece. Contacting surfaces of guide members can be configured influence the direction of travel of a work piece. Or, the contacting surfaces of guide members can be configured to engage a work piece under relatively high pressure so as to immobilize the contacting work piece, such as during a milling operation. As such, guide members can have dual modes of operation. A guide member can operate, first, as a guiding structure, and second, a guide member can operate as a clamping member. In other embodiments, guide members can be configured to perform only a guiding function or only a clamping function, or can be configured to perform other functions beyond guiding and clamping. Note that in various embodiments, a guide member operating as a clamping member need not be limited to vises that apply mechanical pressures, but can use other mechanical, electro-mechanical, electro-magnetic or hydraulic structures to immobilize work pieces for milling. In various embodiments, the term "ejector" can refer to one or more structures (e.g., an ejector assembly) that interact cooperatively to engage a work piece and apply a locomotive force (e.g., a unloading force) to influence movement from a milling region (e.g., a point at which the ejector engages the work piece) to a point external to the milling region (e.g., a point at which the ejector disengages the work piece). In some embodiments, constituent components of an ejector are disposed external to a milling region, and may or may not include a controller. Constituent components of an ejector (or a predominant amount) can reside in a buffered region with or without a loader, according to some examples. In some instances, an ejector can include a deflector shield or other barrier-like structures. In some embodiments, an ejector and a loader can effect unloading and loading, respectively, in a common plane. In some embodiments, an ejector and a loader can effect unloading and loading in multiple planes (e.g., either multiple parallel or non-parallel planes) or in third-dimensional space. Note that in some embodiments, a loader and/or ejector engage work pieces apply locomotive force by transferring a loading force. But in some embodiments, a loader and/or ejector engage work pieces in other ways. For example, a loader and/or ejector can engage by applying a gripping force, applying a magnetic force, apply a pulling force (e.g., such as a vacuum to pull the work piece), applying a force using pressurized gases to propel work piece, among others. According to at least some embodiments, a loader can be implemented to mill or otherwise interact with each surface of, for example, a six-sided work piece.

Figure 2:
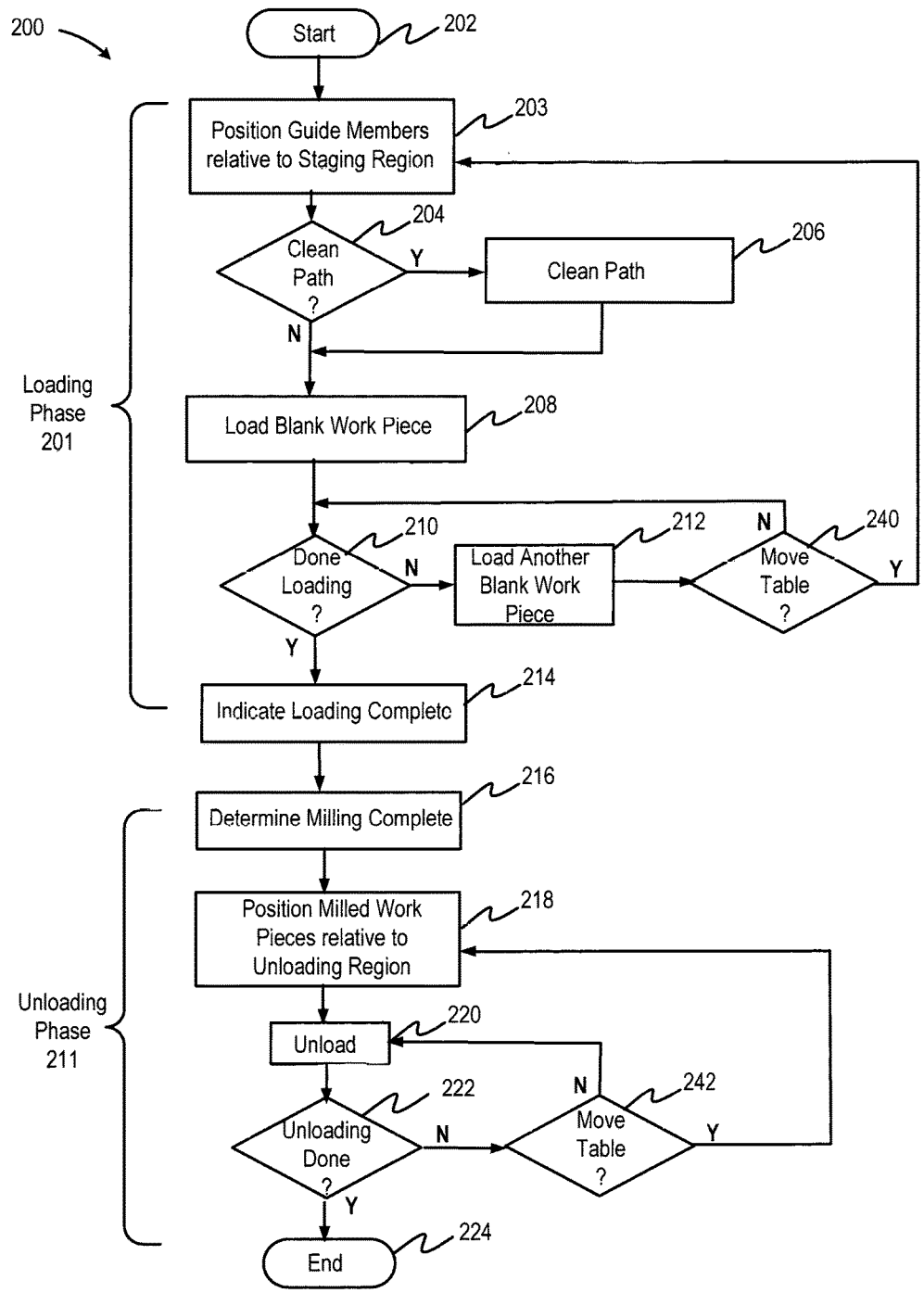
FIG. 2 is a diagram depicting an example of a flow to automatically load and unload work pieces, according to a specific embodiment.

FIG. 2 is a diagram depicting an example of a flow to automatically load and unload work pieces, according to a specific embodiment. Flow 200 includes a loading phase 201 and an unloading phase 211, and starts at 202. At 203, which can be optional, guide members are positioned adjacent to an initial location, such as a staging region, to engage a loader during a loading operation. For example, a signal can be generated (e.g., by a controller) to cause the transport of a milling table, which includes the guide members, to align with a loader member or with feeder members of a storage region. In some embodiments, 203 can be performed more than one time during a loading phase to, for example, move a table to load multiple rows of work pieces. Further, a deflection shield can be opened to provide access between a loader member and the guide members. A determination is made at 204 as to whether to clean a path. If so, flow 200 passes to 206, but if not, flow 200 continues. At 206, a cleaning force can be applied to portions of guide members at different times. That is, the cleaning force can sweep along the portions of the guide members to clean those portions. In some cases, the cleaning force originates at a position within pairs of the guide members. For example, the application of the cleaning force can include directing pressurized gas, such as air, to the portion of the guide members. In another example, the application of the cleaning force can include contacting one or more cleaning elements, such as a brush, against the portions of the guide members. Note that the application of the cleaning force is not intended to be limited to the use of pressurized gas, and a path cleaner, according to some embodiments, can include other structures that can clean the guide members. Cleaning may or may not coincide with loading. Flow 200 then moves to 208.

At 208, a loader member is activated to displace a work piece in a plane that includes the portions of the guide members. According to some embodiments, the term "loader member" can refer to either a rigid or flexible member including one or more elements that are integrated or otherwise coupled together to constitute a structure configured to effect transfer of a work piece from a non-milling region, such as a storing region or a staging region, to a milling region. A determination is made at 210 as to whether to the loading operation is done. If the loading operation is not done, flow 200 passes to 212, but if so, flow 200 continues. At 212, a next work piece is selected from a storage region for displacement by the loader member. According to some embodiments, a selecting device can be configured to select the next work piece from a group of work pieces, whereby the next work piece can move down into the plane in which the loader member operates. A releasing device can be implemented to release the other work pieces in the group so that they move to engage the selecting device for subsequent loading. In some examples, the storage region can be oriented at an angle to the portions of the guide members so that the next work piece and the other work pieces move by, for example, sliding along one or more feeder members. At 240, which is optional, a determination is made as to whether to move a milling table to load additional blank work pieces in other rows, for example. If so, flow 200 continues back to 203, but if not, then flow moves to 210.

When loading is complete, flow 200 moves to 214 at which flow 200 indicates that loading is complete. For example, a loading-complete signal can be generated by a loader or an associated controller for transmission to a controller of a milling machine to initiate the milling process. Further, a door-close signal can be generated by a loader or an associated controller for transmission to an actuator to close the door prior to the milling process. At 216, flow 200 determines that the milling operation is complete. At 218, which can be optional, the milled work pieces are positioned adjacent to an unloading region. For example, a signal can be generated (e.g., by a controller) to cause the transport of a milling table, which includes the milled work pieces, from adjacent to a milling tool to adjacent an unloading region in a manner that aligns with an ejection platform. Further, a deflection shield can be opened to provide access between the ejection platform and guide members. In some embodiments, 218 can be performed more than one time during an ejection phase to, for example, move a milling table to load multiple rows of work pieces. At 220, the milled work pieces are unloaded. For example, an ejector member can be activated to extract the milled work pieces, whereby the pairs of the guide members can be disposed in a linear arrangement. The ejector member can impart an unloading force to the milled work pieces to unload them onto the ejection platform. In some cases, the ejection platform is coextensive with the plane. A determination is made at 222 as to whether to the unloading operation is done. If not, flow 200 passes to 242 at which a determination is made as to whether to move a milling table to unload additional milled work pieces from other rows, for example. If so, flow 200 continues back to 218, but if not, then flow moves to 224, at which flow 200 terminates. In various embodiments, more or fewer operations or steps can be implemented than is described in FIG. 2.

FIGS. 3A to 5E depict various examples of structures configured to perform automated loading operations, according to some embodiments. FIG. 3A is a perspective view 300 depicting a loader 302 with a staging region 310 oriented adjacent to loader 302, according to some embodiments. In various embodiments, a loader can include fewer or more components than are shown. Staging region 310 is shown to include guide members 312*a* and 312*b*. In some examples, guide members 312*a* and 312*b* form part of or is coupled to loader 302. Or, guide members 312*a* and 312*b* can be disposed on a milling table configured to move to a milling site. According to some embodiments, the term "staging region" can refer to an intermediate location to prepare a work piece for transfer into a milling region. In some example, the staging region is the location at which loader 302 engages with a work piece. Note that the structures constituting staging region 310 are not limited to those shown. For example, staging region 310 can include one guide member, or can include three or more guide members.

FIG. 3B is a top view 320 depicting loader 302 and guide members 312*a* and 312*b*, according to some embodiments. Also shown is a loader member 352 of loader 302. In some examples, loader member 352 is configured to impart a loading force unto a work piece at staging region 310 to position the work piece in a milling region. Loader member 352 can operate responsive to a load signal generated by, for example, a controller. Loader 302 can be an actuator, according to some embodiments. An example of loader 302 is an electrical linear motor. Other examples include pneumatic-based actuators, hydraulic-based actuators, or any other type of actuator or device configurable to move a work piece from one location to another.

FIG. 3C is an end view 340 depicting loader 302 and guide members 312*a* and 312*b*, according to some embodiments. As shown, loader 302 includes loader member 354 and an effector 352, which is coupled to loader member 354. Effector 352 is a structure configured to transfer the loading force from loader member 354 to a work piece to transport the work piece to a destination in a milling region. Guide members 312*a* and 312*b* each include contacting surfaces 346 and 348. Contacting surfaces 346 are guiding surfaces configured to apply a guiding force to work pieces to guide travel down a path, whereas contacting surfaces 348 are support surfaces. Either type may receive material that a path cleaner can apply a cleaning force to clean. Loader member 354 and/or effector 352 are disposed approximately half-way between the width ("W") 342, such as at a distance ("W/2") 344, from one or both of guide members 312*a* and 312*b* (or contacting surfaces 346 thereof). Loader adjuster 350 is configured to adjust the spatial positions of guide members 312*a* and 312*b* to approximate a dimension of a work piece, and to align either loader member 354 or effector 352, or both, with a plane 399 passing through a medial portion of a work piece. By centering loader 302, the loading force is applied approximately to the middle portion of a work piece, thereby reducing the application of loading forces offset from the center. In some examples, contacting surfaces 348 lies coextensively with a plane 398 through which a portion of effector 352 is configured to pass through during loading operations. Cross section X-X' is discussed next.

FIG. 3D is a cross-section view ("X-X'") 360 depicting loader 302, according to some embodiments, with cross section X-X' being shown in FIG. 3C. Loader member 354 and effector 352 are configured to traverse along the directions 364 to engage a portion of work piece 362 disposed on at least guide member 312*a*. Note that guide member structures and/or functions are not limited to that shown in FIGS. 3A to 3D but can include other structures or be configured in other configurations to provide guiding forces. In some embodiments, the guide members can operate as rails, and, thus, can be referred to as rails. In at least one embodiment, loader member 354 and effector 352 are configured to move up and down in the Z-axis direction to accommodate various sizes of work pieces. In one example, loader member 354 can be oriented higher in the positive Z-axis and/or effector 352 can be oriented to extend below in the negative Z-axis direction to engage a work piece at surface portions 363 rather than at surface portion adjacent to surfaces 346. The term "effector" can refer to a structure that is configured to impart a loading force unto a work piece and need not be limited to the structure shown as effector 352. For example, the end or tip 365 of loader member 354 can operate as an effector. Thus, effector 352 can be optional. In some embodiments, an effector can be configured to operate in dual modes. During a first mode, the effector applies a cleaning force, whereas during a second mode, the effector applies a loading force. In at least one example, the first and second modes can be performed concurrently (or substantially concurrently).

Figure 3E:
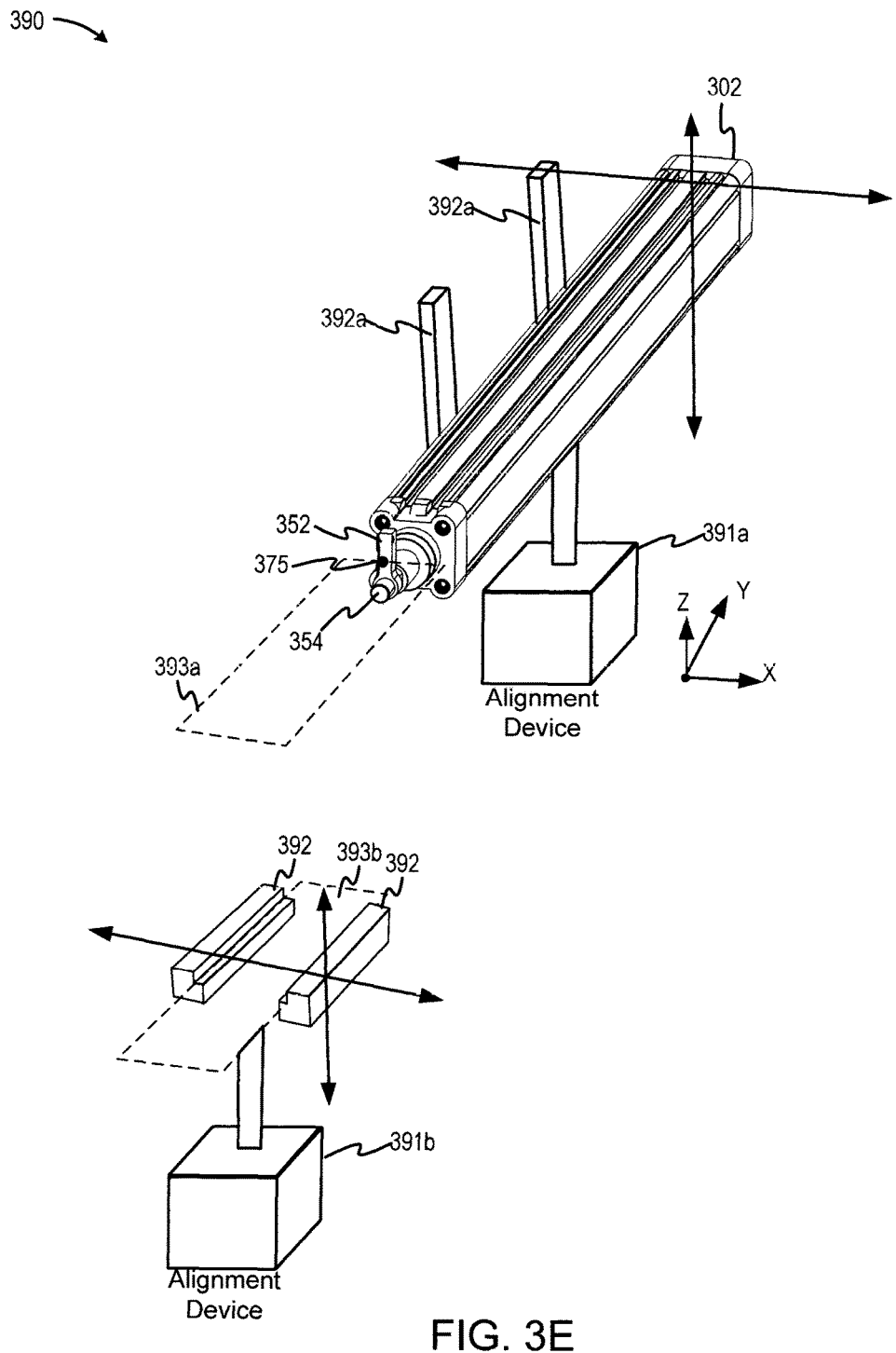
FIGS. 3E to 3G depict various examples of staging regions and structures configured to facilitate transitions of work pieces between storing regions and orientations for loading work pieces, according to some embodiments.
Figure 3F:
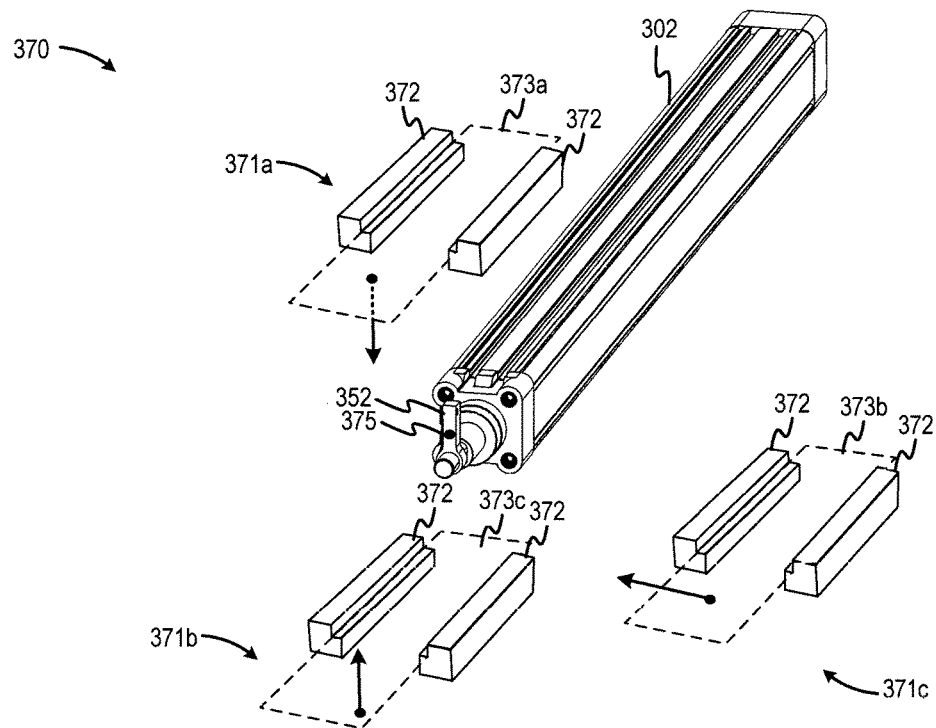
Figure 3G:
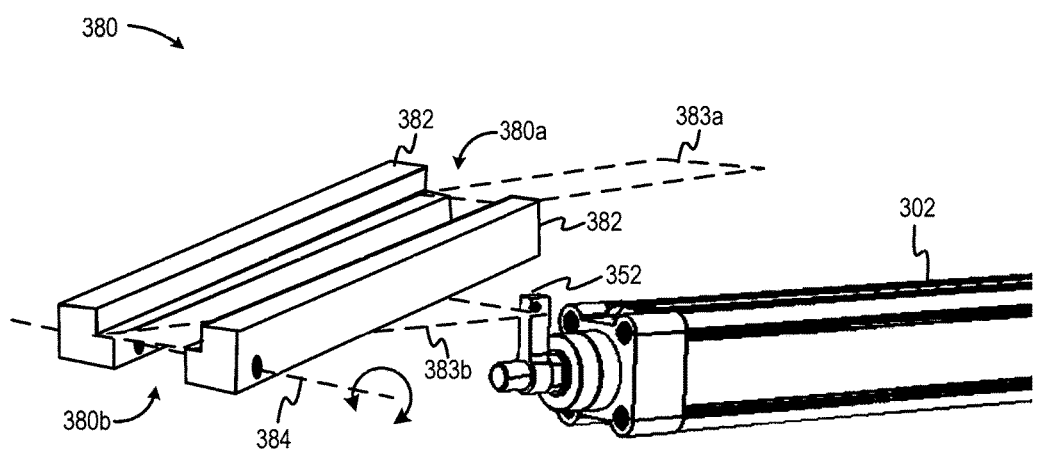

FIGS. 3E to 3G depict various examples of staging regions and structures configured to facilitate transitions of work pieces between storing regions and orientations for loading work pieces, according to some embodiments. Diagram 390 of FIG. 3E depicts implementation of alignment devices to align guide members 392, which can constitute a staging region, with a point 375 of an effector 352 to facilitate loading of work pieces. Alignment devices, such as alignment devices 391a and 391b are configured to align either effector 352 and guide members 392 or guide members 392 and a storage region (not shown). Alignment devices are configured to facilitate transfer of a work piece from a storage region to a staging region at one interval of time, and to facilitate transfer of the work piece from the staging region to a milling at another interval of time. As used herein, the term "align" can refer, at least in some embodiments, to arranging, for example, a staging region relative to an orientation of a storage region (or vice versa), or to arranging a staging region relative to an orientation of an effector (or vice versa) to bring them into cooperation or sufficient agreement to facilitate transfer of work pieces between two regions of a storage region, a staging region and a milling region. In various embodiments, the relative positions of a loader 302 and guide members 392 to each other can be controlled by an alignment device 391a or an alignment device 391b, or both. In one example, loader 302 is stationary and alignment device 391b is configured to move guide members 392 to any orientation in the X, Y, and Z space to receive a work piece coextensive with a plane 393b in one interval. Further, alignment device 391b can orient the work piece and guide members 392 so that plane 393b coincides with plane 393a through with effector 352 traverses. In other examples, the staging region is stationary and alignment device 391a is configured to orient effector 352, loader member 354 and/or loader 302 in a first position in which effector 352 and plane 393a coincides with plane 393b and in another position in which effector and plane 393a do not coincide with plane 393b. In one instance, loader 302 can travel vertically up and down via a set of rails 392a.

FIG. 3F depicts various examples of the orientations of staging regions to facilitate transitions of work pieces between storing regions and orientations for loading work pieces, according to some embodiments. Diagram 370 depicts a loader 302 and examples of various originating positions 371a, 371b, and 371c of guide members 372 at which a work piece is received from a storage region (not shown). As shown, guide members 372 and planes 373a, 373b, and 373c corresponding to originating positions 371a, 371b, and 371c, respectively, are configured to coincide with a plane passing through point 352 during a loading operation. An alignment device (not shown) can be configured to move guide members 372 between a position adjacent to effector 352 and a position adjacent a storage region (not shown). An alignment device can move or orient guide members 372 in any orientation in three-dimensional space.

FIG. 3G depicts an example of the orientations of staging regions to facilitate transitions of work pieces between storing regions and orientations for loading work pieces, according to some embodiments. Diagram 380 depicts a loader 302 and examples of various orientations of guide members 382. Guide members 382 include a first end 380b that includes an axis 384 passing through the first end of guide members 382, and a second end 380a configured to rotate about axis 384 and further configured to align with effector 352 in the first mode and with the storage region in the second mode. To illustrate, consider that second end 380a of guide members 382 is configured to align with plane 383a coextensive with a surface of a storage region. In particular, the contacting surfaces of guide members 382 are aligned (i.e., sufficiently adjacent) with plane 383a. In this orientation, a work piece can be transferred from the storage region to guide members 382. In another orientation, second end 380a is pivoted about axis 384 to align the contacting surfaces of guide members 382 with a plane 383b through which effector 352 traverses. In this orientation, a work piece can be transferred from the staging region and its guide members 382 to a milling region. The implementation shown in FIG. 3G is not intended to be limiting to those guide members and orientations depicted.

Figure 4A:
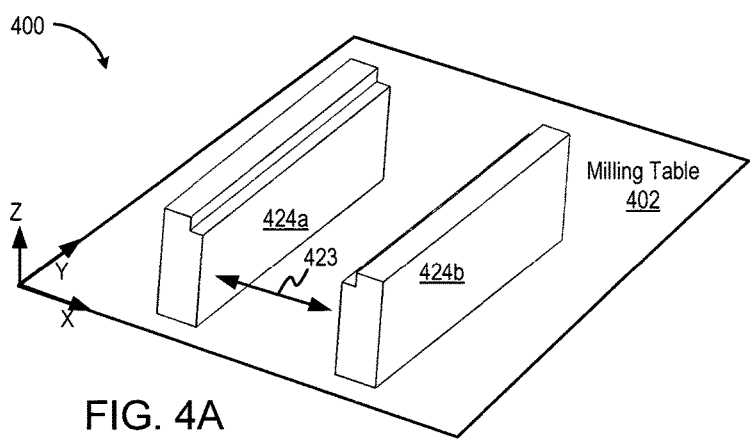
FIGS. 4A to 4D depict other examples of structures configured to perform automated loading operations, according to some embodiments.

FIG. 4A is a perspective view 400 depicting a pair of guide members, according to some embodiments. The pair of guide members includes guide members 424a and 424b coupled to a milling table 402. The pair of guide members can be configured to operate in dual modes. That is, guide members 424a and 424b are configured to provide guiding forces in a first mode for work pieces destined for other pairs of guide members during loading operations (other work pieces use guide members 424a and 424b for guiding purposes). In another mode of operation, guide members 424a and 424b can configured to translate or move towards or away from each other in direction 423 to operate as (or part of) a pair of clamping members during milling operations. In this second mode, the term "clamping," as performed by guide members 424a and 424b, need not be limited to providing mechanical forces to immobilize work pieces, but can refer to any structure or function capable of immobilizing a work piece during milling.

Figure 4B:
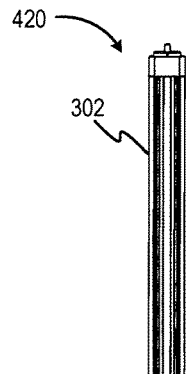

FIG. 4B is a top view 420 depicting loader 302 and pairs of guide members, according to some embodiments. As shown, a first subset of guide members includes guide members 312a and 312b, and a second subset of guide members includes guide members 424a and 424b. In some examples, guide members 312a and 312b can be disposed in a staging region 310 and guide members 424a and 424b can be disposed in a milling region 422.

Figure 4C:
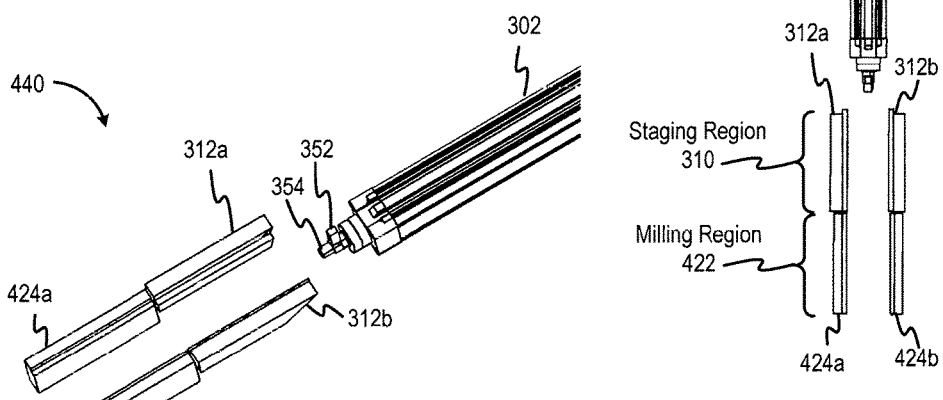

FIG. 4C is a perspective view 440 depicting loader 302 and pairs of guide members 312a and 312b and guide members 424a and 424b, according to some embodiments. Also shown are load members 354 and effector 352. In some embodiments, loader 302 is implemented as a linear actuator including a loader member 354. In some examples, loader member 354 can be piston rod or similar structure. Loader member 354 is not intended to be limited to a piston rod or linear-like structure and can provide other types of locomotive forces, such as angular or rotational locomotive forces, to transfer a work piece to guide members 312a and 312b or guide members 424a and 424b. Effector 352 is configured to impart a linear force unto a work piece at a first pair of guide members 312a and 312b to transport the work piece to a second pair guide members 424a and 424b in a milling region. In some embodiments, at least one pair of either guide members 312a and 312b or guide members 424a and 424b is coupled to loader 302. In other embodiments, both pairs of guide members 312a and 312b and guide members 424a and 424b are associated with a milling table in a milling region.

Figure 4D:
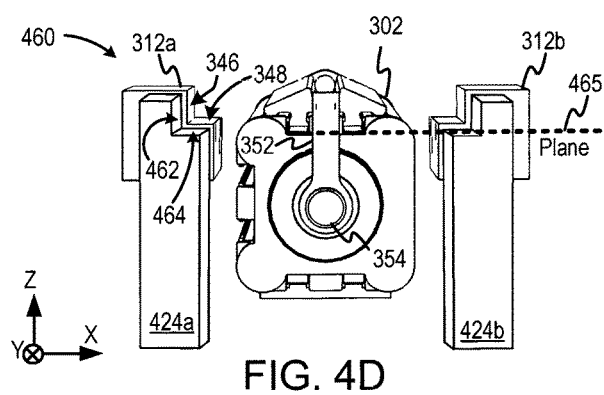

FIG. 4D is an end view 460 depicting loader 302 and pairs of guide members 312a and 312b and guide members 424a and 424b, according to some embodiments. As shown, loader 302 includes loader member 354 and an effector 352, which is coupled to loader member 354. Effector 352 is configured to transfer the loading force from loader member 354 to a work piece to transport the work piece to a destination in a milling region. Guide members 312a and 312b each include contacting surfaces 346 and 348, and guide members 424a and 424b each include contacting surfaces 462 and 464. In some embodiments, guide members 312a and 312b and guide members 424a and 424b (or portions thereof) are disposed in a common plane, or are otherwise configurable to align in a common plane at a point of time. According to at least some embodiments, contacting surfaces 348 and 464 of respective guide members 312 and 424 can align in a plane 465. Thus, plane 465 can extend from contacting surfaces 346 of guide members 312a and 312b to contacting surfaces 464 of guide members 424a and 424b. Note that the contacting surfaces of guide members 312a and 312b and guide members 424a and 424b are not limited to those depicted in FIGS. 4A to 4D and can have other numbers of contacting surfaces, as well as other orientations and shapes than those shown. Note that effector 352 includes a portion oriented to extend through plane 456 to engage a work piece having a surface contacting the surfaces 348 and 464. Note that effector 352 is not limited to engaging a work piece at a lower portion of the work piece that is near the bottom (e.g., near contacting surfaces 348 and 464), and effector 352 can engage the work piece near the top or other parts of the work pieces.

Figure 5A:
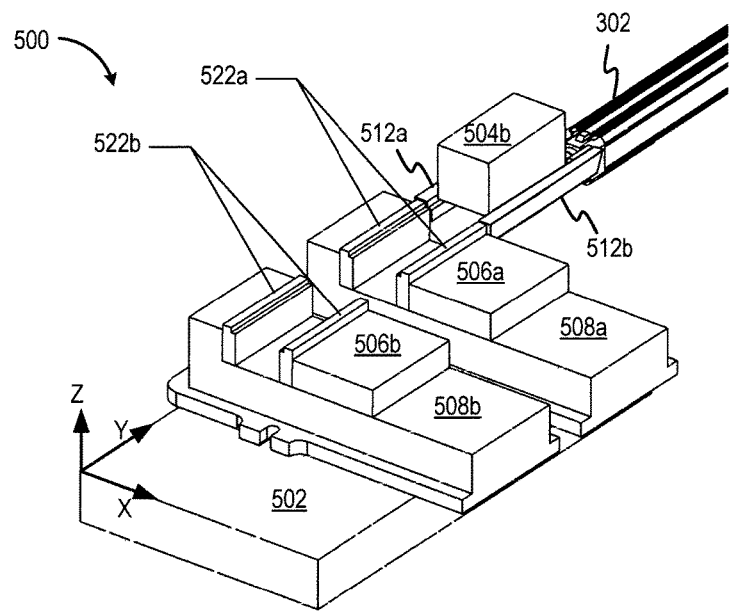
FIGS. 5A to 5E depict yet other examples of structures configured to perform automated loading operations, according to some embodiments.

FIGS. 5A to 5E depict an example of the various stages of a loading operation, according to an embodiment. Diagram 500 of FIG. 5 depict guide members 522a and 522b aligned with guide members 512a and 512b in, for example, a linear arrangement of guide members. Guide members 522a and 522b are disposed on a milling table 502, which is moveable to align with loader 302 and moveable to position guide members 522a and 522b adjacent a milling tool (not shown). In particular, guide members 522a are disposed on a vise body 508a, one of guide members 522a being coupled to clamping device 506a. Clamping device 506a is configured to move the coupled guide member 522a to the other guide member 522a to clamp or otherwise immobilize a work piece in a stationary position. Similarly, guide members 522b are disposed on a vise body 508b, one of guide members 522b being coupled to clamping device 506b. Clamping device 506b is configured to move guide member 522b to the other guide member 522b to apply a force to clamp another work piece in a stationary position. In some embodiments, clamping devices 506a and 506b are hydraulic-based clamping devices under control of a controller. As shown in FIG. 5A, a loader 302 is configured to displace work piece 504b to guide members 522b. As is subsequently shown, loader 302 is configured to extend an effector 552 to displace work piece 504b over one or more subsets of guide members disposed on a portion of the path associated with milling table 502.

Figure 5B:
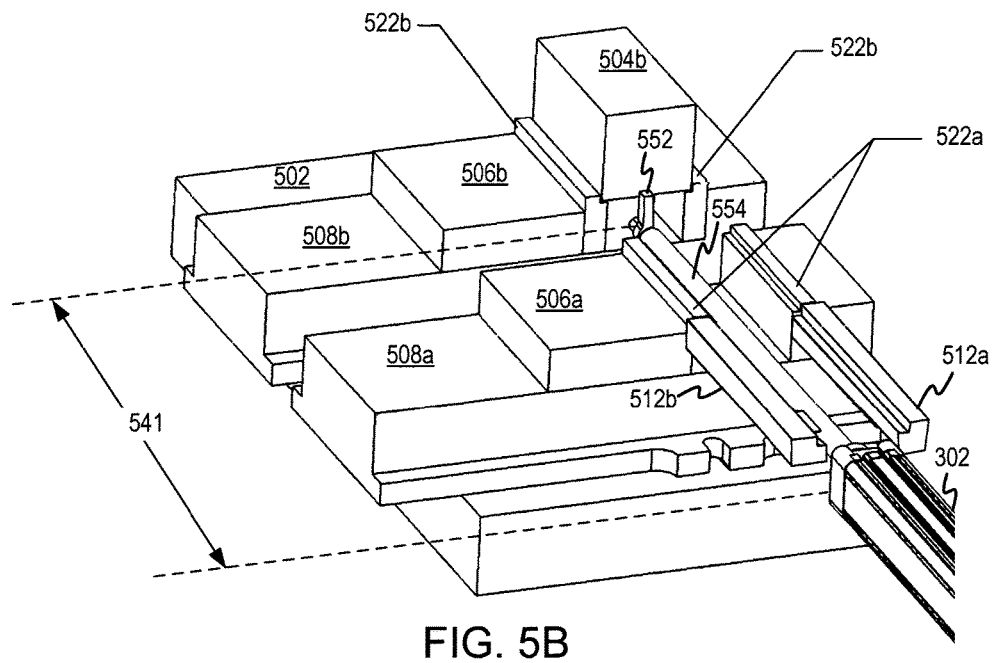

FIG. 5B depicts an example of the displacement of a work piece onto milling table, according to some embodiments. As shown, loader member 554 extends effector 552 through guide members 512a and 512b and guide members 522a and 522b to a distance 541, thereby disposing work piece 504b at a position coextensive with guide members 522b.

Figure 5C:
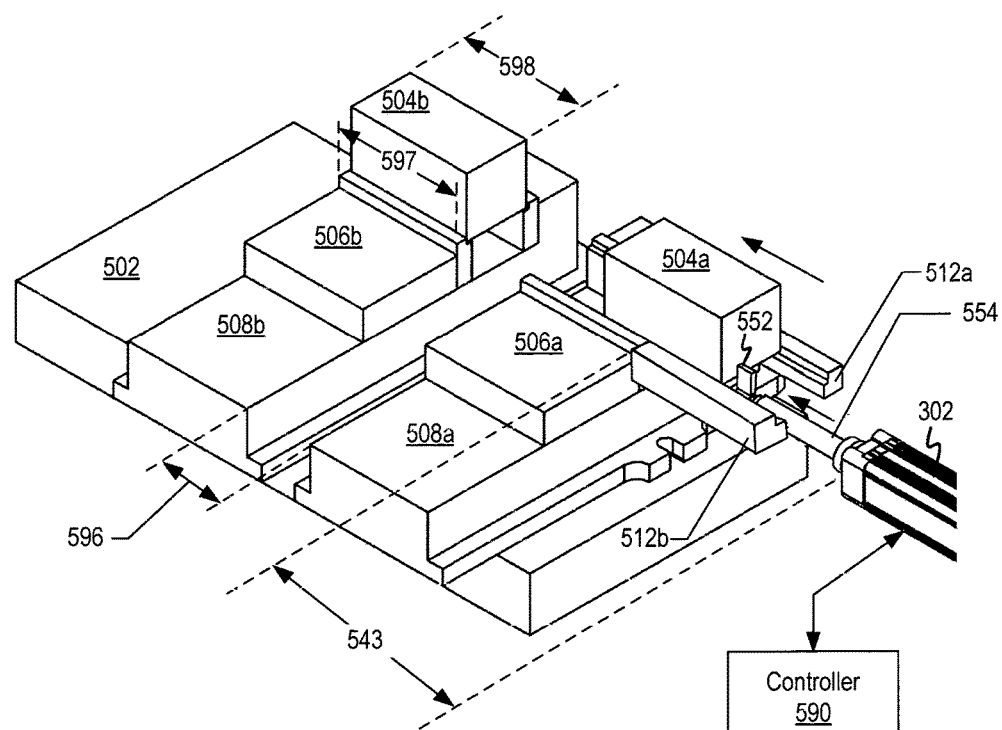

FIG. 5C depicts an example of the displacement of another work piece onto milling table, according to some embodiments. As shown, loader member 554 is configured to extend effector 552 through guide members 512a and 512b to distance 543, which is less than a distance 541 of FIG. 5B, to dispose work piece 504a at guide members 522a. In some embodiments, controller 590 is configured to determine distance 543 as a function of previous distance 541, the distance 596 between vise bodies 508a and 508b, and the length of work piece 504a. For example, distance 543 can be determined by subtracting the distance 596 and the length of work piece 504a from distance 541. In other embodiments, controller 590 can load work piece 504a at distance 543, based on feedback from position sensors (not shown) or the like.

Figure 5D:
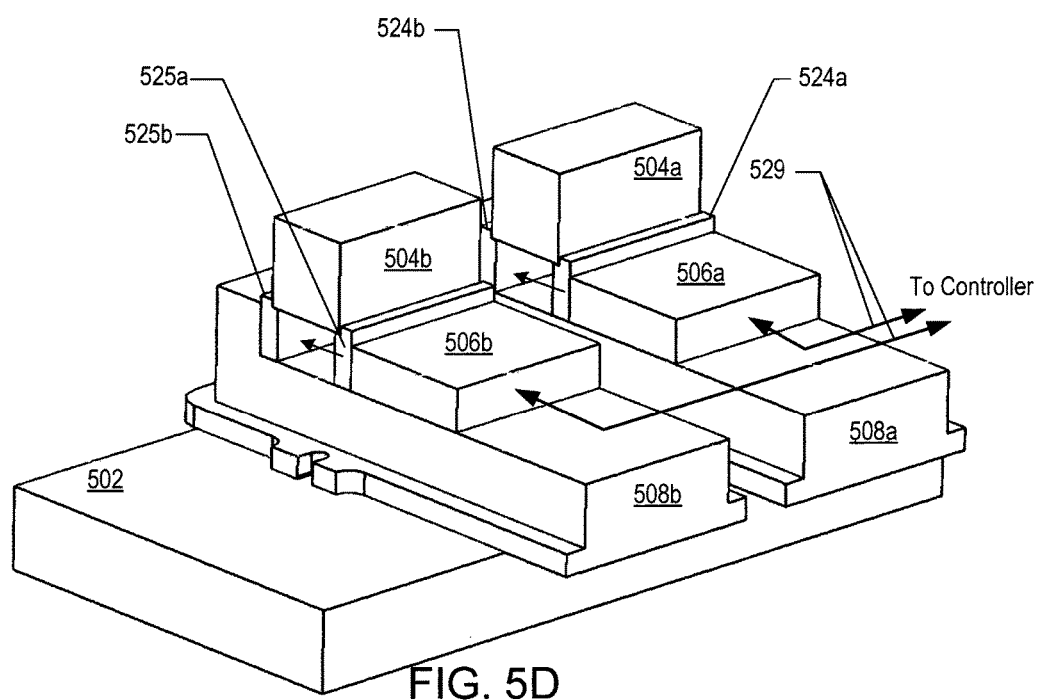

FIG. 5D depicts an example of the placement of another work piece onto milling table, according to some embodiments. As shown, work piece 504a is disposed at guide members 524a and 524b, and work piece 504b is disposed at guide members 525a and 525b. Clamping device 506a and clamping device 506b are coupled to controller to receive control signals to initiate the clamping of respective work pieces 506a and 506b. In this example, guide members 524a and 524b and guide members 525a and 525b operate as clamps.

Figure 5E:
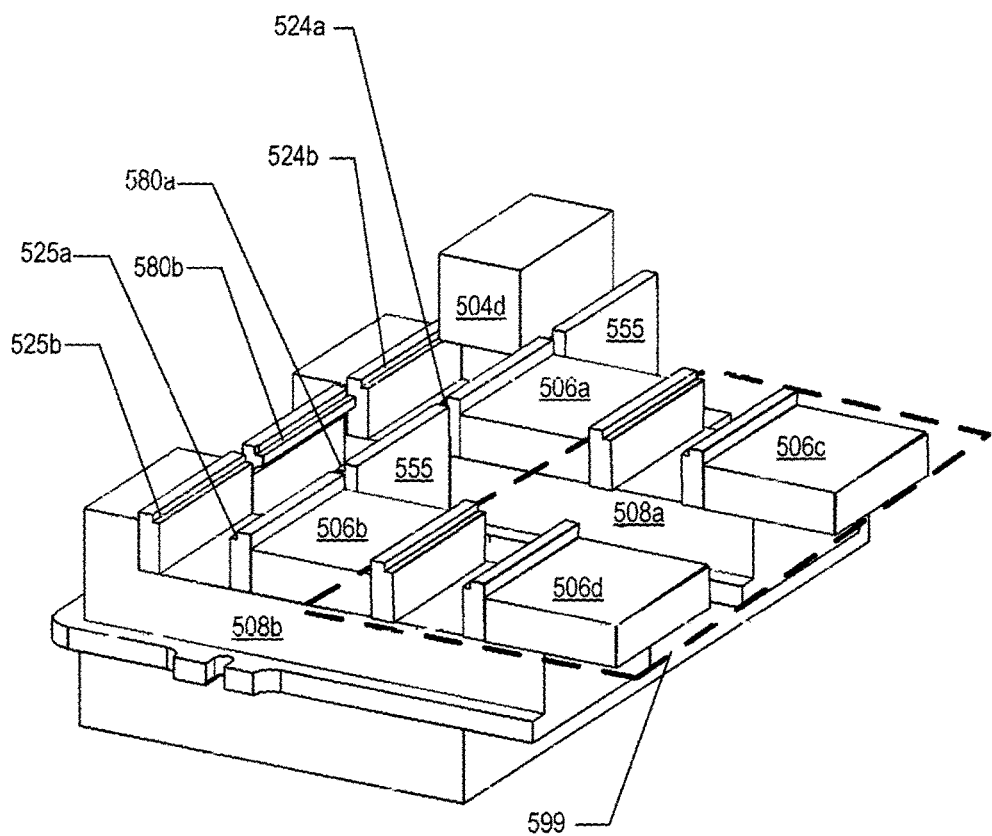

FIG. 5E depicts an example of loading work pieces onto another milling table configuration, according to some embodiments. As shown, work piece 504d is positioned to travel between guide members 524a and 524b to a destination at guide members 525a and 525b. Vise bridges 555 are disposed between vice bodies 508a and 508b, as well as between vice body 508a and a staging region (not shown). Vise bridges 555 include contacting surfaces of guide 580a and 580b, whereby vise bridges 555 are configured to enable work piece 504d to pass from guide members 524a and 524b to guide members 525a and 525b. Further, FIG. 5E depicts another set 599 of guide members and clamping devices 506c and 506d. To load the guide members in set 599, a controller can transmit a control signal to a table-moving device (not shown) to move milling table 502 so as to align guide members of set 599 with loader 302 (not shown). Therefore, multiple rows of work pieces can be aligned with a loader by activating a table moving device (not shown) to align each row separately during a loading (or unloading) phase during which, for example, a deflector shield door is in an open state.

Figure 6A:
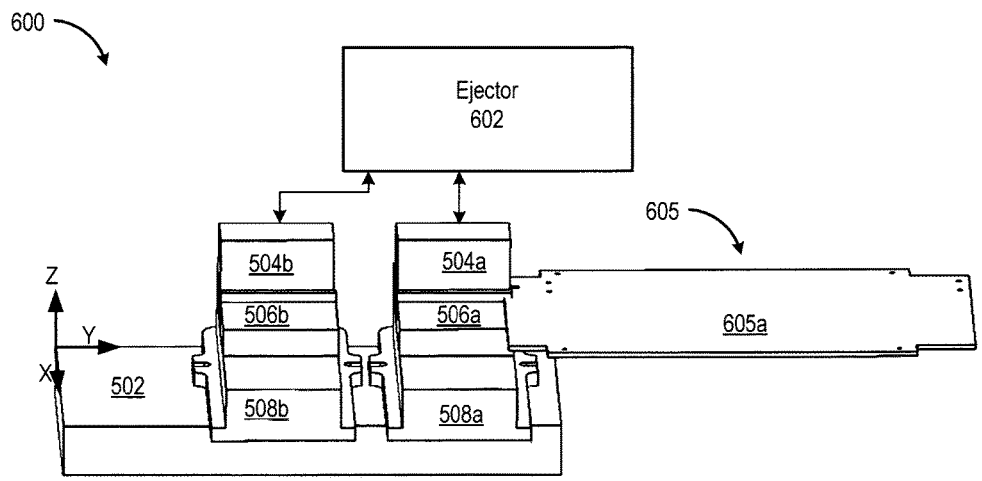
FIGS. 6A to 6K are diagrams depicting examples of an ejector configured to eject work pieces, according to some embodiments.

FIG. 6A is a diagram 600 depicting an ejector 602 configured to eject work pieces, according to some embodiments. Ejector 602 or a controller (not shown) can be configured to communicate with clamping device 506a and clamping device 506b to release the work pieces 504b and 504a from the associated guide members. Ejector 602 can include an ejector member configured to extract work pieces 504a and 504b from subsets of guide members on milling table 502 for transfer to a surface 605a of an ejection platform 605. As shown, the subsets of guide members are disposed in a linear arrangement.

Figure 6B:
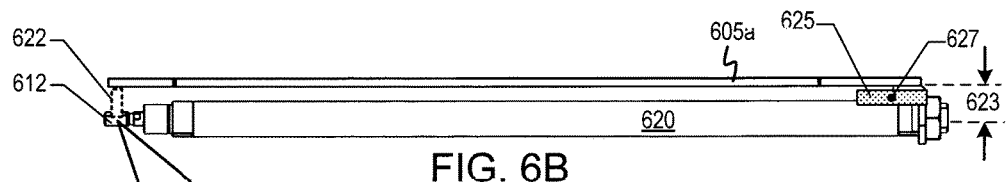

FIG. 6B is a side view depicting an ejector 620 including an ejection member 612, with ejector 620 being disposed below surface 605a, according to some embodiments. In some embodiments, ejection member 612 includes an engagement member 622 configured to impart an unloading force to a work piece (e.g., via other work pieces) to unload one or more work pieces from a milling region or milling table 502 to ejection platform 605. According to some embodiments, engagement member 622 can be rotatable when contacting a first surface of a work piece and can be static when contacting a second surface of the work piece. In a specific example, engagement member 622 includes a pawl assembly 610 coupled to ejection member 612. A pawl mount 614 includes a pawl member 611 configured to rotate about a pin 614 to orient in position 616 if a contacting force ("Fcon") in direct 609a is applied to pawl member surface 615a. But if a contacting force ("Fcon") in direct 609b is applied to pawl member surface 615b, then pawl member 611 remains static and configured to impart an unloading force to one or more work pieces.

In some embodiments, pawl assembly 610 can be rigid (e.g., non-rotatable). As such, ejector 620 can be configured to move distances 623 relative to ejection platform 605 to lower the engaging portion (e.g., pawl member surface 615b) of pawl member 611 below the bottoms of the work pieces. In one embodiment, ejector 620 is coupled via position adjuster 625 to ejection platform 605. Position adjuster 625 is configured to displace ejector 620 farther from ejection platform 605 to enable pawl member surface 615b to traverse under the work pieces. Position adjuster 625 then displaces ejector 620 closer to ejection platform 605 with a rigid pawl assembly 611 to engage work pieces at pawl member surface 615b for ejection. In one embodiment, position adjuster 625 can be a gimble or gimble-like structure configured to include pivoted support that allows the rotation of ejector 620 about an axis 627, whereby engagement member 622 is lowered, such as by an amount 623, below a plane including the bottom surfaces of the work pieces. Therefore, engagement member 622 does not engage forcibly the work pieces as it and ejector member 612 extends away from the body of ejector 620. To eject work pieces, engagement member 622 is raised as ejector 620 is pivoted in the other direction about axis 627 to reduce the distance or amount 623. Then, engagement member 622 is positioned to engage one or more work pieces as ejector member 612 retracts back into the body of ejector 620 to deposit the work pieces onto surface 605a.

Figure 6C:
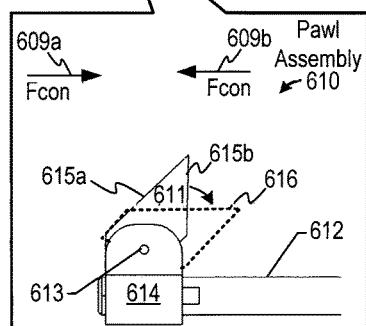
Figure 6C:
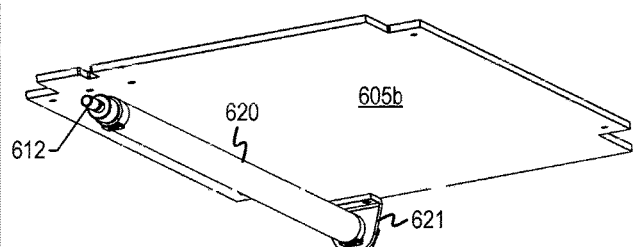
Figure 6D:
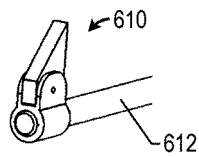
Figure 6E:
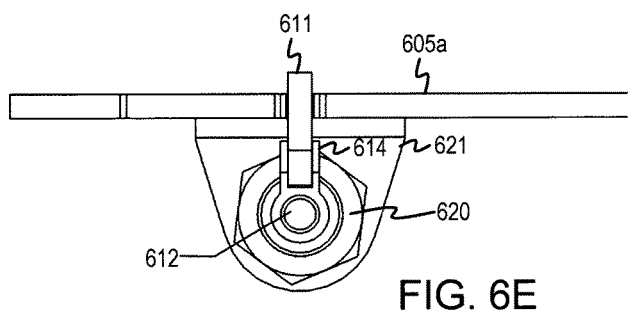

FIG. 6C is a perspective view from below that depicts an ejector 620 including an ejection member 612, with ejector 620 being disposed below under-surface 605b, according to some embodiments. One or more brackets 621 are configured to mount ejector 620 to ejection platform 605. In some embodiments, ejector 620 can be implemented using an ejector actuator that includes an ejector piston rod as ejection member 612. Ejector 620 can be an electrical linear motor, a pneumatic cylinder, or any type of suitable actuator. Ejector 620 can also be coupled to a controller (not shown) for activation during ejection phases. FIG. 6D is a perspective view of pawl assembly coupled to ejection member 612, according to some embodiments. FIG. 6E is an end view of an ejector 620 including an ejection member 612, according to some embodiments. As shown, ejection member 612 includes a pawl mount 614 and a pawl member 611. Pawl member 611 is configured to extend through a plane that includes surface 605a of an ejection platform 605. As such, pawl member 611 can be configured to extend above contacting surfaces of guide members, the contacting surfaces being coextensive with the plane including surface 605a.

Figure 6F:
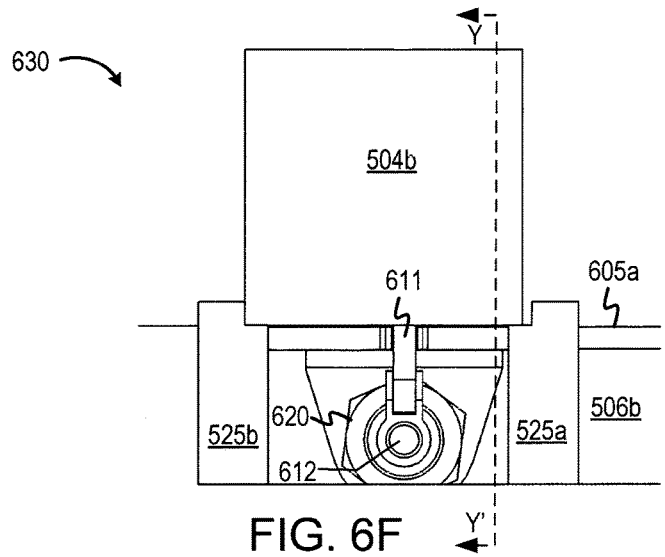
Figure 6G:
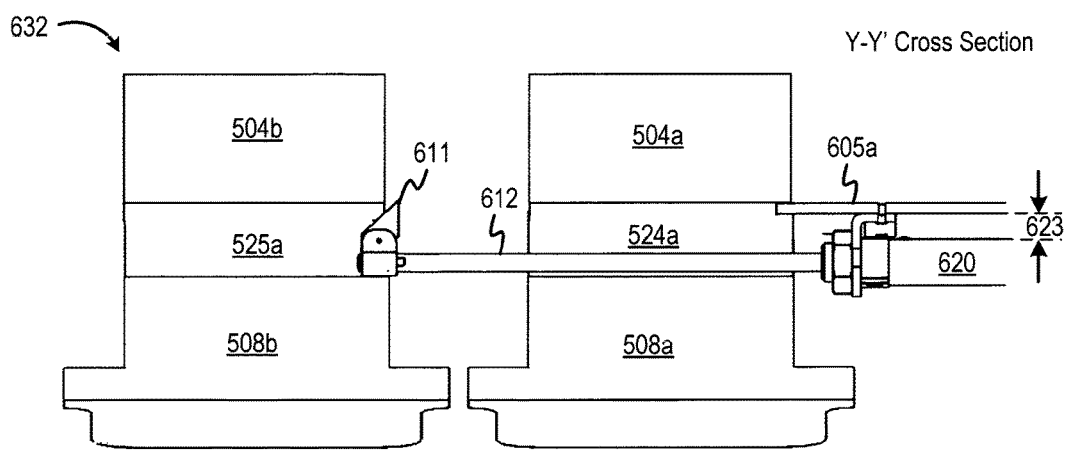
Figure 6H:
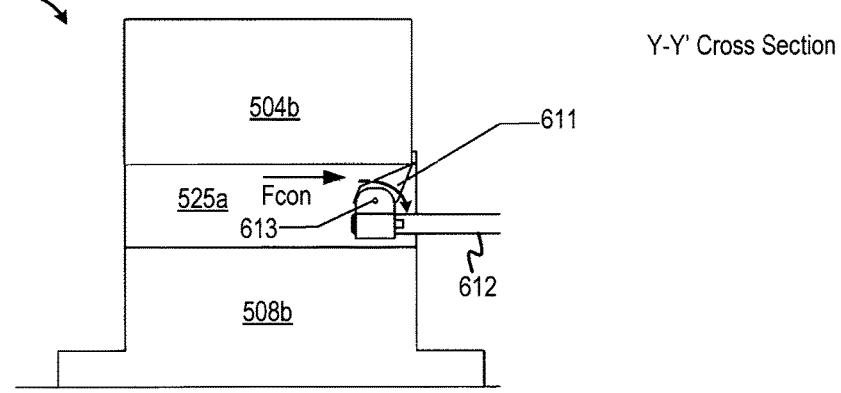
Figure 6I:
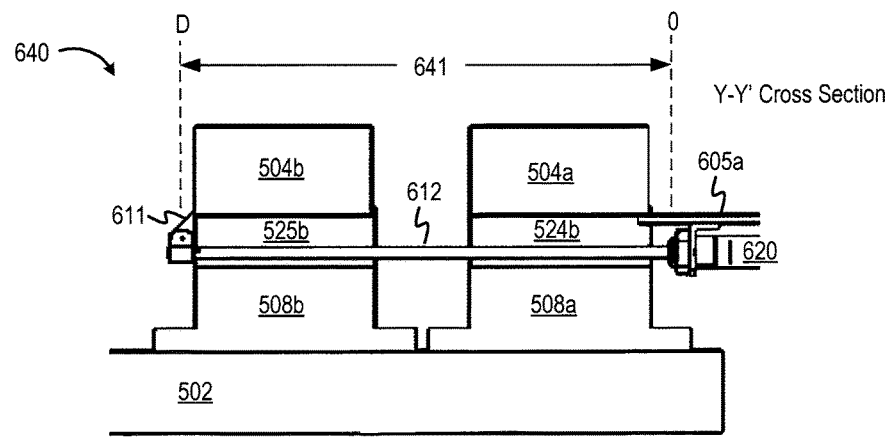
Figure 6J:
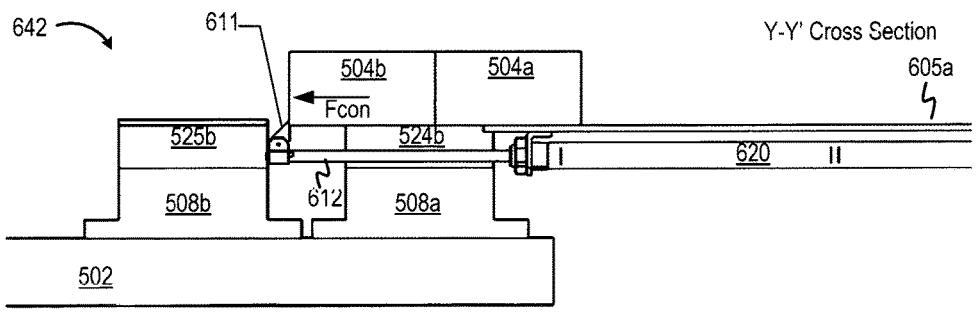
Figure 6K:
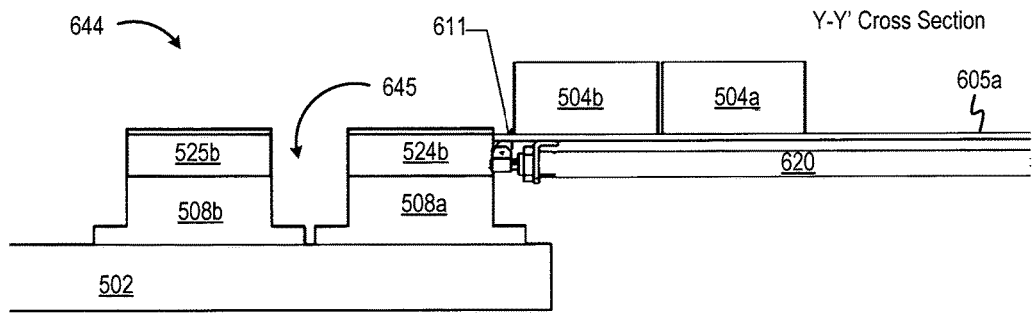

FIGS. 6F to 6K are diagrams illustrating various stages of an ejection phase, according to some embodiments. Diagram 630 of FIG. 6F is an end view depicting the farthest most work piece 504b disposed on guide members 525a and 525b, with a pawl member 611 contacting the bottom surface of work piece 504b as ejection member extends to greater lengths. Diagram 630 also shows a Y-Y' cross section for subsequent discussions. FIG. 6G is a cross-section view ("Y-Y") 632 depicting pawl member 611 contacting the bottom surface of work piece 504b. FIG. 6H is a cross-section view ("Y-Y") 634 depicting pawl member 611 rotating or otherwise yielding under a contacting force ("Fcon") while ejection member 612 extends under work piece 504b. FIG. 6I is a cross-section view ("Y-Y'") 640 depicting ejection member 612 extending to a distance ("D") 641 at which pawl member 611 is configured to engage a surface of 504b. FIG. 6J is a cross-section view ("Y-Y") 642 depicting ejection member 612 retracting toward ejector 620, whereby pawl member 611 is receiving a contacting force ("Fcon") in a direction that pawl member 611 remains static. In this direction of travel, pawl member 611 operates to extract the work pieces from guide members 524b and 525b. FIG. 6K is a cross-section view ("Y-Y'") 644 depicting ejection member 612 fully retracted in ejector 620 so that pawl member 611 has disposed ejected work pieces 504b and 504a on surface 605a of the ejection platform. Note that a vise bridge, such as vise bridge 555 of FIG. 5E, can be implemented in region or space 645.

Figure 7A:
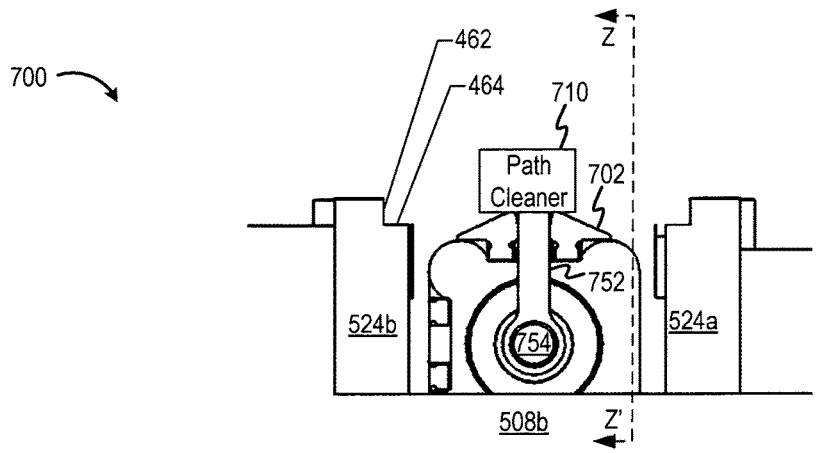
FIGS. 7A to 7G are diagrams illustrating various examples of a path cleaner and/or a dual mode effector, according to various embodiments.

FIGS. 7A to 7F are diagrams illustrating various examples of a path cleaner, according to various embodiments. FIG. 7A is an end view 700 of an effector 752 including a path cleaner 710, which is configured to apply a cleaning force to a path that a work piece traverses (e.g., from a staging region to a milling region). Path cleaner 710 is configured to apply the cleaning force to portions of guide members, such as contacting surfaces 462 and 464, to reduce material on those portions. In some embodiments, path cleaner 710 can be coupled to loader member 754 to apply the cleaning force at locations associated with the position of a part of loader member 754.

Figure 7B:
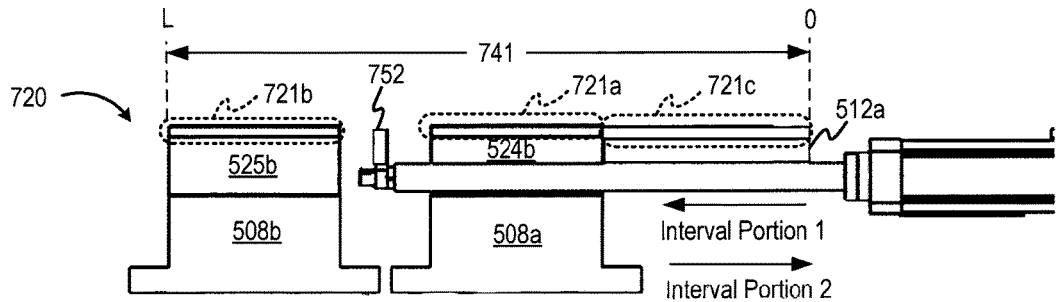

FIG. 7B is a cross-section view ("Z-Z'") 720 depicting effector 752 traversing along and between guide members, such as between guide member 524a and 524b. In some embodiments, effector 752 and path cleaner 710 can be coupled together to move in synchronicity. As such, path cleaner can apply a cleaning force to portions 721a, 721b, and 721c of guide member 524b, 525b, and 512a, respectively, as effector 752 and/or path cleaner 710 sweeps from position "0" to position "L," and back again, or to any distance in between. Path cleaner 710 need not be affixed to or otherwise formed as part of effector 752, but path cleaner 710 can be an independent structure to perform cleaning actions in a different cleaning phase.

Figure 7C:
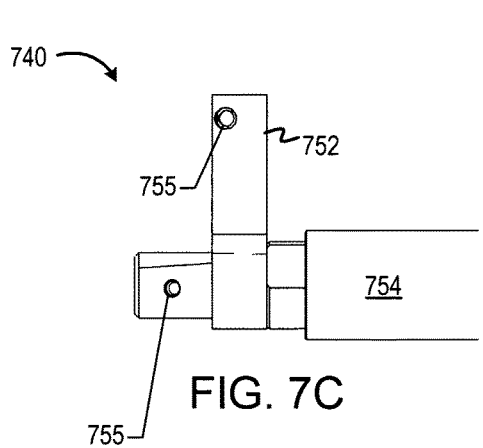
Figure 7D:
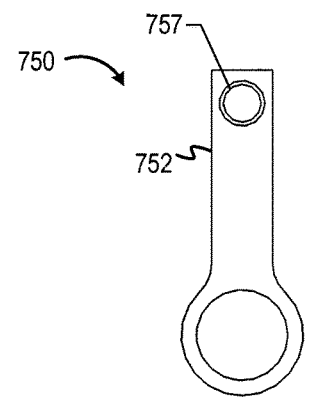

FIGS. 7C and 7D depict an effector 752 being configured to include a path cleaner, according to some embodiments. As shown in diagram 740 of FIG. 7C, effector 752 is disposed on loader member 754 and includes output ports 755. Further, effector 752 of diagram 750 of FIG. 7D can include an input port 757 configured to couple to a source of pressurized gas. The pressurized gas enters input port 757 and directed via output ports 755 to portions of a path over which work pieces are loaded. Output ports 755 are coupled to input port 757, output ports 755 being coextensive with lines that terminate substantially at the portions of guide members. In one embodiment, effector 752 is omitted and end of loader member 754 (or another member) include output ports 755 so that the end of loader member, which can include an internal tube or conduit for gas, can operate as a dual mode effector. Note that the structure of effector of 752 is not intended to be limited, but rather represents one or many structural configurations to implement a path cleaner, according to a number of embodiments.

Figure 7E:
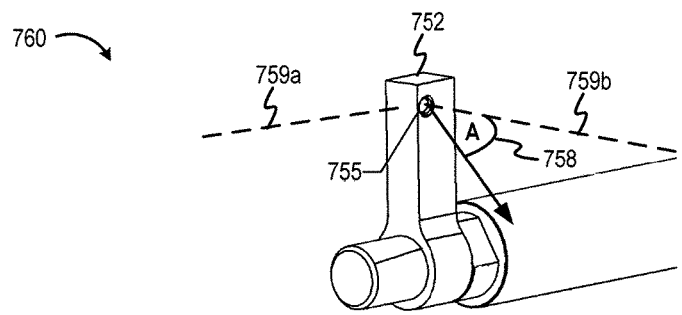

FIG. 7E depicts a dual-mode effector being configured to clean the path over which a work piece is loaded and to load the work pieces, according to some embodiments. During a first interval of time, effector 752 is configured to apply a cleaning force to a path that the work piece traverses from the staging region to the milling region. During second interval of time, effector 752 is configured to transfer a loading force from a loader member 754 to a work piece. Further to diagram 760 of FIG. 7E, line 759a represents a direction of travel of effector 752 and line 759b represents a direction orthogonal to travel of effector 752. Output ports 755 can be configured to direct the direction at which to apply a cleaning force, such as at an angle ("A") 758 from the orthogonal line 759b. In at least one embodiment, output ports 755 are directed along line 759b that terminate at a portion of a path over which the work piece traverses.

Figure 7F:
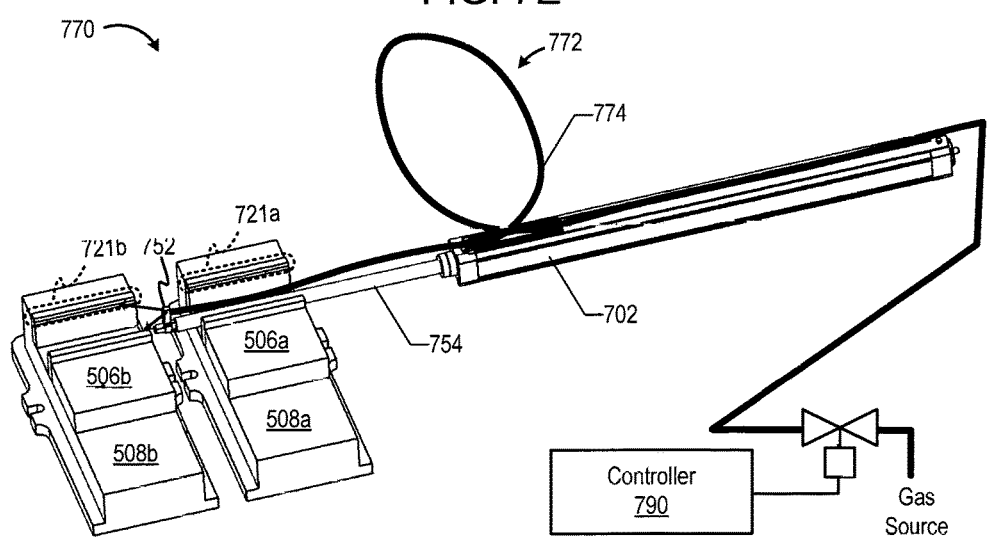

FIG. 7F depicts a dual-mode effector performing a cleaning operation with pressurized gas, according to some embodiments. As shown, controller 790 is configured to advance effector 752 to clean portions 721a and 721b of the guide members. The release of pressurized gas, such as air, can be made via a gas delivery member as a source of pressurized gas for effector 752. Examples of gas delivery members include but are not limited to a tube 774, pipe, or any other suitable conduit or enclosure to facilitate gas delivery, or in some cases, delivery of a liquid for removing material. As such, gas delivery member can be configured to also deliver liquids, such as oil, for application to portions of the path to remove material. Optionally, tube 774 can include a loop 772 that includes reserved slack.

Figure 7G:
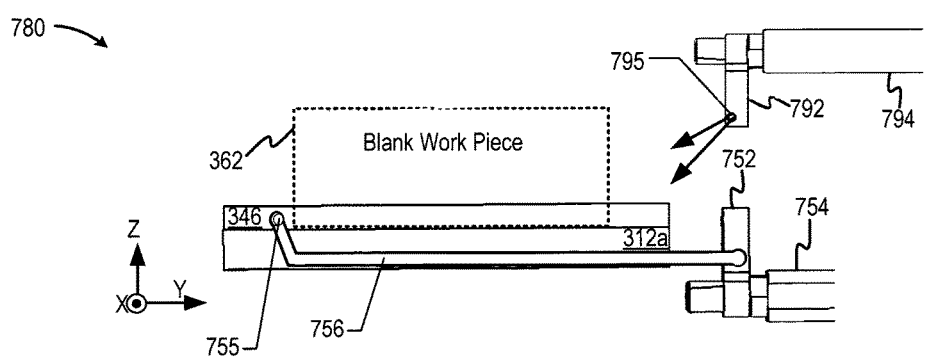

FIG. 7G depicts examples of various implementations of a path cleaner, according to various embodiments. In one example, a dual-mode effector 752 includes a port extender 756 conduit to extend output ports 755 to a position ahead of (e.g., at distances greater than the length of work piece 362) so that cleaning and loading can occur contemporaneously, according to a specific embodiment. Thus, a cleaning force and a loading force can be applied contemporaneously. In another example, port extender 756 conduit and output ports 755 are omitted and another extending member 794, similar to loader member 754, can be used in parallel to perform a cleaning operation independent to that the operation of loader member 754. Extending member 794 can be extended (e.g., similar to loader member 754) to move a path cleaner 792 and its output ports 795 at locations in front of loader member 754 to perform cleaning operation in parallel or in series with loading operations.

Figure 8:
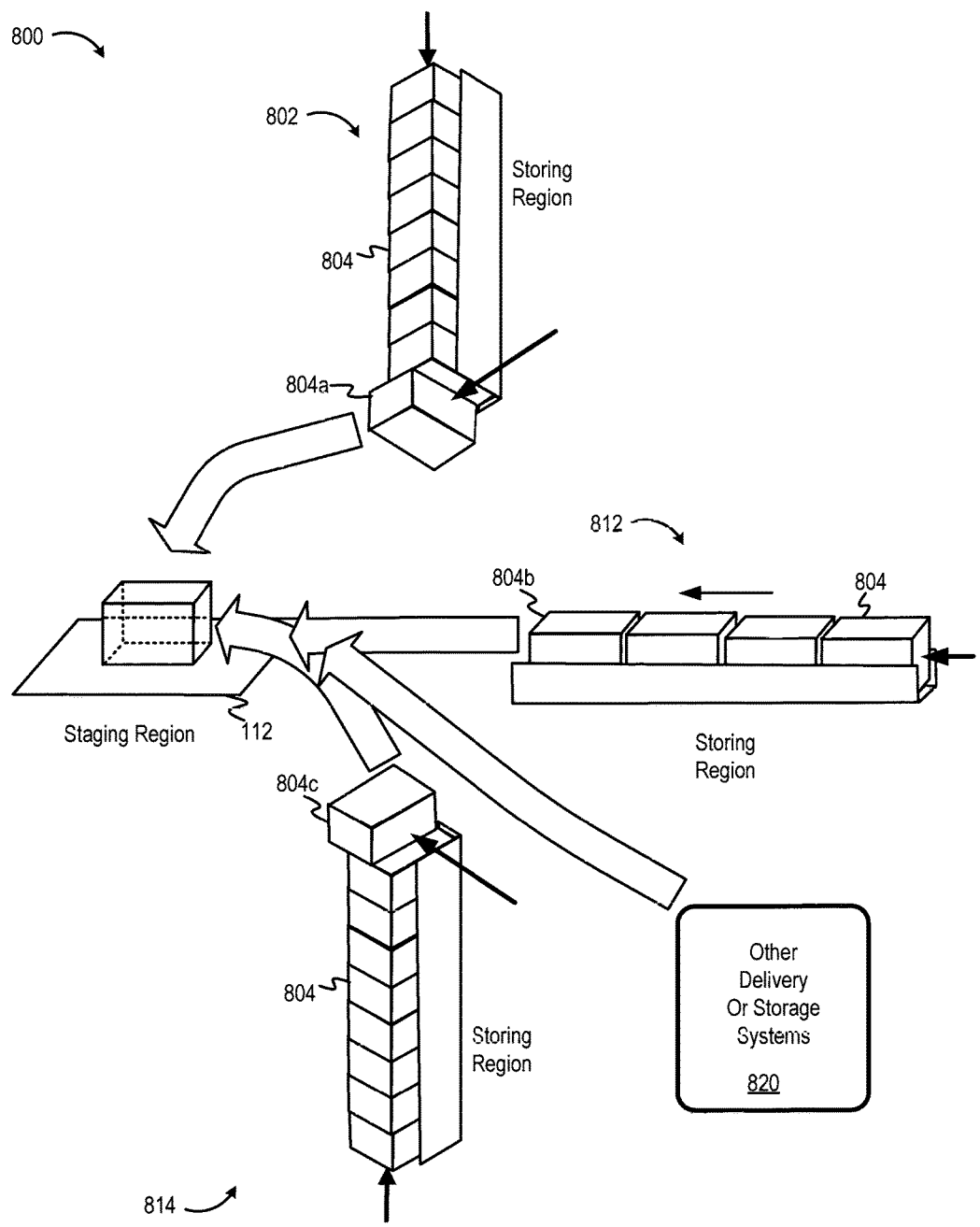
FIG. 8 is a diagram depicting various techniques and structures for introducing work pieces to a staging region, according to some embodiments.

FIG. 8 is a diagram 800 depicting various techniques and structures for introducing work pieces to a staging region 112, according to some embodiments. A gravity-fed stack 802 includes a number of work pieces 804 in a storage region from which a work piece 804a is removed from the bottom and transferred into staging region 112. An elevator stack 814 can be used to store a number of work pieces 804 in a storage region, from which a work piece 804c is removed from the top and transferred into staging region 112. A linear stack 812 can be used to store a number of work pieces 804 in a storage region, from which a work piece 804b is removed and linearly transmitted into staging region 112. Linear stack 812 can be implemented with conveyor belts, or any other linear transportation technique. Other delivery and/or storage systems 820, such as a pick and place, belt systems, vibratory surfaces, etc., and the like can be used.

Figure 9E:
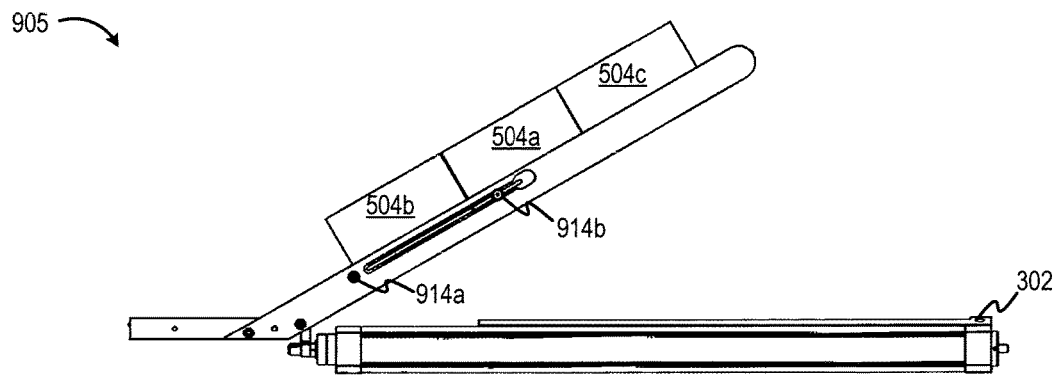

FIGS. 9A to 9J are diagrams illustrating various examples of a storage region, according to various embodiments. FIG. 9A is a perspective view 900 of a loader including a staging region 910 and a storing region 911. In some embodiments, storing region 911 is configured to store a number of work pieces and to interact with a surface of the work pieces to apply a frictional force to retard the rate of motion of the number of work pieces. The loader of FIG. 9A includes feeder members 912a and 912b that constitute storage region 911, guide members 312a and 312b constituting staging region 910, and a loader actuator 302 including a loader member 752. In some embodiments, feeder members 912a and 912b are oriented at an angle to one or more pairs of guide members or guide member surfaces. Feeder members 912a and 912b are configured to deliver a work piece to staging region 910 for a loading operation. According to various embodiments, the structure and/or functionality of feeder members need not be limited to those shown in FIGS. 9A to 9J. As used herein, the term "feeder member" can refer, at least in some embodiments, to one or more structures that can be configured to influence the direction of travel of a work piece. Feeder members need not be aligned at an acute angle with the horizon (e.g., an X-Y plane), and such feeder members can be aligned parallel to, for example, an X-Y plane. In some instances, a feeder member can includes one or more contacting surfaces for guiding work pieces during transition within or from a storage region. Further, a feeder member can includes one or more structures for imparting a locomotive force to a work piece to transition that work piece to or adjacent a staging region. Examples of feeder members configured to impart locomotive force include conveyor systems, pick-and-place equipment (e.g., pick-and-place robots), etc. As shown in FIGS. 9A to 9J, feeder members 912a and 912b are configured to provide contacting surfaces and associated guiding forces, while gravity provides forces sufficient to cause motion.

According to some embodiments, the loader of FIG. 9A includes a selector and a releaser, both of which cooperate to transfer one or more work pieces from storage region 911 to staging region 910. As used herein, the term "selector" can refer, at least in some embodiments, to a structure or a selecting device that is configured to select a work piece from a group of work pieces in storage region 911 for transport to the milling region. As used herein, the term "releaser" can refer, at least in some embodiments, to a structure or a releasing device that is configured to release other work pieces from a group of work pieces in storage region 911 for transport along feeder members 912a and 912b to engage the selector (i.e., the next work piece engages the select member). In the example shown, the selector and the releaser can be implemented as a select actuator 914a and a release actuator 914b, respectively. Therefore, a selector and a releaser are not limited to respective select actuator 914a and a release actuator 914b. Further, the terms "selector" and "releaser" can be used interchangeably with the respective terms "selecting device" and "releasing device." A selecting device or a releasing device can be electromagnetic-based (e.g., implementing a solenoid), pneumatic-based, hydraulic-based, or based on any other like technology suitable for implementing the functions of selecting and releasing.

Select actuator 914a includes a selecting member configured to select a work piece from a group of work pieces in storage region 911 for transport to the milling region. The selecting member engages the work piece to prevent it from sliding down. Under control of a controller, one of control signals 915 can be delivered to select actuator 914a to disengage the selecting member from the work piece, thereby enabling it to slide to staging region 910. Release actuator 914b includes a release member configured to release other work pieces from the group of work pieces for transport along feeder members 912a and 912b to engage the select member (i.e., the next work piece engages the select member). The releasing member engages the other work pieces to prevent, for example, all but a selected number of work pieces from sliding down. Under control of a controller, another one of control signals 915 can be delivered to release actuator 914b to disengage the release member from the other work pieces, thereby enabling them to slide to the selecting member. Note that the structures and techniques of selecting and releasing described in FIGS. 9A to 9E are merely illustrative of one example of facilitating a loading operation. Thus, the structures and techniques of selecting and releasing are not intended to be limiting. Other implementations of selection or releasing, or both, are possible.

FIG. 9B is an end view 901 for the loader, according to some embodiments. Feeder members 912a and 912b include contacting surfaces 913 for supporting the stored work pieces. In this example, selecting member 916a of select actuator 914a is disposed in a plane 997b at which a work piece resides until it is selected. In this configuration, selecting member 916a impedes travel of work pieces. When selected, selecting member 916a retracts and enables at least one work piece to advance. Further, releasing member 916b of release actuator 914b is disposed in a plane 997a at which the stored work pieces reside until they are released. In this configuration, releasing member 916b impedes travel by work pieces. When selected, releasing member 916b retracts and enables the other work pieces to advance.

FIG. 9C is a side view 903 for the loader, according to some embodiments. In this example, the distance 921 between select actuator 914a and release actuator 914b can be adjusted for the length of the work pieces. According to some embodiments, storage region 911 and/or feeder members 912a and 912b can pivot about pivot point 919 to adjust angle ("A") 923. Angle 923 can adjust the amount of frictional forces that feeder members 912a and 912b can impart unto a work piece to either increase or decrease the rate at which the work pieces slides. For example, a less steep angle 923 may be used with heavier work pieces to reduce the impact forces on other work pieces, select actuator 914a, release actuator 914b, or any other structure. As another example, a steeper angle 923 may be used for lighter work pieces. Note, too, that other structures can be implemented to modify the rate at which work pieces slide down feeder members 912a and 912b (e.g., by using rollers or wheels that have variable resistances that can be controlled to modify the rate at which work pieces slide). FIG. 9D is a top view 904 for the loader, according to some embodiments. While FIG. 9D depicts staging region 910 including guide members 312a and 312b, which can be formed as part of the loader. In other examples, guide members associated with milling tables can constitute staging region 910.

Figure 9F:
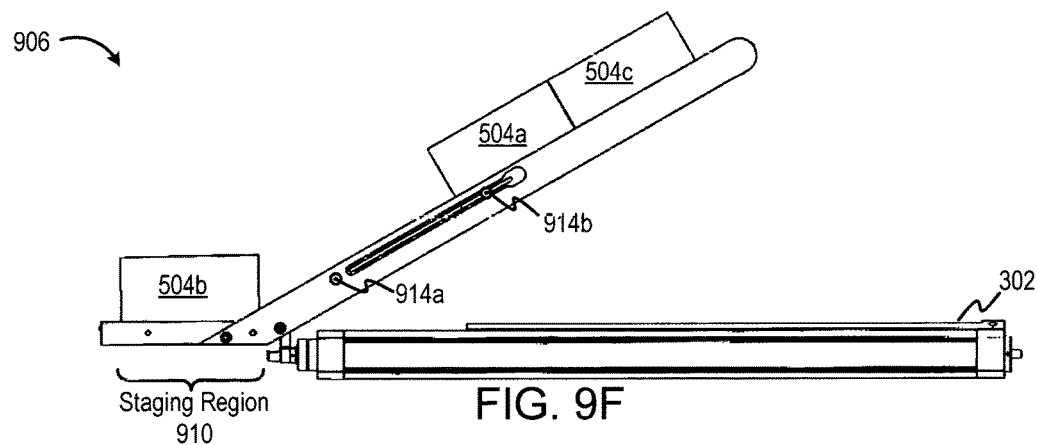
Figure 9G:
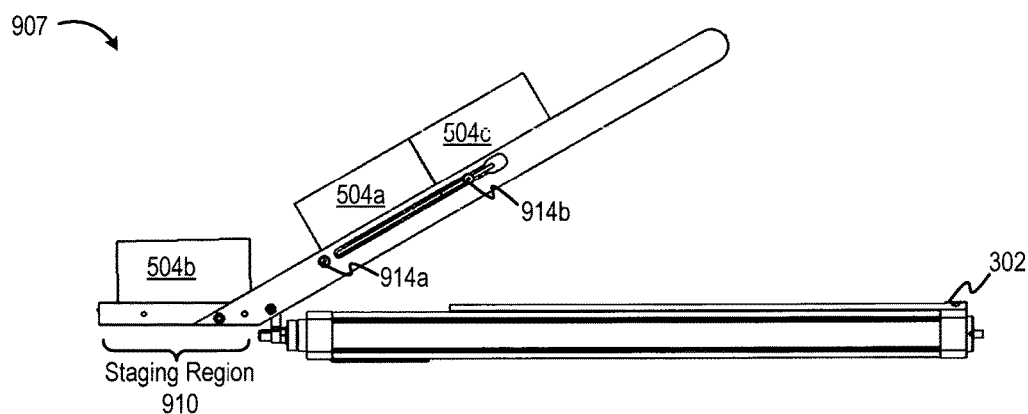
Figure 9H:
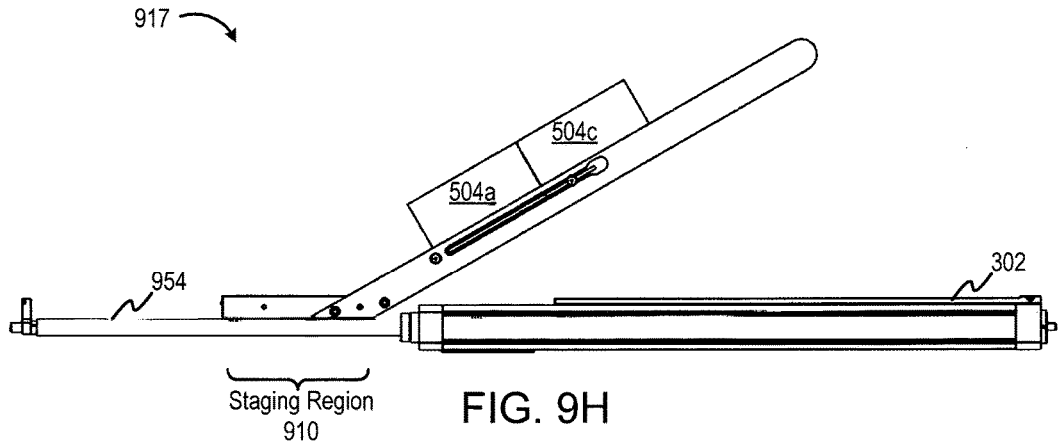
Figure 9I:
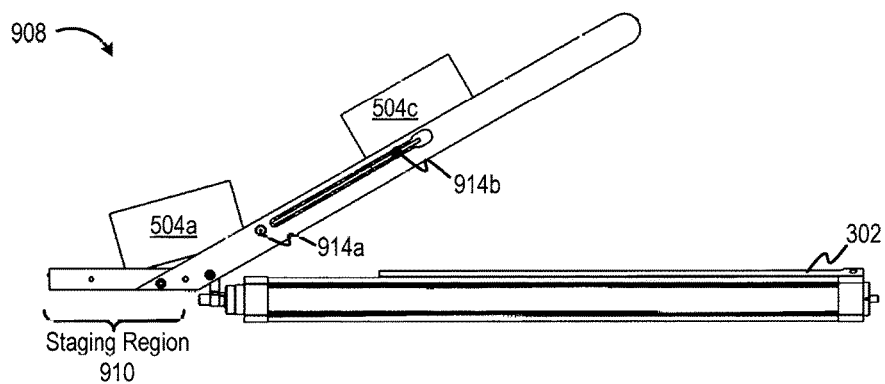
Figure 9J:
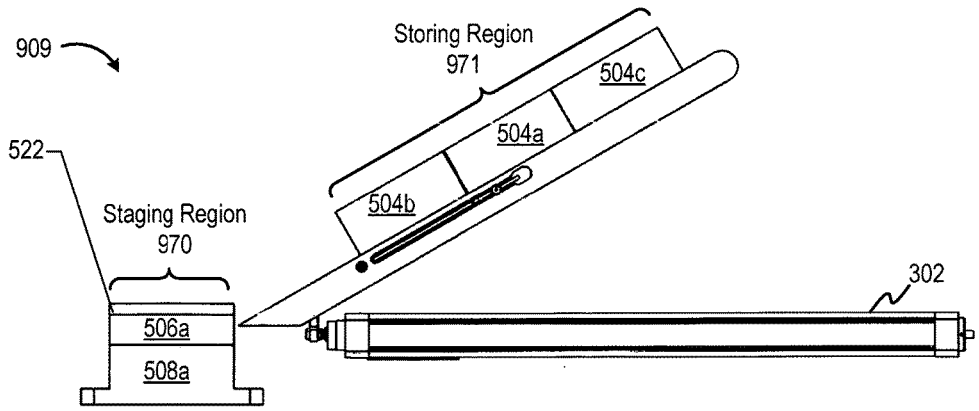

FIGS. 9E to 9J are diagrams illustrating various implementations of select actuators and release actuators, according to various embodiments. FIG. 9E is a side view 905 for the loader in which work pieces 504b, 504a and 504c are disposed in the storage region. In particular, the selecting member of select actuator 914a is engaging work piece 504b, thereby preventing it from sliding to staging region 910. Further, the releasing member of release actuator 914b is engaging work piece 504a, thereby preventing it and work piece 504c from sliding. FIG. 9F is a side view 906 for the loader in which work piece 504b has been selected for loading, while work pieces 504a and 504c remain disposed in the storage region. In particular, the selecting member of select actuator 914a disengages work piece 504b, thereby enabling it to slide to staging region 910. Further, the releasing member of release actuator 914b remains engaged with work piece 504a, thereby preventing work pieces 504a and 504c from sliding. FIG. 9G is a side view 907 for the loader in which work piece 504b has been selected for loading, and work pieces 504a and 504c have been released. In this case, the releasing member of release actuator 914b disengages with work piece 504a, thereby enabling it and work piece 504c to slide to the selecting member of select actuator 914a, which prevents work pieces 504a and 504c from sliding to staging region 910. FIG. 9H is a side view 917 for the loader in which work piece 504b has been engaged by loader member 954 for transport to a milling table (not shown). Work pieces 504a and 504c remain engaged to selecting member of select actuator 914a, which prevents work pieces 504a and 504c from sliding to staging region 910. FIG. 9I is a side view 908 for the loader in which work piece 504a has been selected for loading, while work piece 504c remains disposed in the storage region. In particular, the selecting member of select actuator 914a disengages work piece 504a, thereby enabling it to slide to staging region 910. Further, the releasing member of release actuator 914b remains engaged with work piece 504c, thereby preventing it from sliding. FIG. 9J is a side view 909 for the loader in which a staging region 970 is associated with guide members 522 on a vice body 508a. According to some embodiments, guide members 312a and 312b can be omitted, whereby work pieces slide from storing region 971 to staging region 970, which can be associated with a structure configured to move to a milling site.

Figure 10:
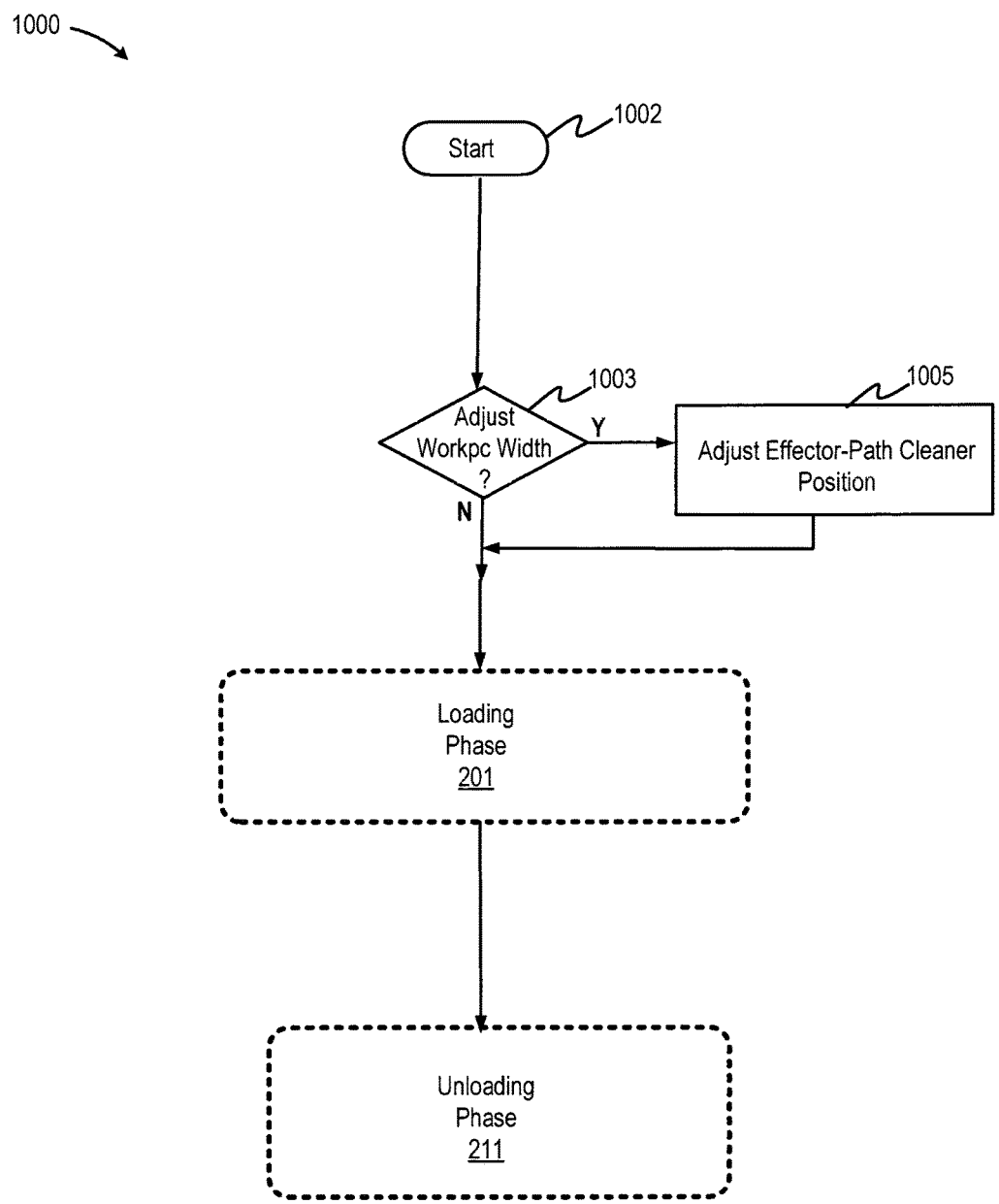
FIG. 10 is a diagram depicting an example of a flow to automatically load and unload work pieces, according to various embodiments.

FIG. 10 is a diagram depicting an example of a flow to automatically load and unload work pieces, according to various embodiments. Flow 1000 starts at 1002 and includes a loading phase 201 and an unloading phase 211 of FIG. 2 preceded by a determination at 1003 as to whether to adjust a loader configuration based on the need to adjust the width of a work piece. If so, flow 1000 passes to 1005, but if not, flow 1000 continues. At 1005, the spatial positions of the feeder members are adjusted to approximate a dimension of the work piece, and the effector is concurrently aligned with a plane passing through a medial portion of a work piece stored in the feeder members.

Figure 11A:
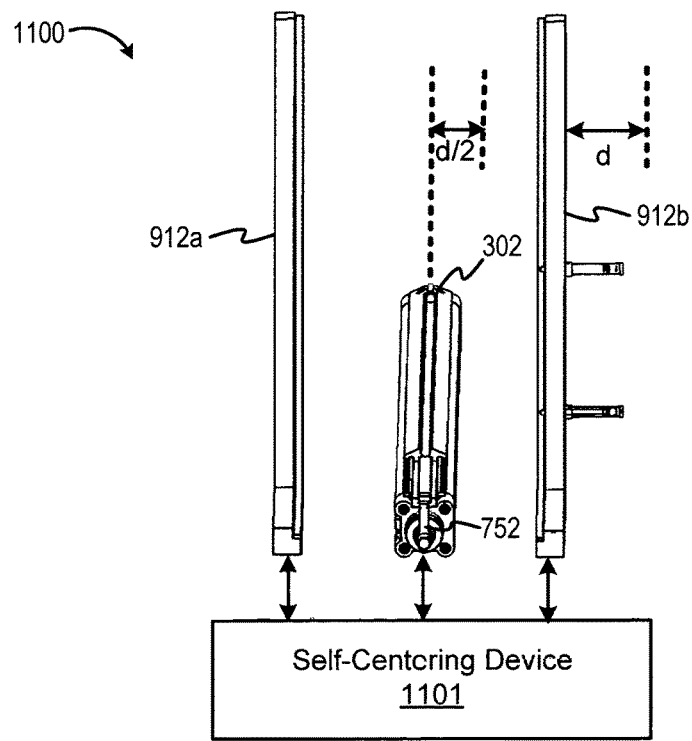
FIGS. 11A to 11D are diagrams illustrating various examples of a self-centering device, according to various embodiments.
Figure 11B:
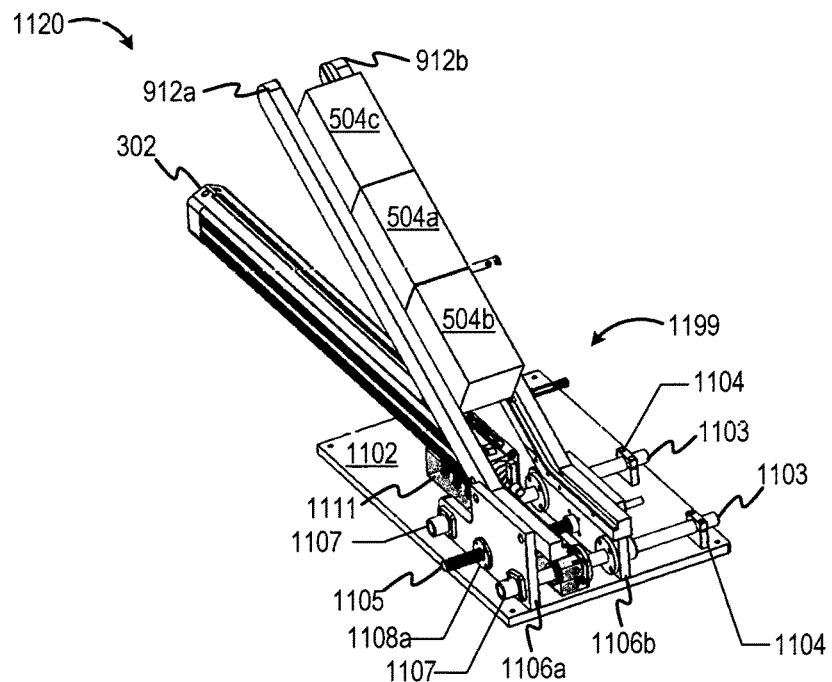
Figure 11C:
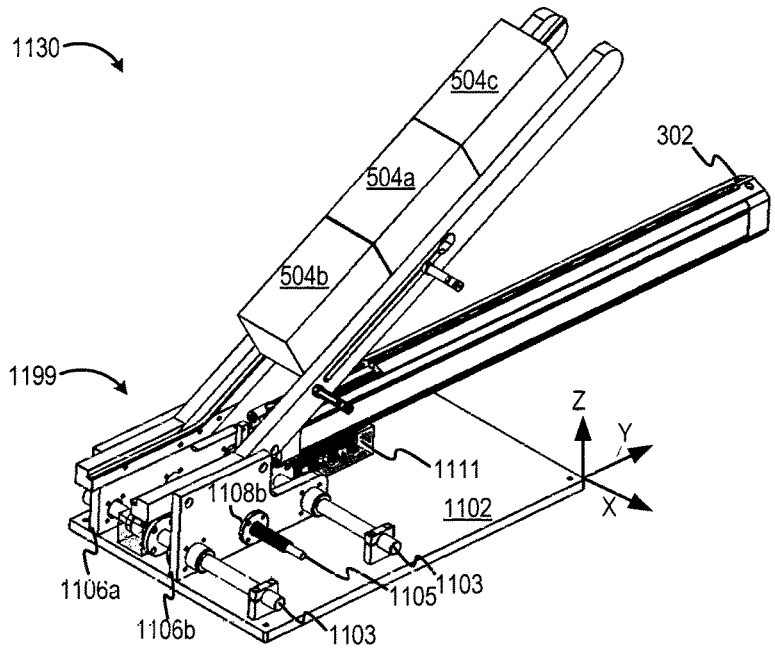
Figure 11D:
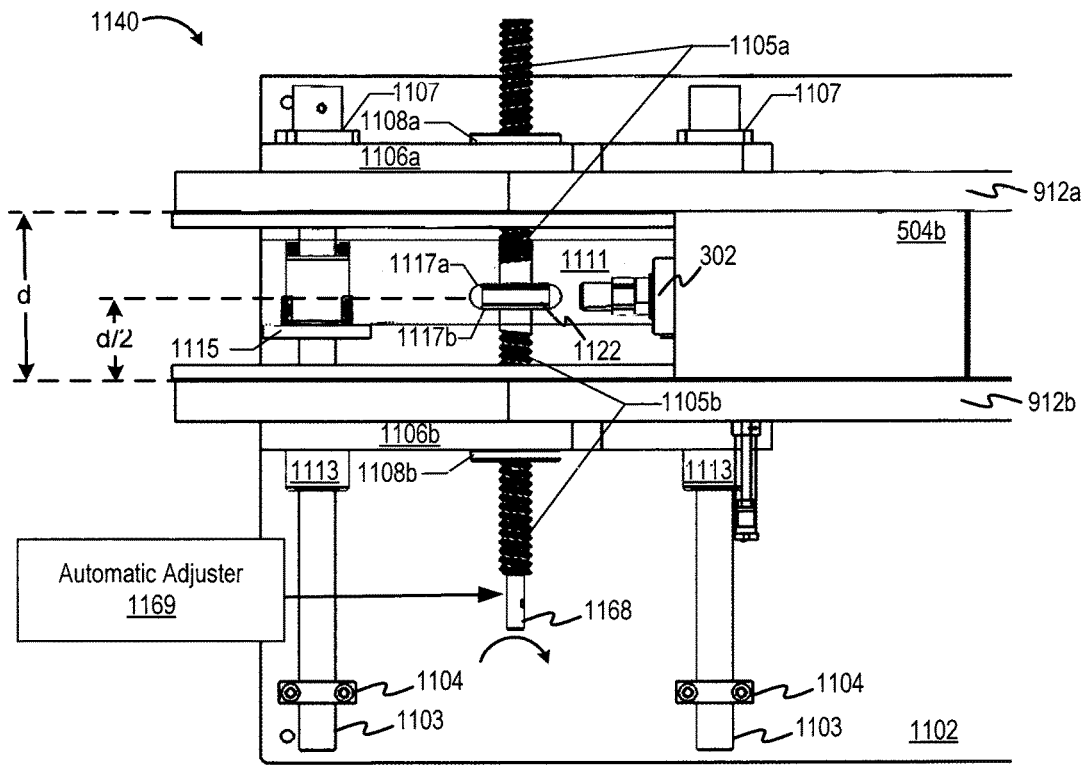

FIGS. 11A to 11D are diagrams illustrating various examples of a self-centering device, according to various embodiments. FIG. 11A is diagram 1100 depicting a self-centering device 1101 configured to self-center either effector 752 or loader 302, or both, as the feeder members are adjusted to adapt to a dimension (e.g., a width) of a work piece, according to some embodiments. Self-centering device 1101 is configured to adjust the position of effector 752 by half a distance ("d/2") in the direction that, for example, a feeder member 912b is adjusted. In some embodiments, self-centering device 1101 is configured to adjust the position of effector 752 at approximately one-half the distance between a pair of feeder members as the distance is modified. The position of effector 752 is configured to engage a medial portion of a work piece. Further, self-centering device 1101 is configured to determine that the distance between the pair of feeder members is adjusted by an amount, and to adjust the position of effector 752 by approximately one-half the amount (e.g., when feed member 912a is configured to be stationary or immobile). When effector 752 also is configured to deliver a cleaning force, self-centering device 1101 facilitates an equivalent cleaning forces to be applied to guide members when the cleaning forces originate about one-half between the feeder members or rails. According to some embodiments, self-centering device 1101 includes an adjustment member configured to impart motion to effector 752 and to at least one feeder member (e.g., feeder member 912b or its constituent components), whereby the adjustment member is configured to displace effector 752 at a rate that is one-half (or approximately one-half) the rate that the feeder member is moving. While FIGS. 11B to 11D depict an adjustment member as screw member 1105, an adjustment member (and its constituent components) need not limited to translating rotational motion into linear motion of the effector 752 and a feeder member. Rather, an adjustment member can include one or more structures that are configured accept a force to move effector 752, and optionally, a feeder member. Examples of adjustment members include a lever coupled to push-pull rods to convey motion at the ratio of d/2 to d, as well as systems of pulleys and cables (e.g., block and tackle) designed to product displacements of d/2 for effector 752 and d for a feeder member 912b, among other examples, including rails slideably coupled via, for example, ball bearings, whereby one point of a first rail is displaced at two times the rate of another point on the second rail.

FIG. 11B is a first perspective view 1120 depicting elements for a self-centering device 1199, according to a specific embodiment. In the example shown, feeder member 912a is affixed to side member 1106a, which, in turn, is affixed to plate 1102. Similarly, feeder member 912b is affixed to side member 1106b, which, in turn, is slideably coupled to slide members 1103 affixed to plate 1102 by fasteners 1104. The other ends of slide members 1103 are affixed via fastening structures 1107 to side member 1106a. Actuator support member 1111 is configured to support loader 302, whereby actuator support member 1111 is slideably coupled to slide members 1103. A screw member 1105 is coupled via a screw nut 1108a to side member 1106a. FIG. 11C is a second perspective view 1130 depicting additional elements for a self-centering device 1199, according to a specific embodiment. The other end of screw member 1105 is slideably coupled via screw nut 1180b to side member 1106b.

FIG. 11D is a top view 1140 depicting elements for self-centering device 1199, according to a specific embodiment. In the example shown, side member 1106b is slideably coupled via coupling members 1113 to slide members 1103, and actuator support member 1111 is slideably coupled to slide members 1103 via coupling members 1115 on each of slide members 1103. Screw member 1105 is rigidly coupled to a collar member 1122 approximately at the mid-point of the length of screw member 1105. In operation, self-centering device 1199 is configured to receive a rotational force to turn screw member 1105 coupled to feeder members 912a and 912b and effector 752. Screw member 1105 is a double-ended screw with one set of threads 1105a at one end being reverse threaded (i.e., oppositely threaded) in relation to another set of threads 1105b at the other end. Therefore, for each rotation of screw member 1105 at turn site 1168, collar 1122 experiences one-half rotation of screw member 1105. As such, for unit of distance, d, that feeder member 912b moves in relation to feeder member 912a, collar 1122 exerts a force on either side 1117a or 1117b to move actuator support member 1111 by one-half the distance, d/2. Effector 752 moves in concert with actuator support member 1111. Thus, effector 752 remains approximately one-half the distance between feeder members 912a and 912b. In some embodiments, an automatic adjuster 1169 can be configured to automatically turn screw member 1105 to adjust the width between feeder members 912a and 912b.

Figure 12A:
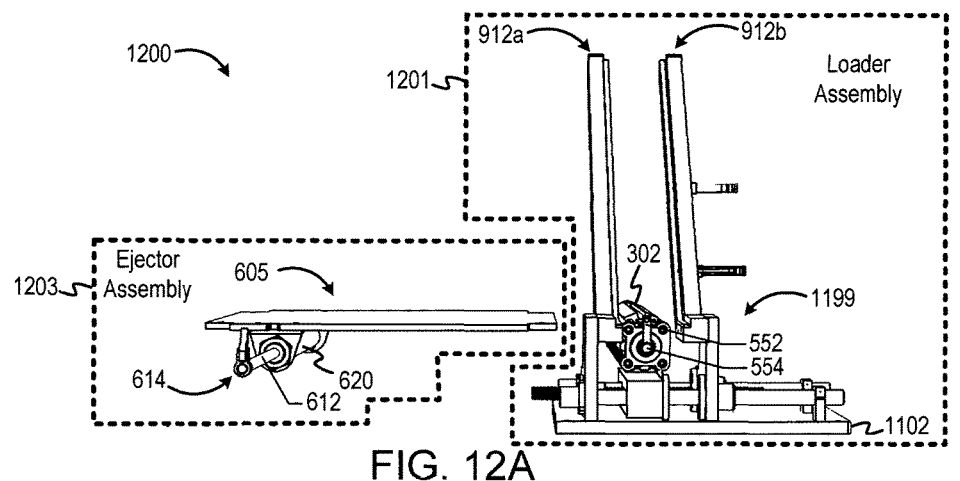
FIGS. 12A to 12C are diagrams illustrating an example of a loader and an unloader combined in a unit, according to various embodiments.
Figure 12B:
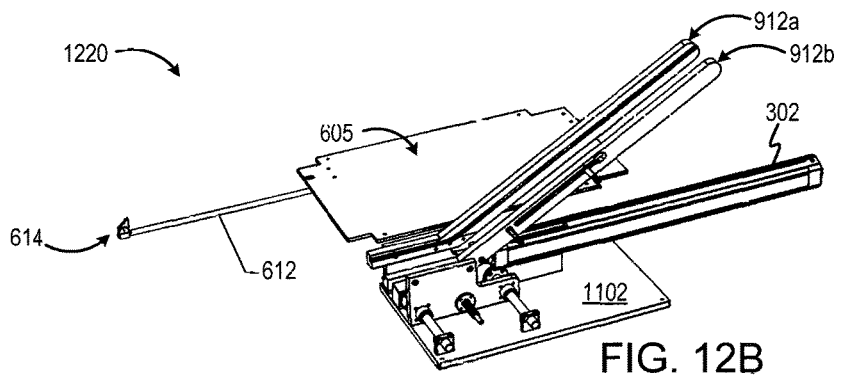
Figure 12C:
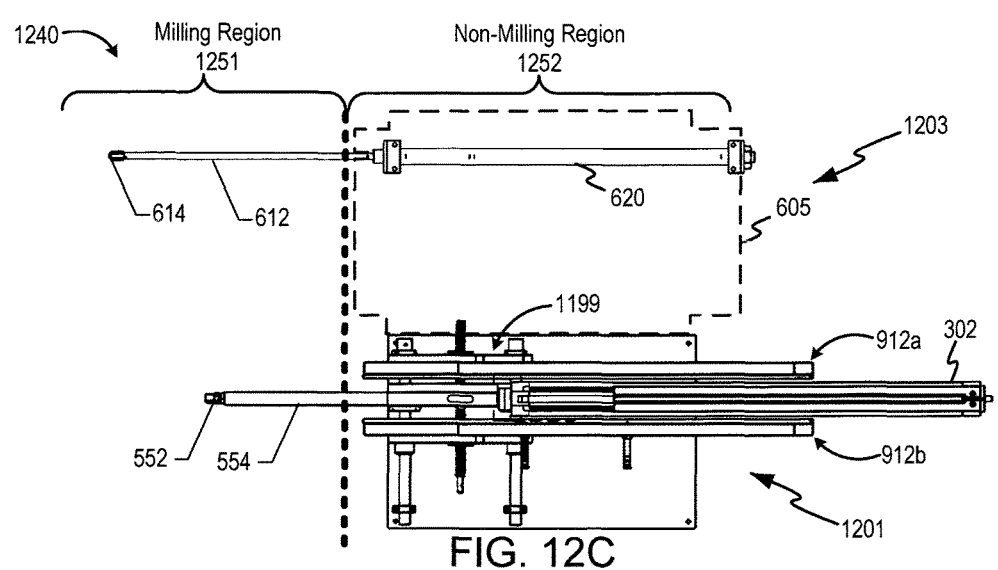

FIGS. 12A to 12C are diagrams illustrating an example of a loader and an unloader combined in a unit, according to various embodiments. FIG. 12A is a diagram 1200 depicting a loader assembly 1201 configured to cooperate with an ejector assembly 1203. In this example, ejector assembly 1203 includes an ejector actuator 620, an ejector member 612 and an engagement member 614. Ejector assembly 1203 also includes an ejection platform 605. Loader assembly 1201 can include feeder members 912a and 912b, a loader 302, a self-centering device 1199 on a plate 1102, a loader member 554, and an effector 552. FIG. 12B is a perspective view 1220 depicting a loader assembly 1201 configured to be co-located with an ejector assembly 1203. In this example, ejector member 612 and engagement member 614 are configured to extend in a direction parallel to the loader member. FIG. 12C is a top view 1240 depicting a loader assembly 1201 configured to be co-located with an ejector assembly 1203. In this example, loader assembly 1201 and ejector assembly 1203 are co-located in a non-milling region 1252, such as a buffered region. Further, ejector member 612 and engagement member 614 are configured to extend in a direction parallel to loader member 554. Thus, ejector member 612 and loader member 554 can extend into milling region 1251. In some embodiments, an engagement member 614 can traverse in a plane common with effector 552. According to alternative embodiments, ejector assembly 1203 and loader assembly 1201 can be oriented radially relative to a milling site so that ejector member 612 and loader member 554, respectively, extend into milling region 1251 at a non-parallel angle with respect to each other.

Figure 13A:
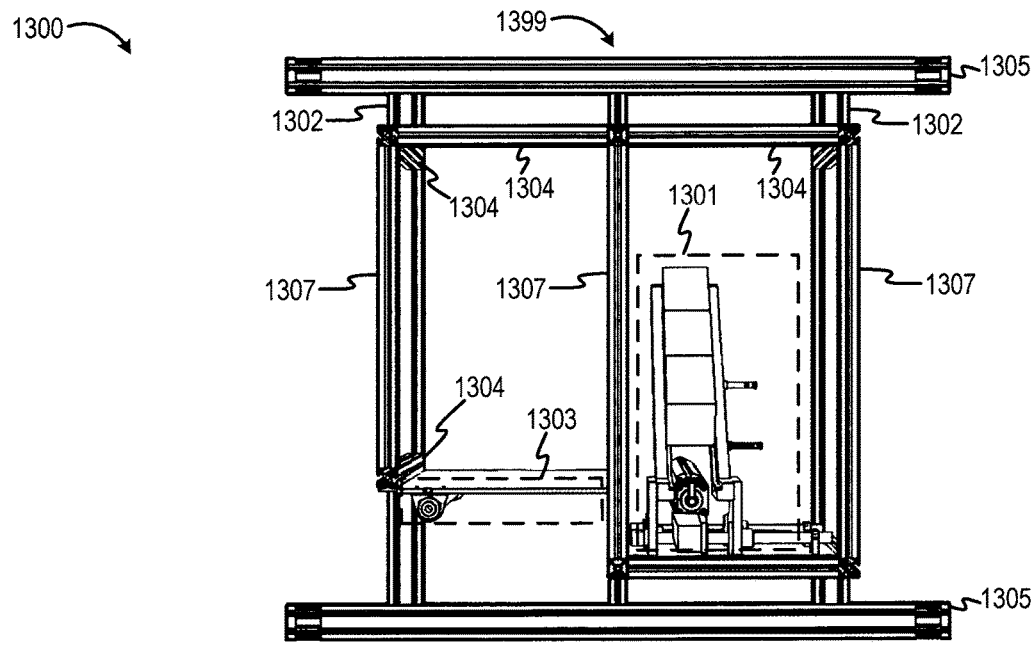
FIGS. 13A to 13B are diagrams illustrating an example of a unit including a combination of a loader and an unloader, according to various embodiments.
Figure 13B:
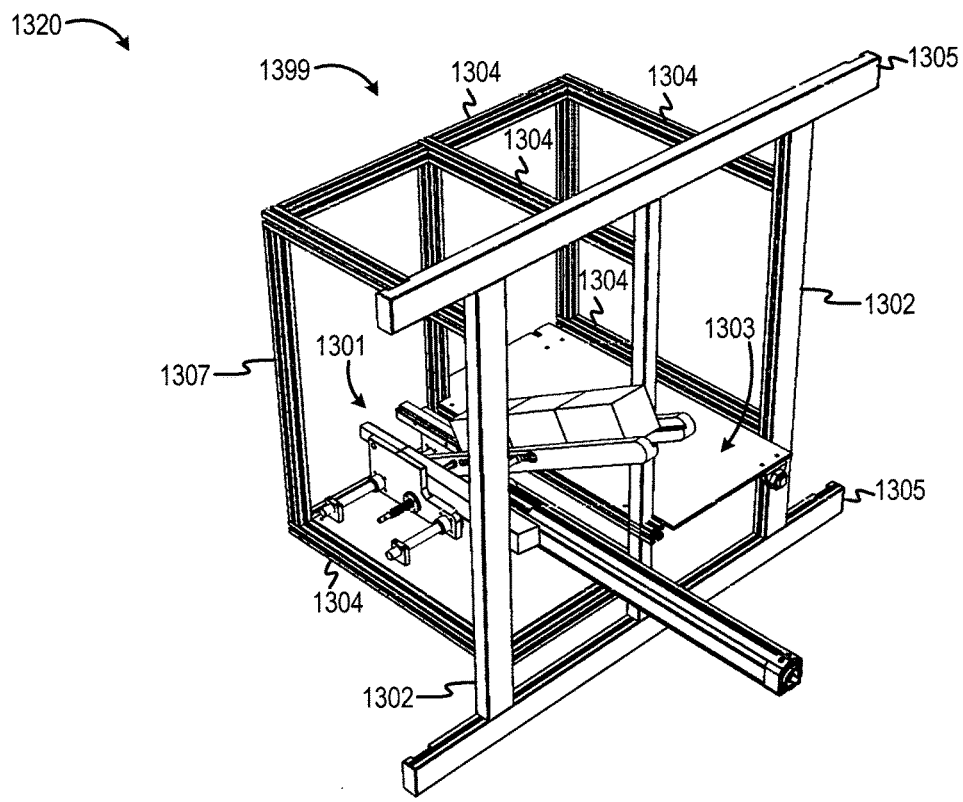

FIGS. 13A to 13B are diagrams illustrating an example a unit including a combination of a loader and an unloader, according to various embodiments. FIG. 13A depicts a unit 1399 that includes various frame members 1302, 1304, 1305, and 1307 that are coupled to each other to form a combined unit (including ejector assembly 1303 and loader assembly 1301). FIG. 13B is a perspective view 1320 of unit 1399. In some embodiments, one or more of frame members 1302, 1304, 1305, and 1307 are configured to couple to a milling machine.

Figure 14A:
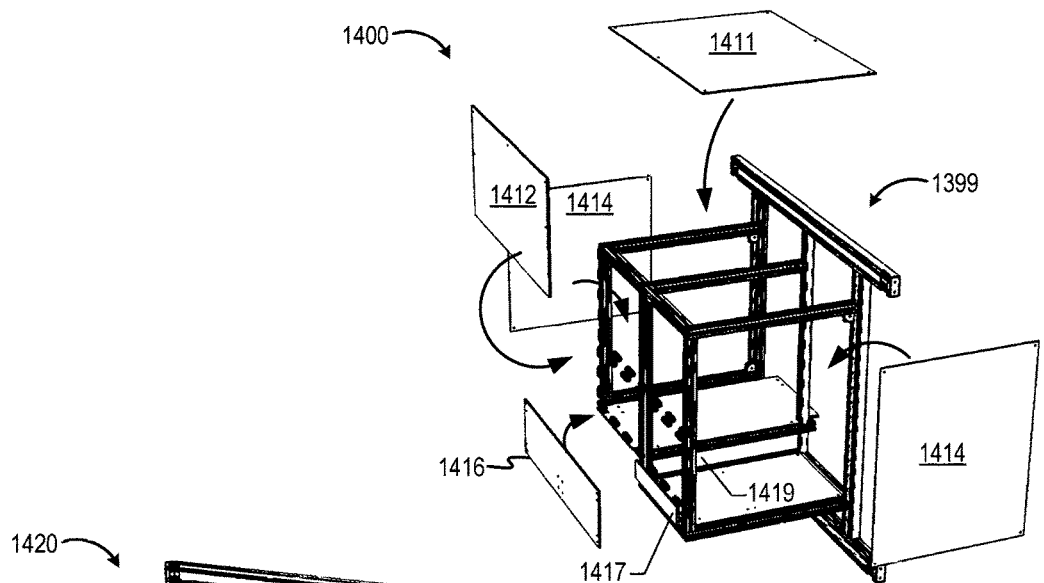
FIGS. 14A to 14C are diagrams illustrating an example of an enclosed loader and unloader unit, according to various embodiments.
Figure 14B:
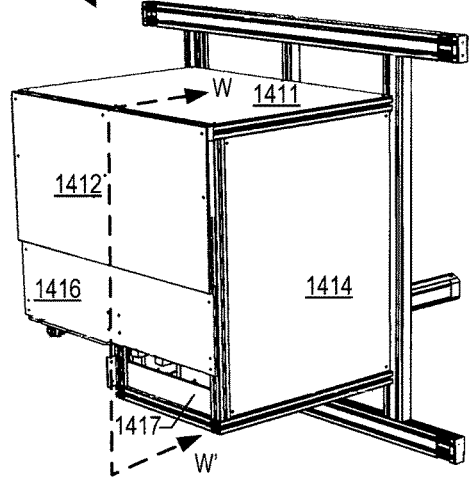
Figure 14C:
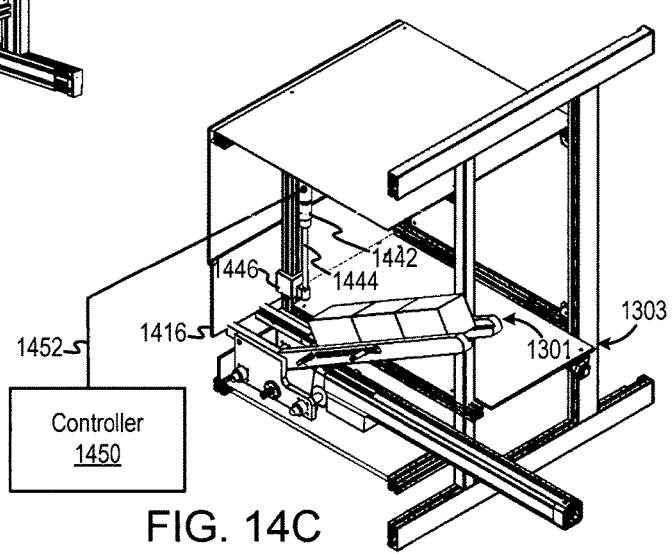

FIGS. 14A to 14C are diagrams illustrating an example an enclosed loader and unloader unit, according to various embodiments. FIG. 14A is a diagram 1400 depicting the use of panels or shields, including doors, to form a buffered region inside unit 1399. Panels 1411, 1412, 1414, 1417, and 1419 are configured to deflect or otherwise keep material from entering the interior of unit 1399. FIG. 14B is a perspective view 1420 of an enclosed unit 1399. A cross section view W-W' is shown next. FIG. 14C is a cross section view ("W-W'") 1440 to show loader assembly 1301 and ejector assembly 1303. As shown, door 1416 is coupled to a bracket 1446, which, in turn, is coupled via a piston 1444 to a door actuator 1442. Controller 1450 is configured to control door actuator 1442 to either open or close door 1416. Note that the components depicted as part of a door assembly (e.g., a piston 1444, a bracket 1446, etc.) are optional and represent an example of various implementations for opening and closing door 1416.

Figure 15A:
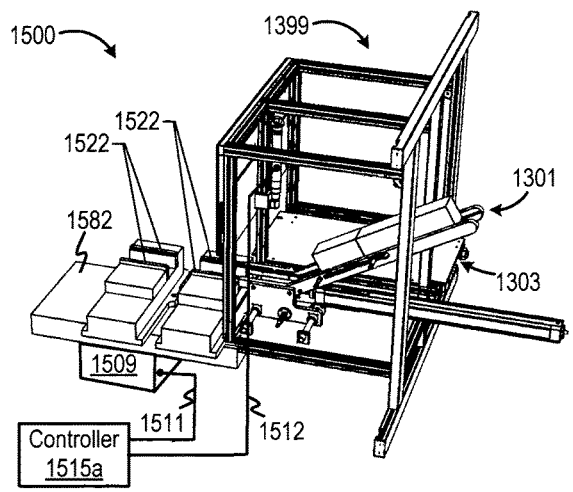
FIGS. 15A to 15F are diagrams illustrating various states of operation of a unit responsive to control signals from a controller, according to various embodiments.
Figure 15B:
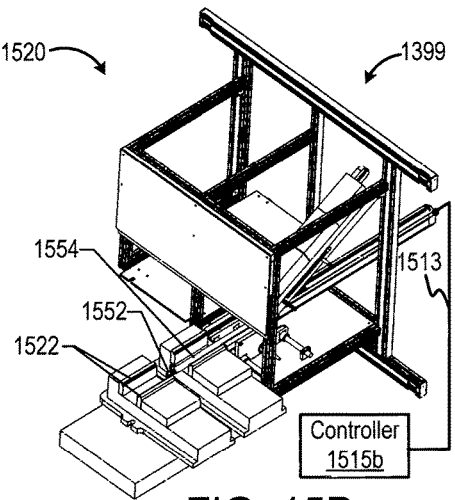
Figure 15C:
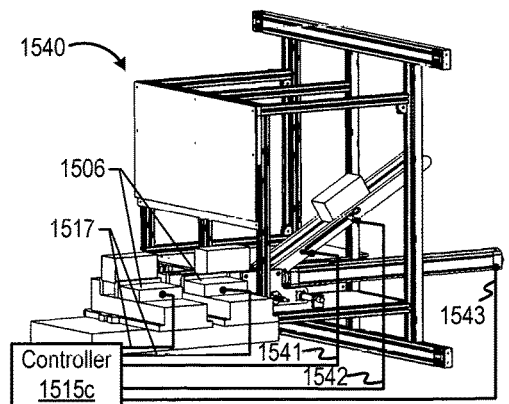

FIGS. 15A to 15F are diagrams illustrating various states of operation of a unit responsive to control signals from a controller, according to various embodiments. FIG. 15A is a diagram 1500 depicting unit 1399 in an initial state in which guide members 1522 are aligned with loader assembly 1301 to receive work pieces during a loading operation. Controller 1515a is configured to transmit signals 1511 to control table-moving device 1509 (e.g., milling table) to move milling table 1582 to a certain location adjacent to unit 1399. Also, controller 1515a is configured to transmit control signals via path 1512 to open the door. FIG. 15B is a diagram 1520 depicting unit 1399 in an cleaning state in which an effector 1552 is moving between guide members 1522 and 1554 to clean the surfaces thereof. Controller 1515b is configured to transmit signals via 1513 to control effector 1552. FIG. 15C is a diagram 1540 depicting unit 1399 in a loading state in which an effector is moving between guide members to load work pieces. Controller 1515c is configured transmit signals via 1543 to control effector 1552. Controller 1515c is also configured to transmit control signals via paths 1541 and 1542 to a select actuator and a release actuator, respectively. Next, controller 1515c can also transmit control signals via paths 1517 to close the guide members to clamp the work pieces.

Figure 15D:
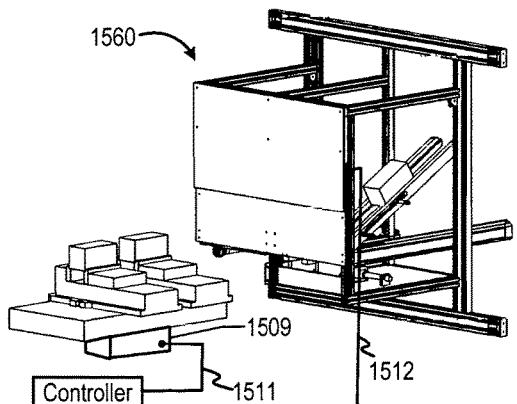
Figure 15E:
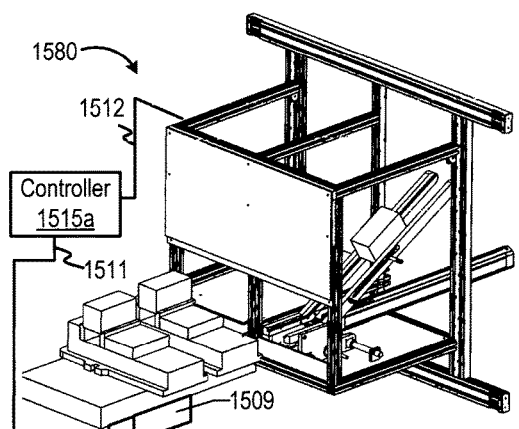
Figure 15F:
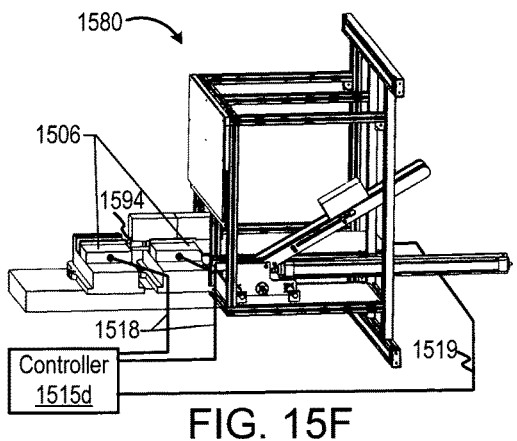
Figure 18A:
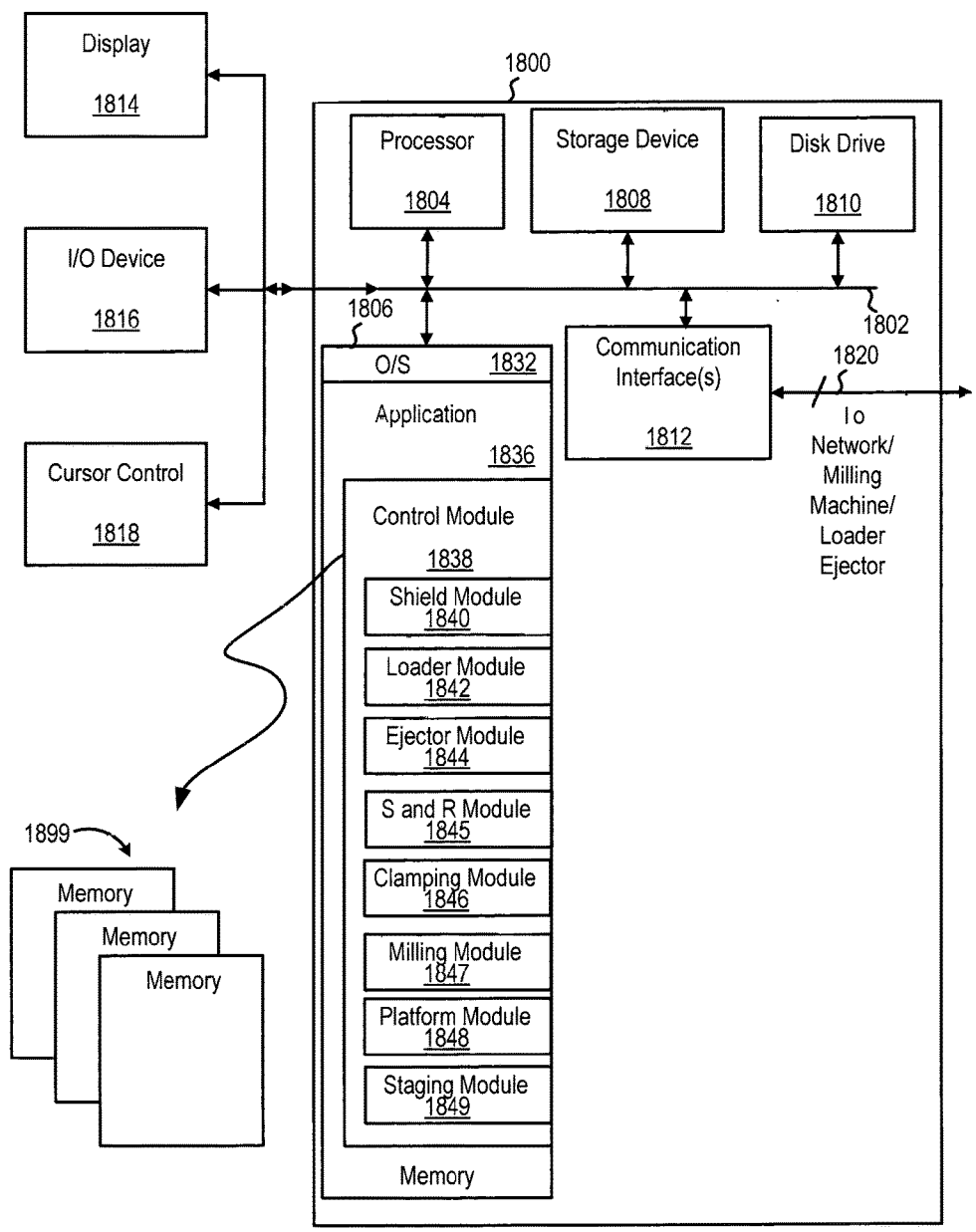
FIGS. 18A to 18B illustrate an exemplary computer system and/or controllers suitable to automatically loading or unloading work pieces, among other things, according to at least one embodiment.

FIG. 15D is a diagram 1560 depicting unit 1399 in a milling state in which guide members 1522 are moved to a milling site for contact with a milling tool. Controller 1515a is configured to transmit signals 1511 to control table-moving device 1509 (e.g., milling table) to move milling table 1582 adjacent to the milling tool. Also, controller 1515a is configured to transmit control signals via path 1512 to close the door. FIG. 15E is a diagram 1580 depicting unit 1399 prior to an ejection state. Controller 1515a is configured to transmit signals via 1511 to control table-moving device 1509 (e.g., milling table) to move milling table 1582 to a certain location adjacent to the ejection assembly. Also, controller 1515a is configured to transmit control signals via path 1512 to open the door. FIG. 15F is a diagram 1580 depicting unit 1399 in an ejecting state in which an engagement member 1594 on an ejection member is moving between guide members to unload work pieces. Controller 1515d is configured transmit signals via path 1519 to control an ejector actuator. Controller 1515d is also configured to transmit control signals via paths 1518 to open guide members 1506 to release the work pieces. In various embodiments, controllers 1515a to 1515d can be implemented as a processor and memory for executing instructions to implement specific functionalities. One or more of controllers 1515a to 1515d can be implemented in a controller for a milling machine (e.g., a controller integrated or otherwise associated with the milling machine). One or more controllers 1515a to 1515d can be distributed as individual controllers over the milling machine and the loader assembly, and be distributed external to either the milling machine and the loader assembly, or both. Controllers 1515a to 1515d can be implemented in the aggregate as a single controller in either a milling machine, in a loader assembly, or external to both the milling machine and the loader assembly. For example, controllers 1515a to 1515d can be implemented as shown in FIG. 18A.

Figure 16A:
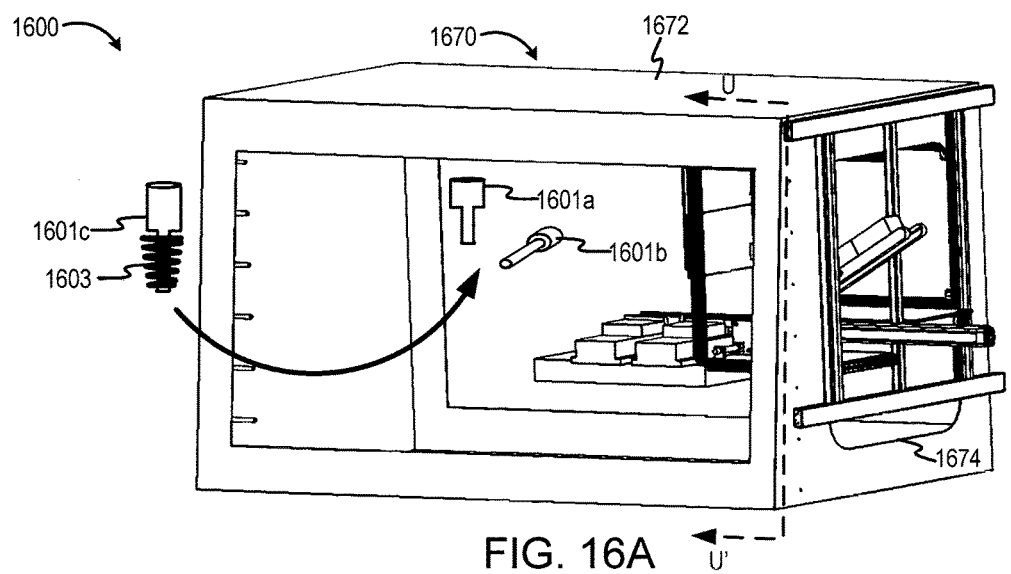
FIGS. 16A to 16B are diagrams illustrating an example a loader and unloader unit integrated with a milling machine, according to various embodiments.
Figure 16B:
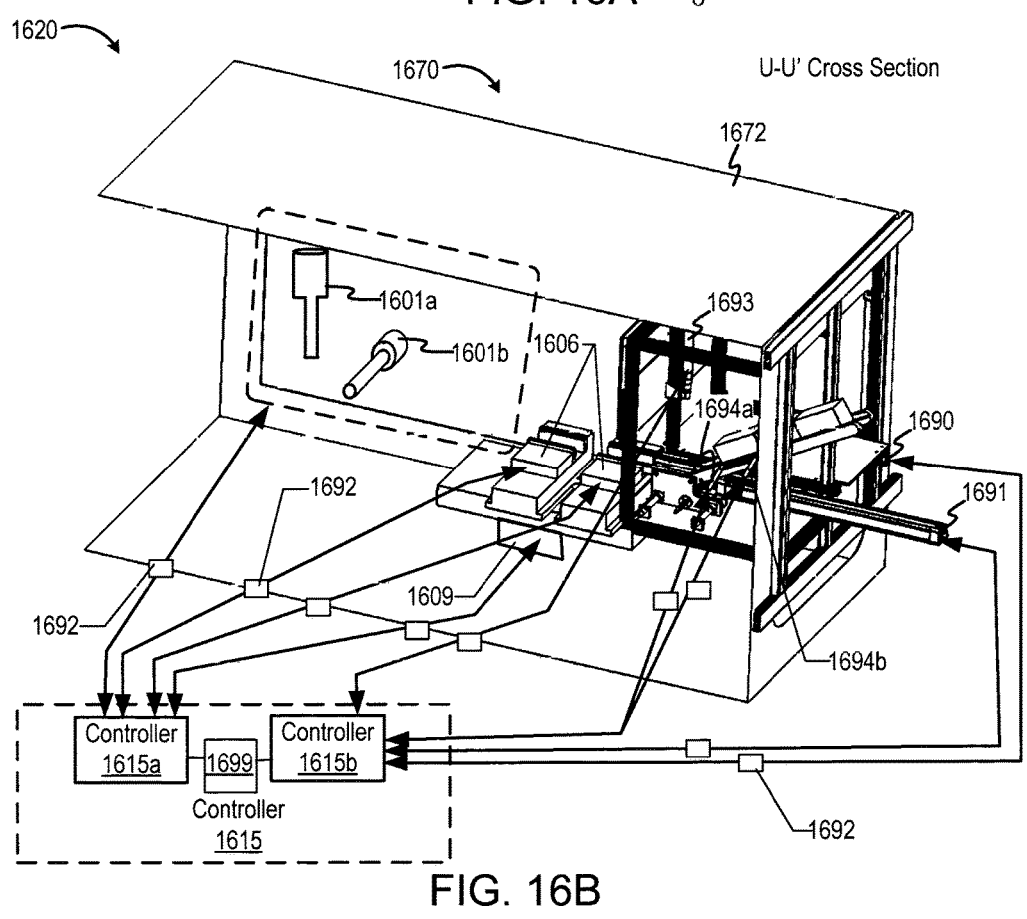

FIGS. 16A to 16B are diagrams illustrating an example the integration of a loader and unloader unit with a milling machine, according to various embodiments. FIG. 16A is a diagram 1600 depicting a milling machine 1670 including an enclosure 1672. Milling machine 1670 can include tool 1601a, if a vertical milling machine, or tool 1601b, if a horizontal milling machine. Enclosure 1672 encloses an interior region and can include access ports 1674 in which portions of or all of the loader and unloader unit can be disposed in enclosure 1672. In one embodiment, a specific machine tool 1601c can be implemented in relation with the unloading and loading techniques described herein. Machine tool 1601c includes a spring 1603 to operate to stores energy in spring 1603 as it is lowered and pressed against a work piece, until a certain distance when the spring is released to deliver an "impulse" of force that drives work pieces into guide members when operating as clamping members. In one embodiment, a controller operates via control signals to apply a low amount of pressure to a work piece, with machine tool 1601c applying the impulse force at one or more points on a work piece. Then, the controller can apply via control signals a higher amount of pressure to immobilize the work piece. Milling machine 1670 includes an automatic tool changer (not shown) that is configured to automatically change machine tools, such as machine tool 1601c, under the control of controller 1615 (or portions thereof).

FIG. 16B is a cross section view ("U-U") 1620 of milling machine 1670 of FIG. 16A depicting various elements under control of a controller 1615 or one or more controllers 1615a and 1615b. For example, controller 1615a can exchange signals via interfaces 1692 to control tools 1601a or 1601b, to control clamping devices 1606 to clamp or release work pieces, and to control a table-moving device 1609 to move work pieces between loader 1691 and ejector 1690. Controller 1615b is configured to exchange signals via other interfaces 1692 to activate actuator 1693 to open and close the door, to control select actuator 1694a and release actuator 1694b to facilitate the loading operation, to control loader 1691 to facilitate loading and cleaning operations, and to control ejector 1690 to facilitate unloading of work pieces. In some embodiments, controller 1615a executes instructions based on ladder logic. For example, controller 1615a can be implemented as one or more programmable logic controllers ("PLCs")Interface 1699 can be a software interface (e.g., an API) communicatively disposed between that controllers 1615a and 1615b so that they can communicate with each other.

Figure 17A:
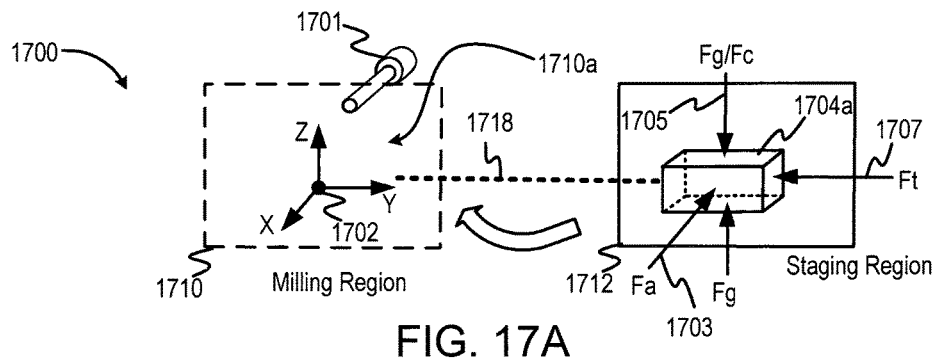
FIGS. 17A to 17C are diagrams illustrating an example of loading horizontal milling machines, according to various embodiments.
Figure 17B:
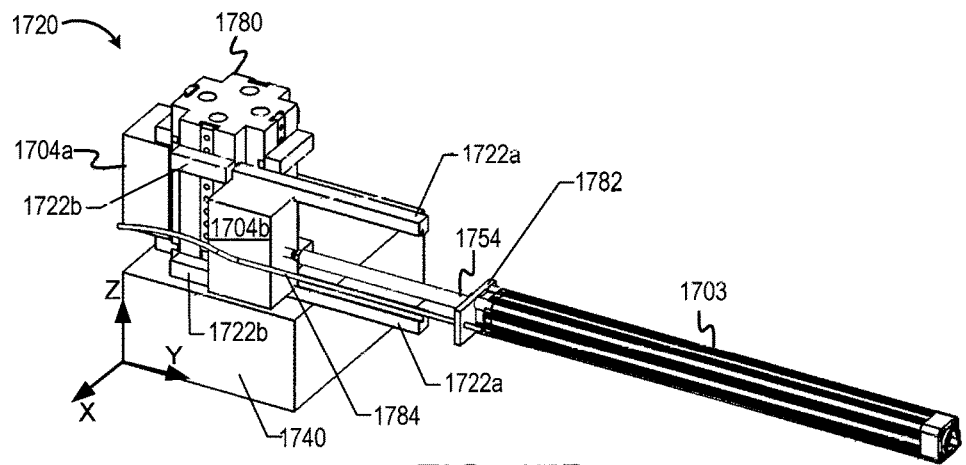
Figure 17C:
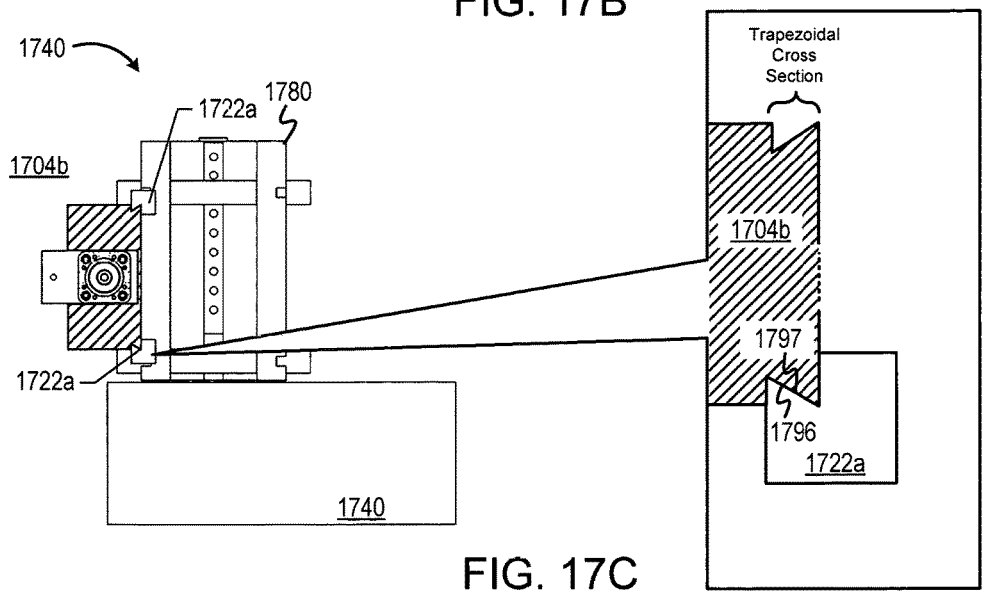

FIGS. 17A to 17C are diagrams illustrating an example of loading horizontal milling machines, according to various embodiments. FIG. 17A is a diagram 1700 depicting a tool 1701 oriented to perform horizontal milling operations at one or more milling sites 1702 in milling region 1710. According to one embodiment, the loader is configured to engage work piece 1704a at staging region 1712 and apply a loading force ("Fl") 1707 to urge work piece 1074a, for example, via path 1718 into milling region 1710. Further, one or more guiding force(s) ("Fg") 1705 can be applied to work piece 1704a to guide work piece 1704a along path 1718 during its travel. In some embodiments, one or more guiding force(s) 1705 can be applied by one or more guide structures (not shown). The guide structures providing the one or more guiding force(s) 1705 can be associated with or located in either milling region 1710 or staging region 1712, or both. In some cases, a coupling force ("Fc") can be substituted for one or more guiding forces to cause movement. An example of coupling force is that generated by a pick and place-like loader (not shown). In at least one embodiment, path 1718 resides in a plane parallel to (or substantially parallel) to the direction of gravity. Therefore, a restraining member (not shown) can be configured to provide for the application of an applied force ("Fa") 1703. Applied force 1703 enables work piece 1704a to contact the guide members to maintain the application of one or more guiding force(s) 1705, according to some examples. Work piece 1704a may be transported to a region 1710a between milling site 1702 and tool 1701 for performing milling operations.

FIG. 17B is a diagram 1720 depicting a loader 1703 configured to perform loading operations in horizontal milling machines, according to some embodiments. Diagram 1720 includes a tombstone 1780, and indexer 1740 configured to rotate tombstone 1780. In this example, a restraining member is implemented as a resilient force-generating member 1784 (e.g., a spring) coupled via spring bracket 1782 to loader 1703. Loader member 1754 is configured to apply a loading force to work piece 1704b for transport via guide members 1722a to guide members 1722b, which can operate as a pair of clamping members.

FIG. 17C is an end view 1740 depicting an example of guide members, according to one embodiment. End view 1740 includes a tombstone and end views of guide members 1722a contacting with work piece 1740. As shown, work piece 1704b is configured to include sides 1797 of a trapezoidal cross section, and guide members 1722a includes sides 1796. Sides 1797 and 1796 engage to maintain contact between work piece 1704b and guide members 1722a. Note that FIGS. 17A to 17C depict an example of automated loading in a horizontal milling machine, whereby other embodiments are not limited to those examples shown.

FIG. 18A illustrates an exemplary computer system suitable to automatically loading or unloading work pieces, among other things, according to at least one embodiment. In some examples, computer system 1800 can be used to implement computer programs, applications, methods, processes, or other software to perform the above-described techniques and to realize the structures (e.g., controller structures or portions thereof) described herein. Computer system 1800 includes a bus 1802 or other communication mechanism for communicating information, which interconnects subsystems and devices, such as one or more processors 1804, system memory ("memory") 1806 (that can distributed externally in memory 1899, for example), storage device 1808 (e.g., ROM), disk drive 1810 (e.g., magnetic or optical), communication interface 1812 (e.g., a modem, Ethernet card, or any other interface configured to exchange data with a communications network or to control a fabrication machine), display 1814 (e.g., CRT or LCD), input device 1816 (e.g., keyboard), and pointer cursor control 1818 (e.g., mouse or trackball). In one embodiment, pointer cursor control 1818 invokes one or more specialized commands that can configure one or more of the following: loading operations and unloading operations.

According to some examples, computer system 1800 performs specific operations in which processor 1804 executes one or more sequences of one or more instructions stored in system memory 1806. Such instructions can be read into system memory 1806 from another computer readable medium, such as static storage device 1808 or disk drive 1810. In some examples, hard-wired circuitry can be used in place of or in combination with software instructions for implementation. In the example shown, system memory 1806 includes modules of executable instructions for implementing an operation system ("O/S") 1832, an application 1836, and a control module 1838, which, in turn, can implement a shield module 1840 to control opening and closing a deflector shield, a loader module 1842 to control loading and cleaning phases, an ejector module 1844 to control extraction of work pieces, a select actuator and release actuator ("S and R") module 1845 to facilitate the loading process, a clamping module 1846 to control the clamping and release of work pieces, a milling module 1847 to control milling operations, and a platform module 1848 to control articulation of a platform movement device, each of which can provide functionalities described herein. Also, system memory 1806 can include staging module 1849 to control the relative position between a staging region and either a storage region or a milling region. For example, staging module 1849 can include executable instructions to raise or lower guide members of a staging region to receive a work piece from a storage region (e.g., pivot or rotate guide members between a first orientation to receive a work piece and a second orientation to load the work piece). The constituent components of system 1800 can be aggregated into one structure or can be distributed in various structures, such as over various computing systems or devices. For example, processors and memories can constitute a controller, whereby executable instructions of one or more of the modules depicted in FIG. 18 can be implemented in memory to perform, in combination with a processor, one or more of the functionalities described herein. In other examples, the depicted modules can share functionalities and/or structures to perform various techniques of a loader assembly and a ejector assembly (e.g., generate similar control signals). In some instances, the functions of the modules shown in FIG. 18 can be distributed in logic for a milling machine, in a controller for a loader assembly (and/or an ejector assembly), or external to either a milling machine or a loader assembly, or both.

The term "computer readable medium" refers, at least in one embodiment, to any medium that participates in providing instructions to a processor for execution. Such a medium can take many forms, including but not limited to, non-volatile media, volatile media, and transmission media. Non-volatile media includes, for example, optical or magnetic disks, such as a disk drive or the like. Volatile media includes dynamic memory, such as a system memory or the like. Transmission media includes coaxial cables, copper wire, and fiber optics, including wires that comprise a bus, or other any other medium thought which to convey information (e.g., through liquids or gas, where different pressures represents different data or information). Transmission media can also take the form of electromagnetic, acoustic or light waves, such as those generated during radio wave and infrared data communications. Transmission media can also include gases, whereby gasses of different pressures can represent a signal.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, time-dependent waveforms, or any other medium from which a computer can read instructions.

In some examples, execution of the sequences of instructions can be performed by a single computer system, or can be distributed over multiple processors and computer systems. According to some examples, two or more computer systems 1800 coupled by a communication link (e.g., links to LAN, PSTN, or wireless network) can perform the sequence of instructions in coordination with one another. A computer system can transmit and receive messages, data, and instructions, including program code (i.e., application code) through communication link 1820 and communication interface 1812. Received program code can be executed by processor 1804 as it is received, and/or stored in disk drive 1810, or other non-volatile storage for later execution. In one embodiment, system 1800 (or a portion thereof) can be integrated into a milling machine or distributed throughout milling machines and loader assemblies.

In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. In some embodiments, the above-described techniques can be implemented in ladder logic or equivalent executable instructions. For example, one or more structures and/or functions of controller 1800 can be implemented as one or more programmable logic controllers ("PLCs"), or other equivalent controllers and/or with other equivalent programmable hardware or logic. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. These can be varied and are not limited to the examples or descriptions provided.

Figure 18B:
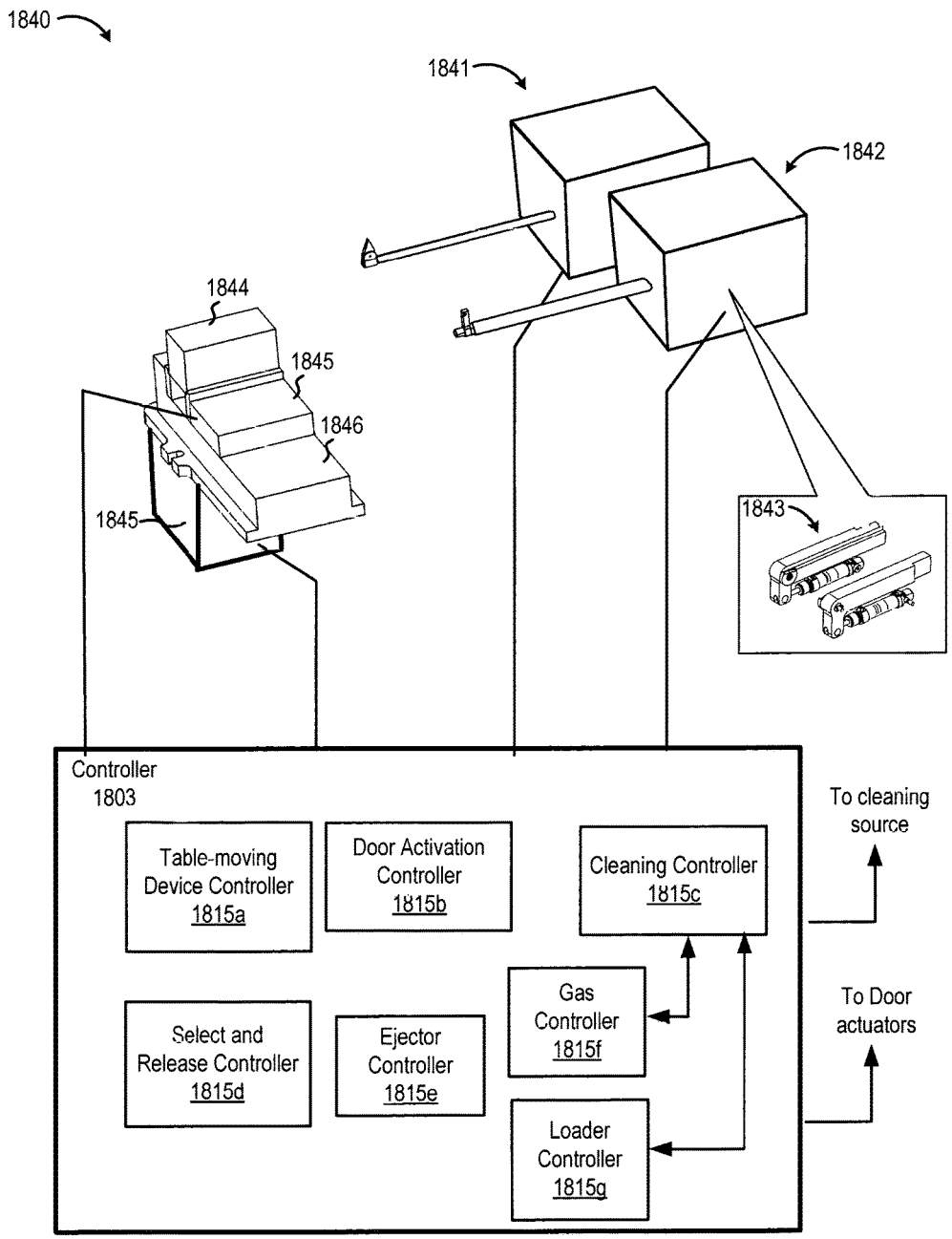

FIG. 18B illustrates an example of a controller suitable to automatically load or unload work pieces, among other things, according to at least one embodiment. Diagram 1840 depicts a controller 1803 configured to transmit and receive signals to an ejector assembly 1841, a loader assembly 1842, a moveable milling table 1845 and clamping jaws 1845 of a vise 1846. Controller 1803 includes various controllers and logic, which can be implemented in hardware or software, or a combination thereof. Examples of the controllers included in controller 1803 include controllers 1515*a* to 1515*d* of FIGS. 15A to 15F, or controller 1615 of FIG. 16, among other descriptions herein of the functionalities and structures of controllers. The constituent components of controller 1803 can be aggregated into one structure or can be distributed in various structures. Various controllers herein can share functionalities (e.g., generate similar control signals). Table-moving device controller 1815*a* is configured to generate control signals to move milling table 1845 to position guide members. Door activation controller 1815*b* is configured to generate control signals to open and close door(s) and/or deflection shields. Cleaning controller 1815*c* is configured to generate cleaning control signals. For example, a gas controller 1815*f* can generate control signals to open and close a valve for applying a pressurized gas to an effector, and can also activate loader controller 1815*g* to generate control signals to active a loader for displacing the effector during the cleaning phase. Select and Release controller 1815*d* is configured to generate control signals to select a work piece for advancement to a staging region and to release other work pieces in a storage region in preparation for staging. Ejector controller 1815*e* is configured to generate control signals to eject a milled work piece from a milling region. In some embodiments, controller 1803 can be configured to coordinate operation of the constituent controllers. Also, controller 1803 can generate staging control signals to control operation of guide members 1843 (e.g., generate staging control signals to activate actuator to pivot an end of guide members 1843 between a first orientation adjacent a storage region and a second orientation adjacent an effector for loading).

Figure 18C:
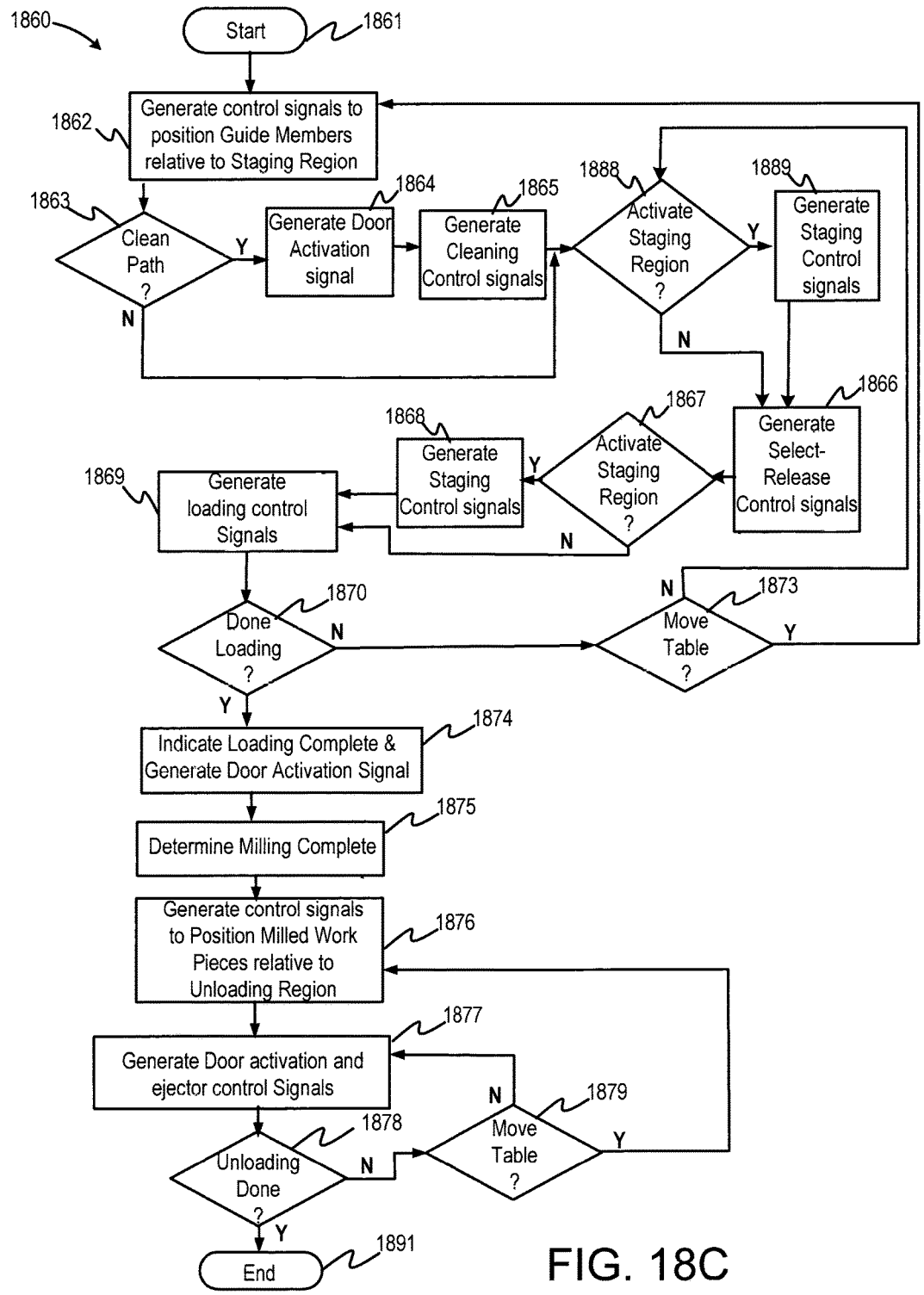
FIG. 18C illustrates an exemplary flow by which a controller can automatically load or unload work pieces, among other things, according to at least one embodiment.

FIG. 18C illustrates an exemplary flow by which a controller can automatically load or unload work pieces, among other things, according to at least one embodiment. Flow 1860 starts at 1861. At 1862, control signals are generated to position guide members relative to a staging region. For example, table-moving control signals can be generated to cause a milling table to acquire a position adjacent the staging region. A determination at 1863 is made whether to clean a path. If so, flow 1860 moves to 1864 at which a door activation signal is generated to open a deflector shield, thereby providing access between the milling region and a loader assembly. At 1865, cleaning control signals are generated. For example, control signals turn on or off the application of pressurized gas to an effector and can activate a member that displaces the effector along the path. A determination at 1863 not to clean a path can be made when, for example, a second work piece, such as work piece 504*a* of FIG. 5C is loaded subsequent to loading work piece 504*b* of FIG. 5C. A cleaning phase in this case may have been performed prior to loading work piece 504*b*.

Figure 25A:
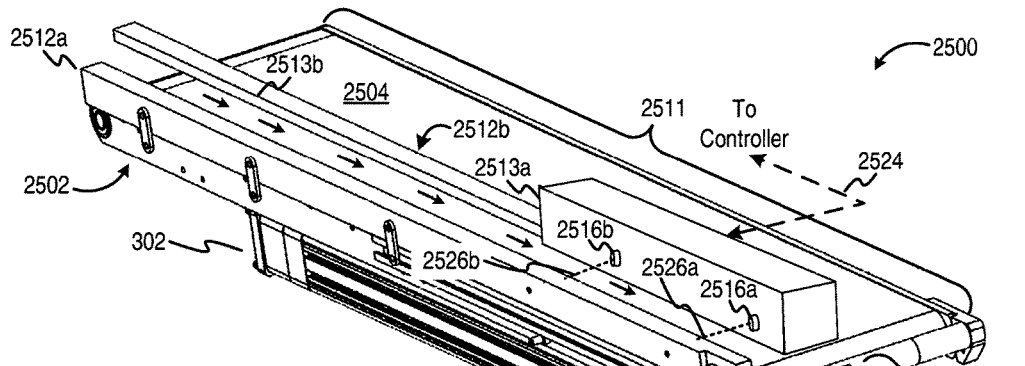
FIGS. 25A to 25D are diagrams illustrating various examples of a storage region with one configuration, according to various embodiments.

Returning to 1865 of FIG. 18C, and subsequent to a cleaning phase, a determination at 1888 is made whether to activate a staging region or its components (e.g., such as activating actuators 2519*a* and 2519*b* of FIG. 25A). If so, staging control signals are generated at 1889 to control operation of guide members by, for example, activating actuators to pivot the guide members to a first orientation adjacent a storage region so that, for example, the guide members can be oriented to receive a work piece from a storage region at 1866. If not, then no change need be necessary to orient the staging region to effector (e.g., FIG. 9E depicts an instance in which the staging region and the loader assembly need not be moved to load the work piece after receiving the work piece from a storing region.). For example, guide members are "raised" responsive to staging control signals generated at 1889.

At 1866, select-release control signals are generated to select a work piece for advancement to a staging region and to release other work pieces in a storage region in preparation for staging. Examples of selecting a work piece for advancement to a staging region, responsive to select control signals are shown in FIGS. 9F and 27C. A determination at 1867 is made whether to activate a staging region or its components. If so, staging control signals are generated to control operation of guide members by, for example, activating actuators to pivot the guide members from the first orientation adjacent a storage region to a second orientation adjacent an effector for loading. For example, guide members can be oriented to align the work piece on the guide members to an effector in preparation for loading. At 1868, staging control signals are generated to activate (e.g., rotate) guide members supporting a work piece thereupon to move the guide members into the second orientation for alignment with the effector. For example, guide members are "lowered" responsive to staging control signals generated at 1867. If a determination is at 1867 not to activate a staging region, then no change need be necessary to orient the staging region to effector (e.g., FIG. 9F depicts an instance in which the staging region and the loader assembly need not be moved to align the work piece to an effector.). At 1869, loading control signals are generated to activate a loader to load a work piece from the staging region to the milling region. At 1870, a determination is made whether loading operations are complete. If not, flow passes to 1873 to determine whether to move a milling table to load another row of work pieces into, for example, another set 599 of guide members as depicted in FIG. 5E.

Returning back to FIG. 18C, signals can be detected at 1874 indicating that loading is complete and door activation signals can be generated to close a deflector shield or door. Milling operations proceed and signals can be detected indicating that milling is complete at 1875. At 1876, control signals can be generated to move a milling table to position guide members and milled parts adjacent to an ejector region for storing milled parts ejected from the milling region. At 1877, control signals are generated to open a door to provide access between the milling region and a ejector assembly, and other control signals are generated to control an ejector assembly to eject the milled parts. At 1878, a determination is made whether unloading operations are complete. If not, flow passes through 1870 similar to 242 of FIG. 2. Flow 1860 terminates at 1891.

Figure 19A:
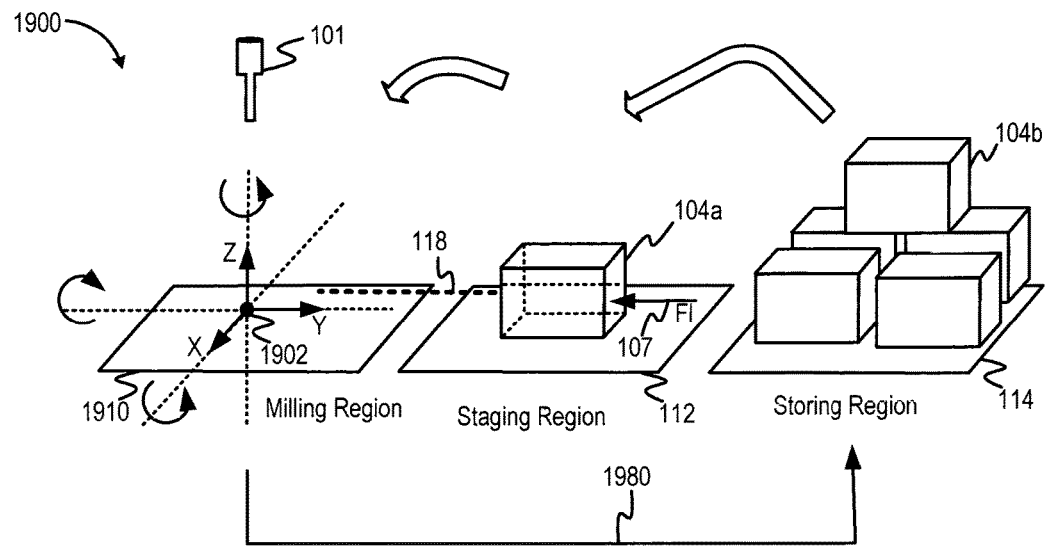
FIG. 19A is a diagram depicting an example of automated loading of a work piece, according to at least some embodiments.

FIG. 19A is a diagram 1900 depicting an example of automated loading of a work piece, according to at least some embodiments. Elements in FIG. 19A that have similar names or reference numbers as those elements in FIG. 1A can have (but need not have) similar functions and/or structures. In one example, a loader is configured to select a work piece 104*a* from a group of work pieces 104*b* stored in a storing region 114 for transport to a milling region 1910. Milling tool 101 is configured to perform machining operations on work pieces at a milling site 1902 in relation to a milling table 1910 in a milling region, which is a surface upon which a work piece is positioned for milling operations in a milling region. According to some examples, a milling site 102 can be associated with one or more points accessible by tool 101 for machining work pieces. Milling table 110 can be associated with positions in a milling machine accessible by a milling table, which can be any surface or platform configurable to move relative to milling tool 100. As shown, milling table 1920 can rotate or otherwise can orient about one or more of the X, Y and Z axes.

Similar to FIG. 1A, a loader can include a staging region 112 at which a selected work piece can be transported in preparation for loading to a destination in milling table 110, according to one embodiment. According to one embodiment, the loader is configured to engage work piece 104a at staging region 112 and apply a loading force ("Fl") 107 to urge work piece 104a, for example, on path 118 onto milling table 1910. In at least one embodiment, path 118 resides in a common plane (e.g., an X-Y plane). Note that while FIG. 19A depicts linear translation of work piece 104a from staging region 112 to milling table 1910, the various embodiments are not limited to linear displacement within a plane. As such, path 118 over which work piece 104a traverses can be three dimensional (e.g., can include a displacement in the Z-axis) or the like. In some embodiments, the path over which a work piece travels during an ejection phase need not be in the same plane as path 118. For example, a milled work piece can follow a path in a different plane, such as path 1980, which can be a plane parallel to the plane including path 118.

Figure 19B:
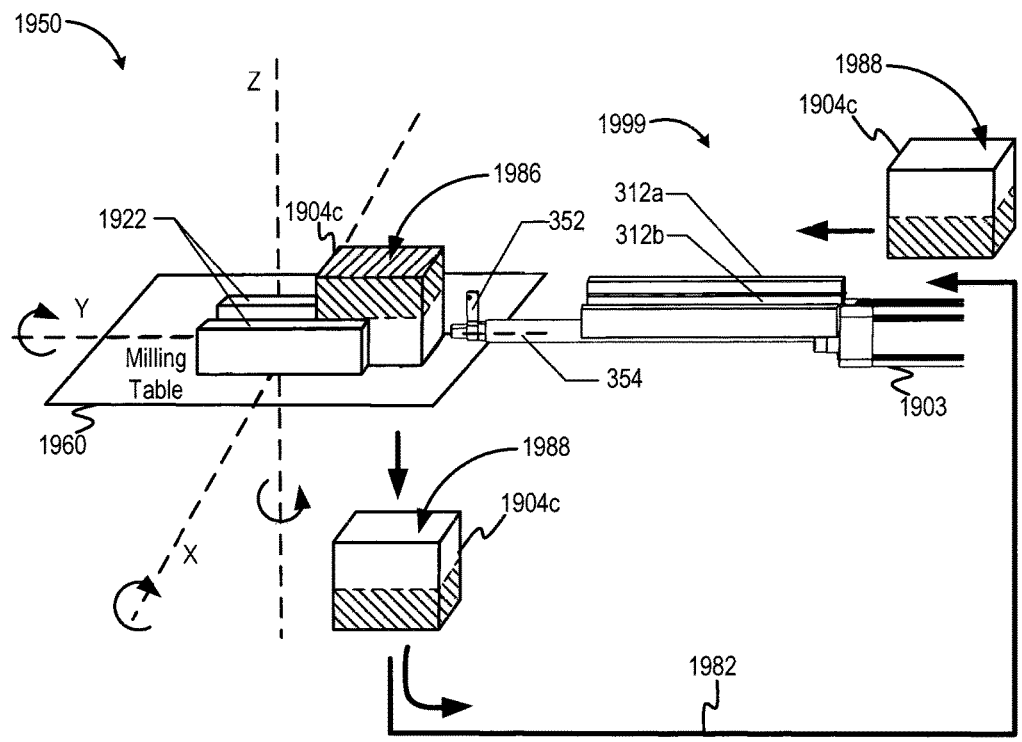
FIG. 19B is a diagram depicting another example of automated loading of a work piece, according to at least some embodiments.

FIG. 19B is a diagram 1950 depicting another example of automated loading of a work piece, according to at least some embodiments. A portion of a loader 1999 is shown to include a loader force-generation unit 1903 for driving or generating a force to apply on a loader member 352 to cause motion of loader member 352 (and other objects), and guide members 312a and 312b. In diagram 1950, loader 1999 is configured to transfer work piece to milling table 1960 as work piece 1904c. While effector 352 is shown as providing a force to 1904c in FIG. 19B, other implementations need not use effector 352 and can use load member 354 to directly apply loading force to move work piece 1904c. A work piece 1904c in milling table 1960 is clamped in a stationary position during milling operations when tool 101 contacts work piece 1904c. In the example shown, clamping members 1922 can be used to clamp work piece 1904c. In some embodiments, clamping members 1922 can be configured as guide members, or can be configured to include guide members to guide work pieces into clamping members 1922 (if clamping members 1922 is the destination), or to guide work pieces through to other clamping members (not shown) to provide for multiple work piece milling operations in milling table 1960.

As shown, milling table 1960 can rotate or otherwise can orient about one or more of the X, Y and Z axes to change the orientation of clamping members 1922. Thus, milling operations can be performed on work piece 1904c in any orientation to produce a milled work piece 1904c with milled portion 1986 (shown in cross-hatching). Milled portion 1986 can include a surface that is accessible by a milling tool (e.g., a surface unobstructed by milling table or surface 1960 or clamping members 1922). Further, milled work piece 1904c can be unloaded in any orientation within the X, Y, and Z space. In some embodiments, milling table 1960 can be rotated approximately 180 degrees about either the Y axis or X-axis such that milled portion 1986 is oriented toward a negative Z-direction (e.g., in the direction along which gravity is directed). In this position, pressure upon 1904c by clamping members 1922 can be reduced to enable gravity to unload work piece 1904c in a manner that work piece 1904c is released and rests on milled portion 1986, which is facing down. In this orientation, unmilled portion 1988 is facing the positive Z-direction. In at least one embodiment, work piece 1904c is transported via path 1982 to a spatial position at which work piece 1904c can be aligned to be engaged by loader member 354 or effector 352 (e.g., at a staging region). When, for example, work piece 1904c is introduced into guide member 312a and 312b, loader 1999 can urge work piece 1904c into clamping members 1922 so that unmilled portion 1988 is accessible to the milling tool. Therefore, according to various embodiments, a work piece 1904c can have each of its surfaces (or a predominant number of surfaces) accessible for machining.

FIGS. 20A to 20C depict milling surfaces for used with a loader, according to various embodiments. Diagram 2000 of FIG. 20A is a side view depicting clamping members 2107 arranged about a mounting structure, such as a tombstone 2011. Tombstone 2011 is coupled to an indexer 2013 configured to rotate clamping members 2107 about the X-axis, according to the example shown. Diagram 2020 of FIG. 20B is a top view depicting clamping members 2107 arranged about a mounting structure, or tombstone 2011. In this position, clamping members 2107 can be configured to align with a loader to receive a work piece (not shown). Examples of clamping members 2107 include Clamping Force Blocks KSP 160 manufactured by Schunk, GmbH. Diagram 2040 of FIG. 20C is a perspective view of the same.

Figure 21A:
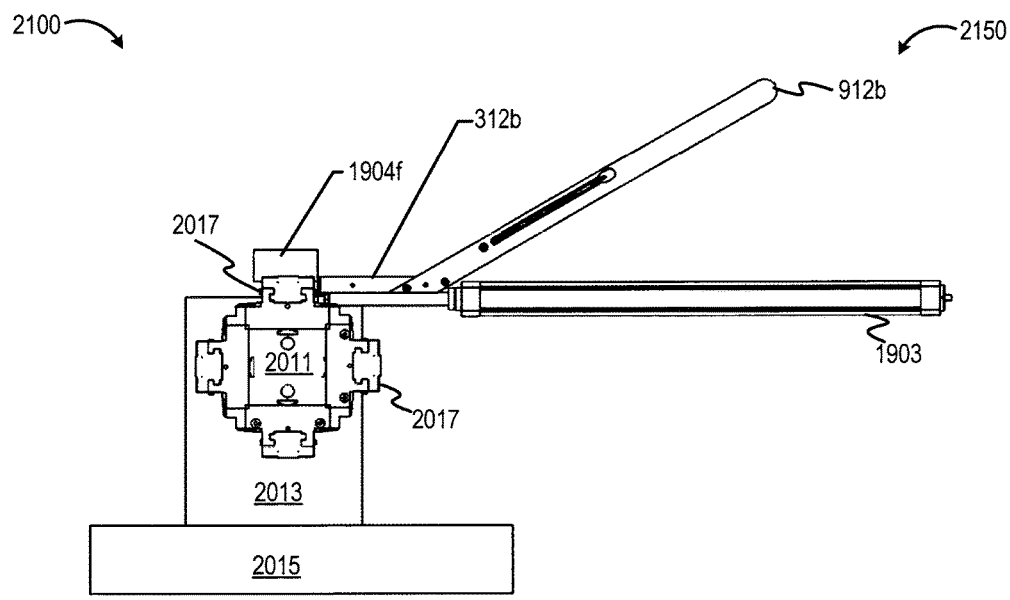
FIGS. 21A to 21B depict a loader interacting with milling surfaces of FIGS. 20A and 20B to load a work piece, according to various embodiments.
Figure 21B:
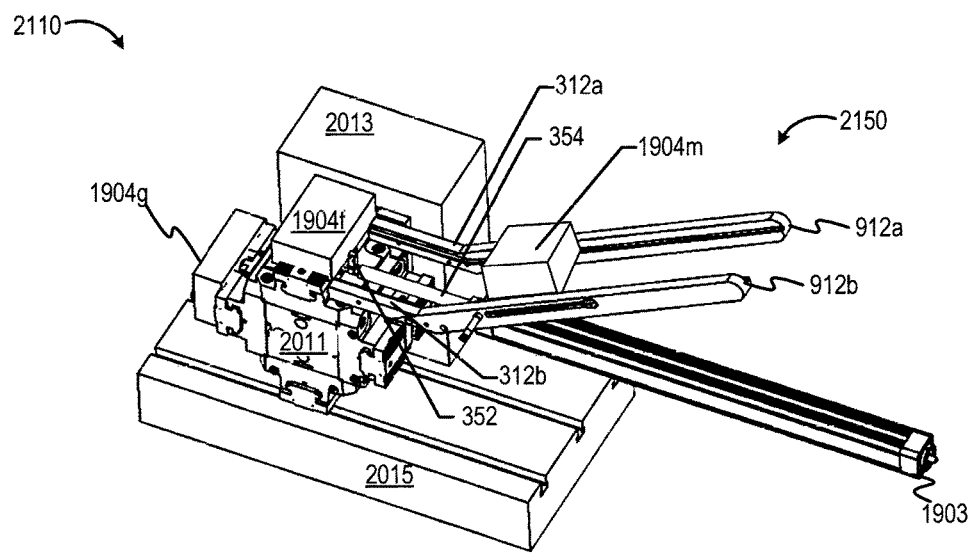

FIGS. 21A to 21B depict a loader interacting with milling surfaces of FIGS. 20A and 20B to load a work piece, according to various embodiments. Diagram 2100 is a side view depicting loader 2150 loading work piece 1940f onto a milling surface associated with clamping members 2017. In some instances, loader 2150 includes a pair of feed members including feed member 912b, along which work piece 1904f to guide members including guide member 312b. Diagram 2110 is a perspective view showing loader 2150 being composed of feeder members 912a and 912b, guide members 312a and 312b, loader member 354, effector 352, and loader force-generation unit 1903. Here, effector 352 has pushed work piece 1904f to a clamping structure. Note that another work piece 1940g has been loaded into another clamping structure, and another work piece 1940m is stored in feeder members 912a and 912b until a next loading cycle.

Figure 22A:
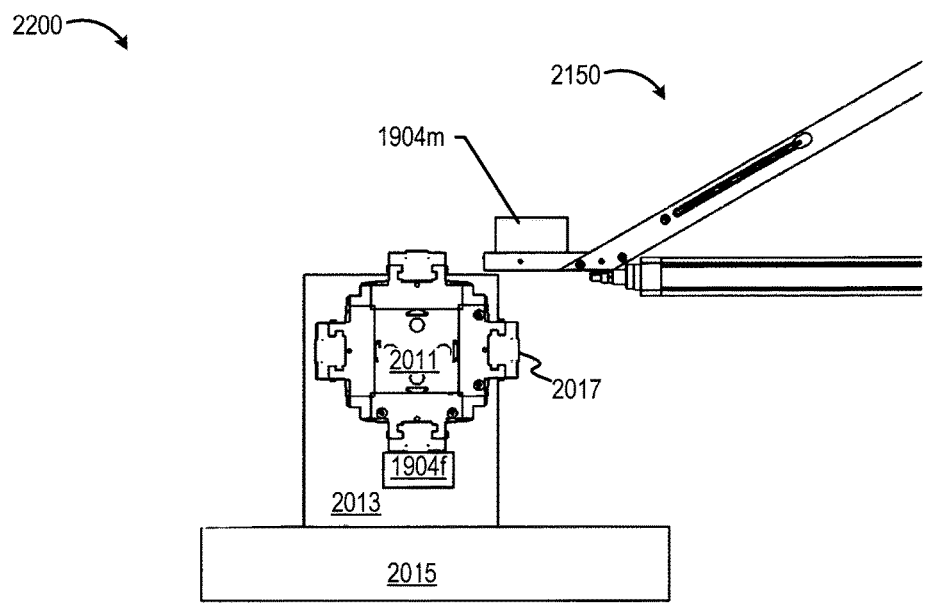
FIGS. 22A to 22B depict the preparation of unloading of a work piece, according to various embodiments.
Figure 22B:
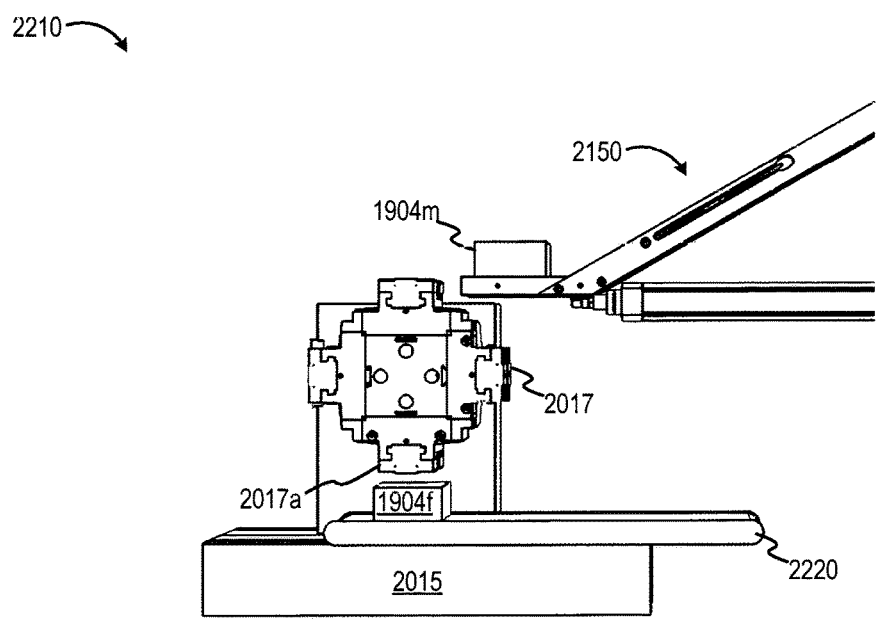

FIGS. 22A to 22B depict the preparation of unloading of a work piece, according to various embodiments. Diagram 2200 of FIG. 22A is a side view depicting loader 2150 preparing to unload work piece 1904f. Diagram 2210 of FIG. 22B is a side view depicting clamping structure 2017a releasing work piece 1904f so that the work piece is unloaded in a manner that it drops onto a surface below, according to some embodiments. In this example, work piece 1940f is unloaded onto a conveyor system 2200 with a conveyor belt for moving the work piece.

Figure 23A:
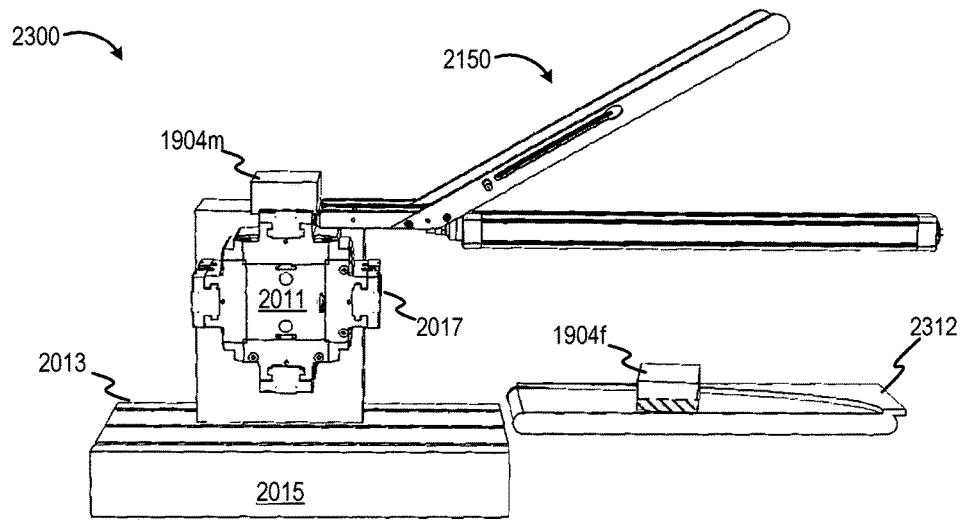
FIGS. 23A to 23C depict an example of transferring an unloaded work piece, according to various embodiments.
Figure 23B:
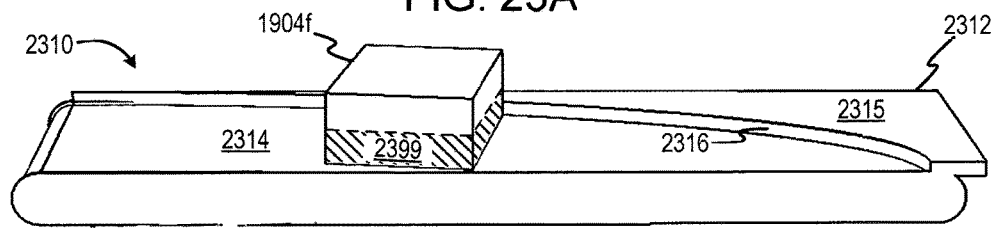
Figure 23C:
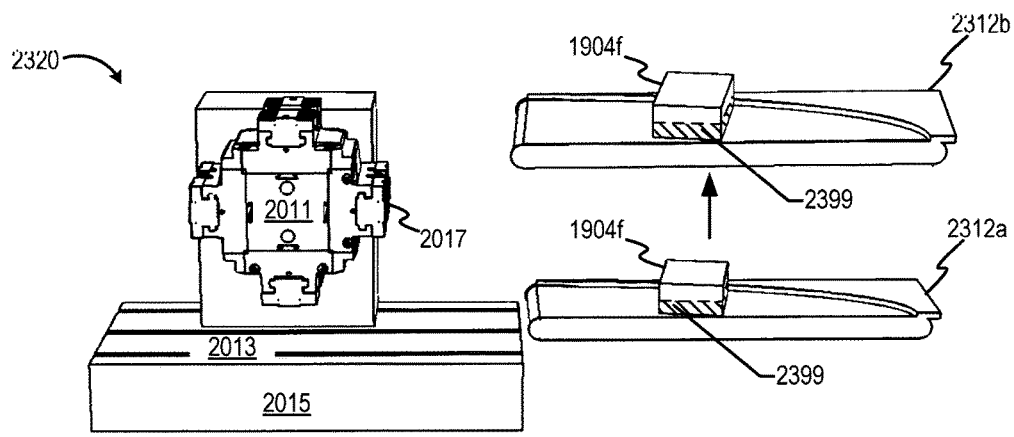

FIGS. 23A to 23C depict an example of transferring an unloaded work piece, according to various embodiments. Diagram 2300 of FIG. 23A is a side view depicting loader 2150 subsequent to loading work piece 1904m. Also shown, work piece 1940f is transferred from conveyor system 2200 of FIG. 22B to conveyor system 2312a. Diagram 2310 of FIG. 23B is a perspective view of work piece 1904f oriented so that its milled portion 2399 is contacting a conveyor belt 2314. Conveyor system 2312a optionally includes a turning member 2135 with which surface 2316 is used to turn work piece 1904f to orient the work piece for either additional travel or insertion into loader 2150. In one instance, diagram 2320 of FIG. 23C depicts conveyor system 2312a being configured to elevate to a position associated with conveyor system 2312b.

Figure 24A:
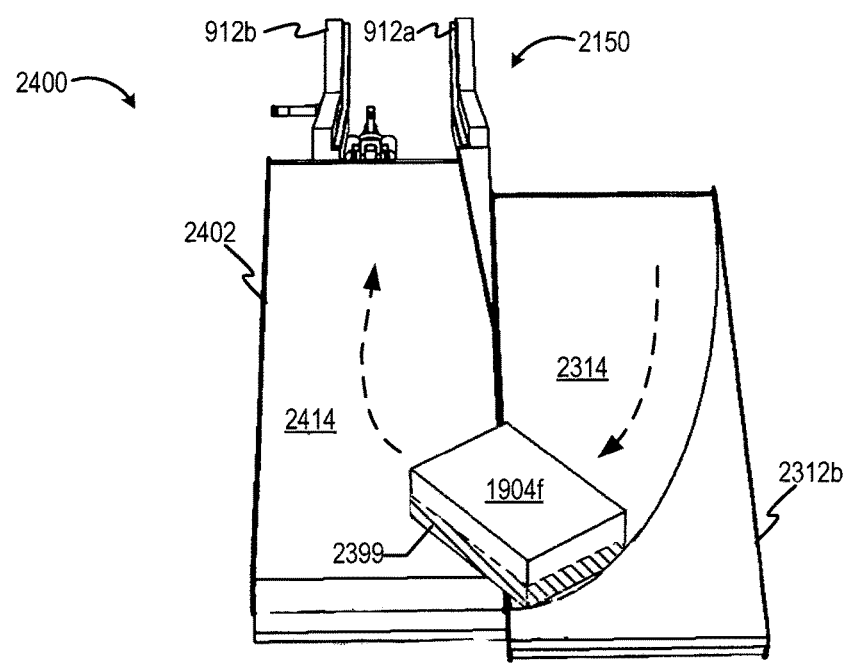
FIGS. 24A to 24B depict a milled work piece being inserted into loader for a loading operation, according to various embodiments
Figure 24B:
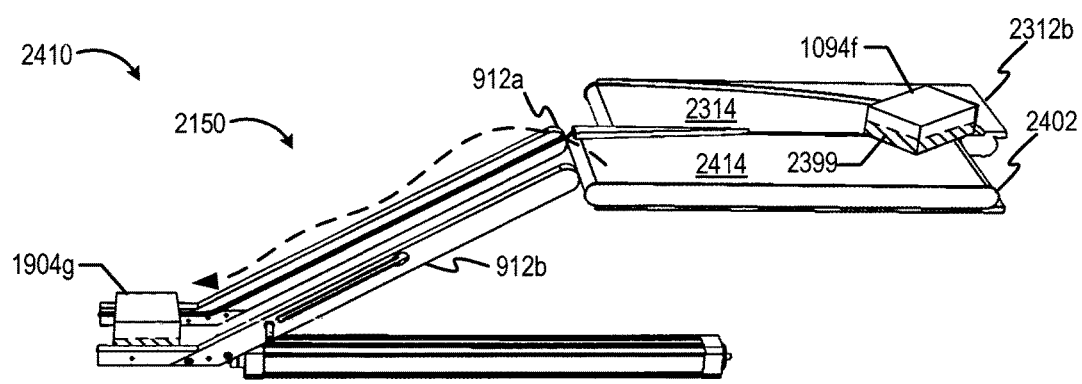

FIGS. 24A to 24B depict a milled work piece being inserted into loader for a loading operation, according to various embodiments. Diagram 2400 of FIG. 24A is a top perspective view depicting work piece 1904f turning and transferring from conveyor belt 2314 to conveyor belt 2414 of a return conveyor system 2402. Return conveyor system 2402 is configured to transfer work piece 1904f, with milled portion 2399 facing down, into feeder members 912a and 912b. Diagram 2410 of FIG. 24B depicts a side view of loader 2150 illustrating a path over which work piece 1904f travels along feeder members 912a and 912b to reach a staging region for another loading cycle. For example, work piece 1904g is in a staging region in preparation for receiving a loading force to drive work piece 1904f—unmilled side up—to a milling table to perform a milling operation that will access surfaces not previously milled.

FIGS. 25A to 25D are diagrams illustrating various examples of a storage region with one configuration, according to various embodiments. FIG. 25A is a perspective view 2500 of a loader including a staging region 2510 and a storing region 2511. In some embodiments, storing region 2511 is configured to store a number of work pieces (e.g., in a single file or in multiple rows and/or columns) and to interact with a surface (or a portion thereof) of the work pieces to apply a force to urge the number of work pieces from one location in storage region 2511 to another location, such as adjacent to staging region 2510. The loader of FIG. 25A includes feeder members 2512a and 2512b that constitute storage region 2511, guide members 2509a and 2509b constituting staging region 2510, and a loader actuator 302 including a loader member and effector. In some embodiments, feeder members 2512a and 2512b are oriented, for example, parallel to a surface 2504 and are configured to feed or guide work pieces along one or more pairs of members or member surfaces. Feeder members 2512a and 2512b are configured to deliver a work piece to staging region 2510 for a loading operation. In the example shown, feeder member 2512b is composed of a feeder member 2513b and a select-release assembly 2513a, which is described below. According to various embodiments, the structure and/or functionality of feeder members need not be limited to those shown in FIGS. 25A to 25J. In some instances, a feeder member can include one or more contacting surfaces for feeding work pieces during transition within or from a storage region. Further, a feeder member can include one or more structures for imparting a locomotive force to a work piece to transition that work piece to or adjacent a staging region. Examples of feeder members configured to impart locomotive force include conveyor systems, such as shown in FIG. 25A. Storage region 2511 includes a conveyor system 2502 in which the associated feeder member or feeder device is a conveyor belt having a surface 2504 configured to impart a force upon work pieces to urge motion in staging region 2510. Actuators 2519a and 2519b are coupled to a controller (not shown) and are configured to extend and retrace piston rods to rotate guide members 2509a and 2509b, respectively, about axis 384.

Therefore, actuators 2519a and 2519b can be referred to as an "alignment device" as they rotate guide members to various orientations.

According to some embodiments, the loader of FIG. 25A includes a select-release assembly 2513a which includes either a selector or a releaser, or both, to transfer one or more work pieces from storage region 2511 to staging region 2510. In the example shown, select-release assembly 2513a includes a select member 2516a and a release member 2516b to implement a selector and a releaser, respectively. According to some embodiments, select member 2516a and a release member 2516b can be implemented as or part of a "selecting device" and "releasing device," respectively. A selecting device or a releasing device can be electromagnetic-based (e.g., implementing a solenoid), pneumatic-based, hydraulic-based, or based on any other like technology suitable for implementing the functions of selecting and releasing. Select member 2516a and a release member 2516b can have similar functions and/or structures as those selecting devices and releasing devices described in FIG. 9A to 9J.

Selecting member 2516a can be configured to select a work piece from a group of work pieces in storage region 2511 for transport to the milling region. Selecting member 2516a engages the work piece to prevent it from advancing to staging region 2510. Under control of a controller (not shown), one of control signals 2523 can be delivered to a select actuator (not shown) to disengage selecting member 2516a from the work piece, thereby enabling it to transfer to staging region 2510. A release actuator (not shown) includes a release member 2516b configured to release other work pieces from the group of work pieces for transport along feeder members 2512a and 2512b to engage select member 2516a (i.e., the next work piece engages the select member). Release member 2516b engages the other work pieces to prevent, for example, all but a selected number of work pieces from advancing. Under control of a controller, another one of control signals 2523 can be delivered to the release actuator to disengage release member 2516b from the other work pieces, thereby enabling them to advance to selecting member 2516a. In this example, selecting member 2516a is disposed in line 2526a defining a point at which a work piece resides until it is selected. In this configuration, selecting member 2516a impedes travel of work pieces. When selected, selecting member 2516a retracts and enables at least one work piece to advance. Further, releasing member 2516b is disposed in a line 2526b at which the stored work pieces reside until they are released. In this configuration, releasing member 2516b impedes travel by work pieces. When released, releasing member 2516b retracts and enables the other work pieces to advance. Note that the structures and techniques of selecting and releasing described in FIGS. 25A to 25D, and thereafter, are merely illustrative of one example of facilitating a loading operation. Thus, the structures and techniques of selecting and releasing are not intended to be limiting. Other implementations of selection or releasing, or both, are possible.

Figure 25B:
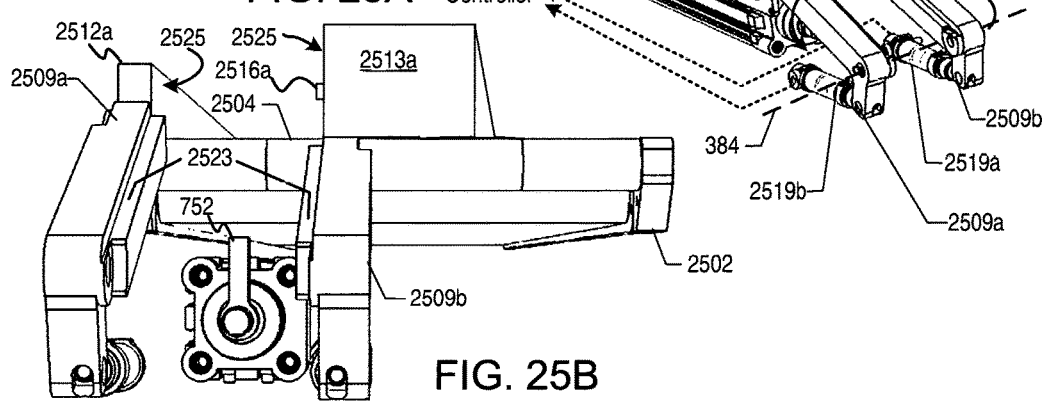
Figure 25C:
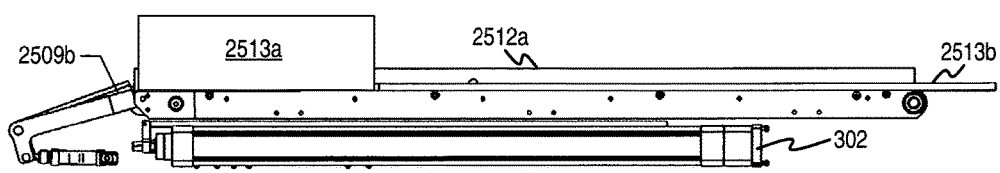
Figure 25D:
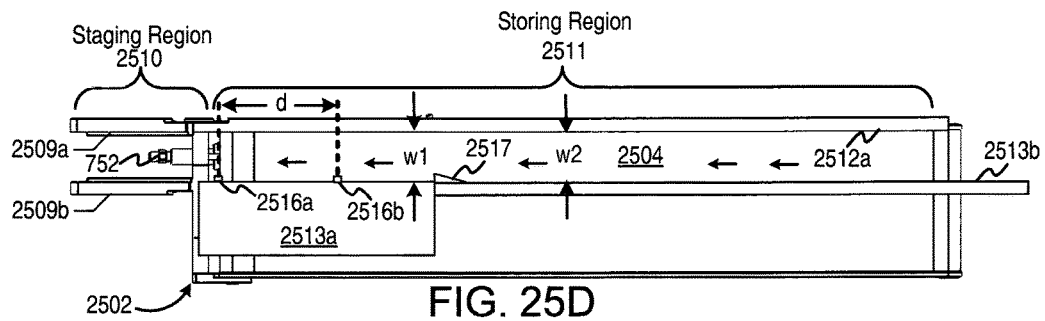

FIG. 25B is an end view for a loader, according to some embodiments. Feeder members 2512a and 2512b include contacting surfaces 2525 for guiding or feeding the stored work pieces. In this orientation, contacting surfaces 2523 of guide members 2509a and 2509b are configured to align with surface 2504 to receive a work piece. FIG. 25C is a side view for a loader, according to some embodiments. FIG. 25D is a top view for the loader, according to some embodiments. FIG. 25D depicts staging region 2510 including 2512a and 2512b, which can be formed as part of the loader.

In other examples, guide members associated with milling tables can constitute staging region 2510. Further to the example shown, the distance, "d," between select member 2516a and release member 2516b can be adjusted for the length of the work pieces. Optionally, a "funnel" structure 2517 can be implemented to funnel work pieces into a smaller width, "w1," dimension from a larger width, "w2," as work pieces advance through the storage region on surface 2504. Larger widths facilitate more room for the work pieces to negotiate for space as they traverse down the conveyor belt.

Figure 26A:
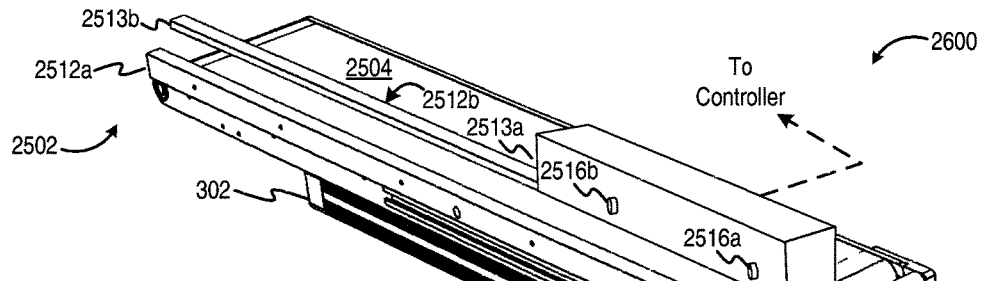
FIGS. 26A to 26D are diagrams illustrating various examples of a storage region with another configuration, according to various embodiments.
Figure 26B:
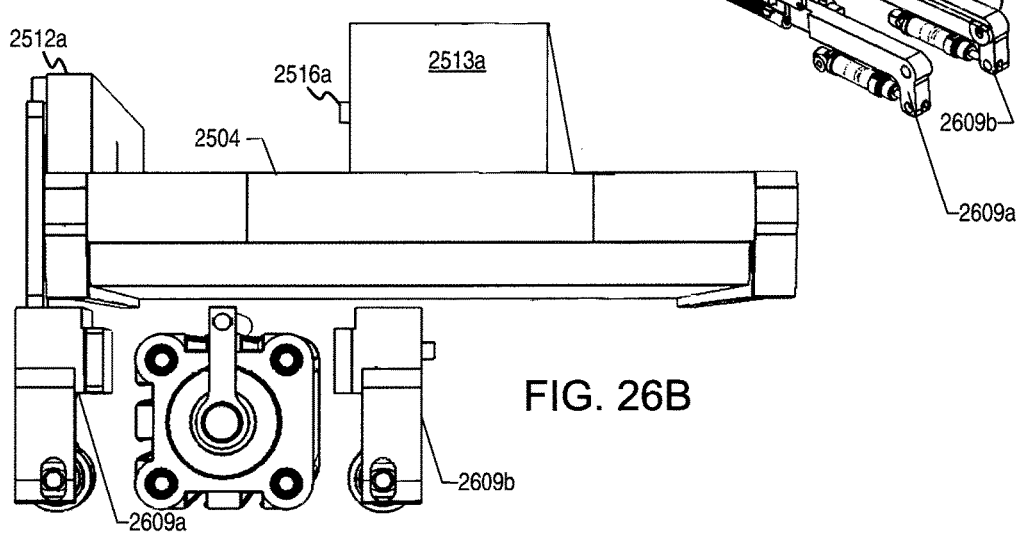
Figure 26C:
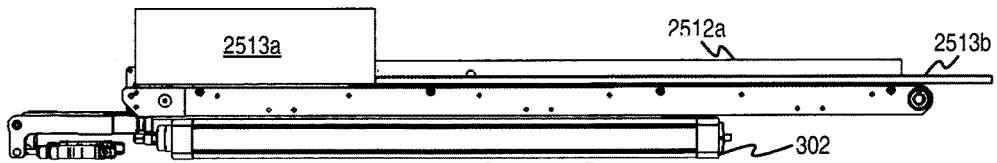
Figure 26D:
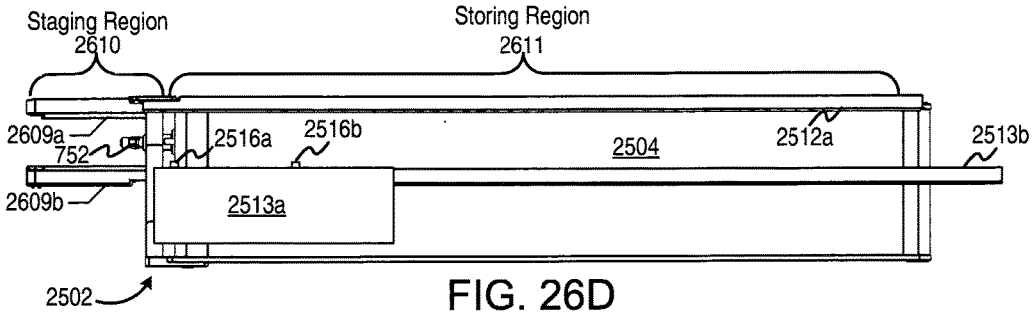

FIGS. 26A to 26D are diagrams illustrating various examples of a storage region with another configuration, according to various embodiments. FIG. 26A is a perspective view of a loader including a staging region 2510 in an orientation to facilitate loading into a milling region. FIG. 26B is an end view for a loader, according to some embodiments. FIG. 26C is a side view for a loader, according to some embodiments. FIG. 26D is a top view for the loader, according to some embodiments.

Figure 27A:
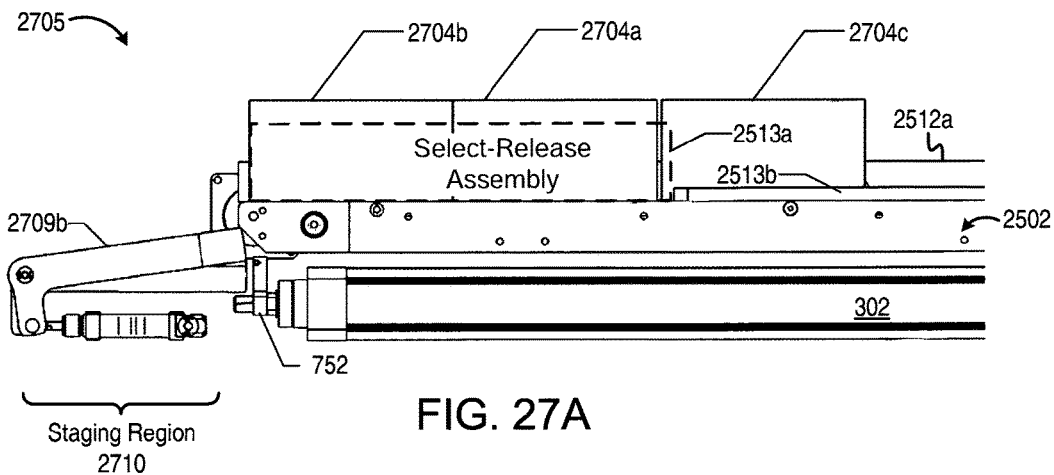
FIGS. 27A to 27G are diagrams illustrating various implementations of a select-release assembly, according to various embodiments.
Figure 27B:
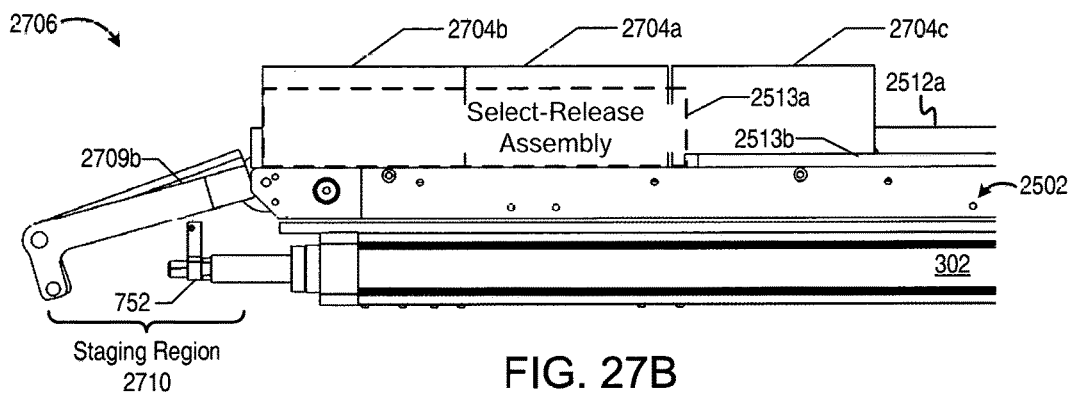
Figure 27C:
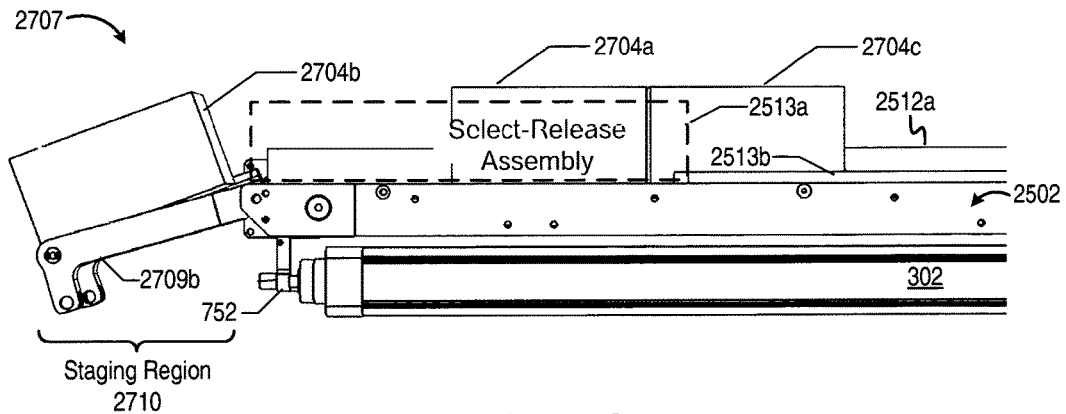
Figure 27D:
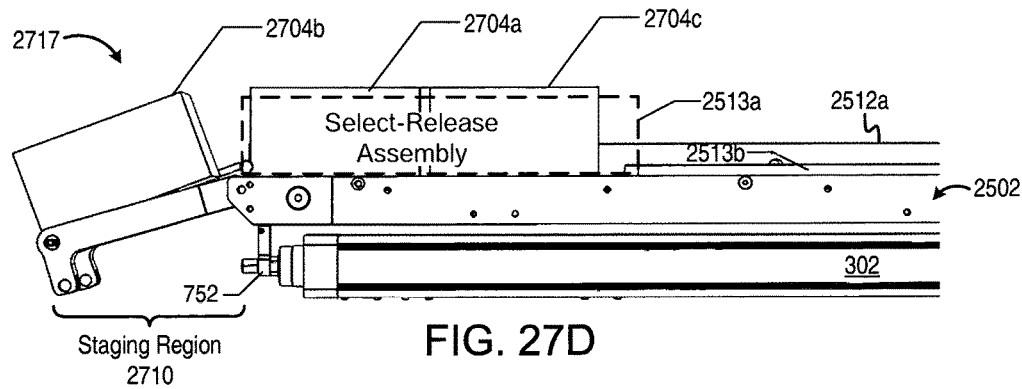
Figure 27E:
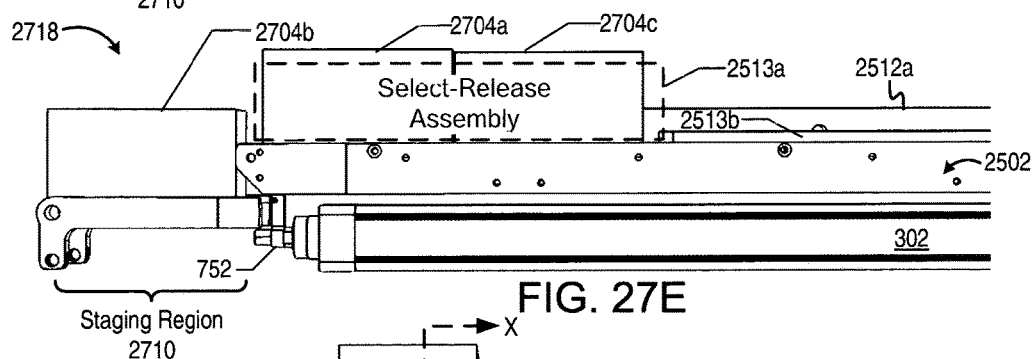
Figure 27F:
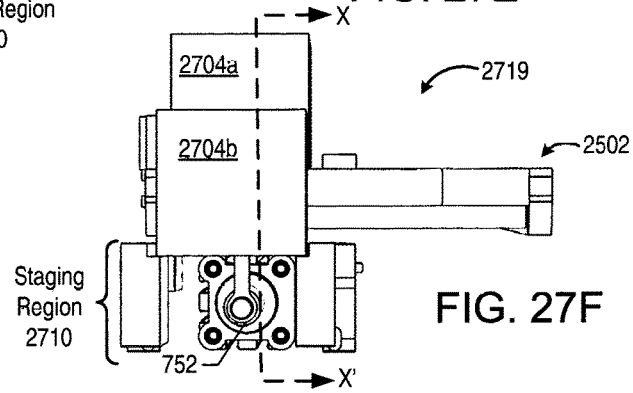
Figure 27G:
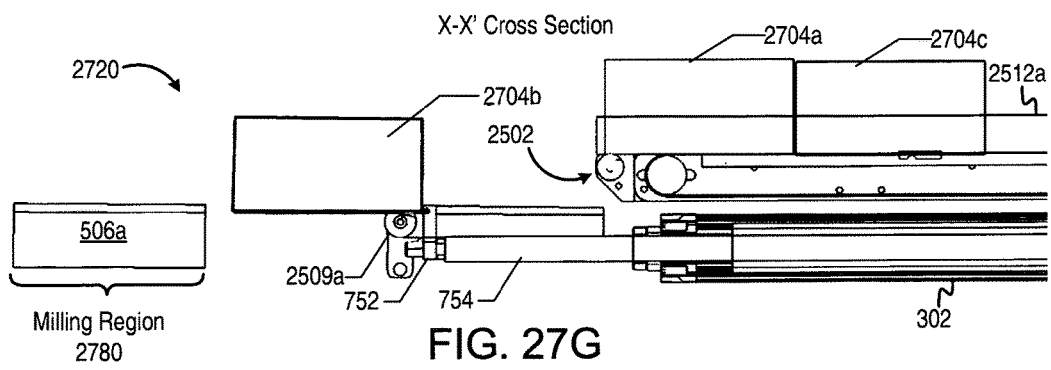

FIGS. 27A to 27G are diagrams illustrating various implementations of a select-release assembly, according to various embodiments. FIG. 27A is a side view 2705 for the loader in which work pieces 2704b, 2704a and 2704c are disposed on a conveyor system 2502 in a storage region. In this diagram, the selecting member is engaging work piece 2704b (not shown), thereby preventing it from advancing to staging region 2710. Further, the releasing member is engaging work piece 2704a (not shown), thereby preventing work pieces 2704a and 2704c from advancing. Guide members, including guide member 2709b, are in a second orientation for loading work pieces. FIG. 27B is a side view 2706 for the loader in which the guide members, including guide member 2709b, are oriented into a first orientation to receive work piece 2704b from the storage region. FIG. 27C is a side view 2707 for the loader in which work piece 2704b has been selected for loading, while work pieces 2704a and 2704c remain disposed in the storage region. In particular, the selecting member disengages work piece 2704b, thereby enabling it to advance to staging region 2710. In some embodiments, the application of gravity assists in the advance of work piece 2704b onto the guide members. Further, the releasing member remains engaged with work piece 2704a, thereby preventing work pieces 2704a and 2704c from advancing. FIG. 27D is a side view 2717 for the loader in which work piece 2704b has been selected for loading, and work pieces 2704a and 2704c have been released. In this case, the releasing member of release actuator 2714b disengages with work piece 2704a, thereby enabling with work pieces 2704a and 2704c to advance via the conveyor to the selecting member, which prevents work pieces 2704a and 2704c from advancing to staging region 2710. FIG. 27E is a side view 2718 for the loader in which the guide members, including guide member 2709b, and work piece 2704b are rotated into the second orientation to receive effector 752 for performing a loading operation. FIG. 27F is a front view 2719 of the loader showing and work piece 2704b in staging region 2710 and work piece 2704a in the storage region at vertical distance above effector 752. Cross section X-X' is discussed next. FIG. 27G is a cross-section view ("X-X'") 2720 depicting loader 302, according to some embodiments, with cross section X-X' being shown in FIG. 27F. In this view, work piece 2704b has been engaged by loader member 754 for transport to a guide members 506a (e.g., clamping members) of a vise in a milling region 2780. Work pieces 2704a and 2704c remain engaged by selecting member, which prevents work pieces 2704a and 2704c from sliding to staging region 2710. According to some embodiments, the guide members can be omitted, whereby work pieces advance from storing region 2771 to guide members that can be associated with a structure configured to move to a milling site.

FIGS. 28A to 28D are diagrams illustrating various views of an example of a select-release assembly, according to some embodiments. Diagram 2800 is a side perspective of select-release assembly 2513a and feeder member 2513b, both of which constitute feeder member 2512b of FIGS. 25A and 26A. Select-release assembly 2513a includes a conveyor system 2502 having a surface 2504. Select member 2516a protrudes to engage a work piece on conveyor surface 2505 as does release member 2516b. Select actuator 2874 is configured to activate select member 2516a to engage a work piece (e.g., by protruding over surfaced 2504) or disengage the work piece (e.g., by retracted into the body of select actuator 2874). Release actuator 2872 is configured to activate release member 2516b in a similar manner.

FIG. 28B is a perspective view 2801 of select-release assembly 2513a, according to some embodiments. As shown, select-release assembly 2513a includes select actuator 2874 coupled rigidly via support shafts 2881 to stretcher structure 2870. Select-release assembly 2513a also includes a lead screw 2880 configured to engage release actuator 2872, which is also supported by support shafts 2881. In the example shown, a knob 2810 is coupled to lead screw 2872, whereby a rotational force applied to knob 2810 causes release actuator 2872 to traverse in either direction along support shafts 2881 to, for example, accommodate a specific length of a work piece. Note that knob 2810 can be replaced by an electromechanical means by which to adjust distance, "d."

FIG. 28C is a front view 2802 of select-release assembly 2513a engaging a work piece 2704b, according to some embodiments. As shown, selecting member 2516a is shown extending over surface 2504 to engage, for example, the front surface of work piece 2704b. Assembly bridge 2529 is a structure that is configured to suspend select-release assembly 2513a at a height, "h," over surface 2504.

Figure 29A:
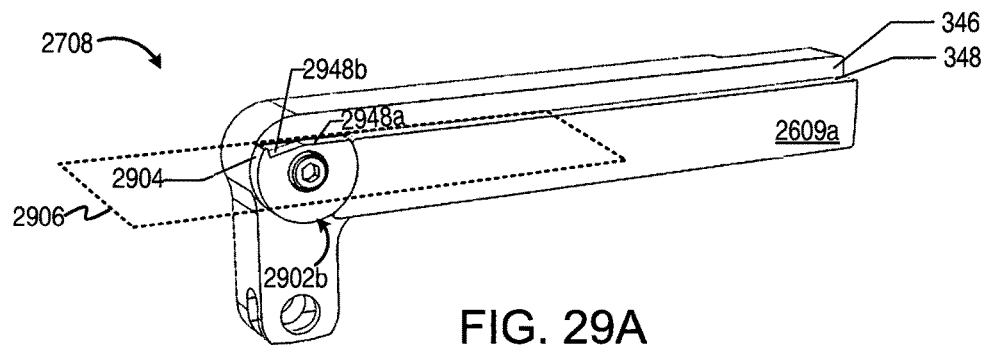
FIGS. 29A to 29C depict an obstructer member of implementation in a staging region, according to some embodiments.
Figure 29B:
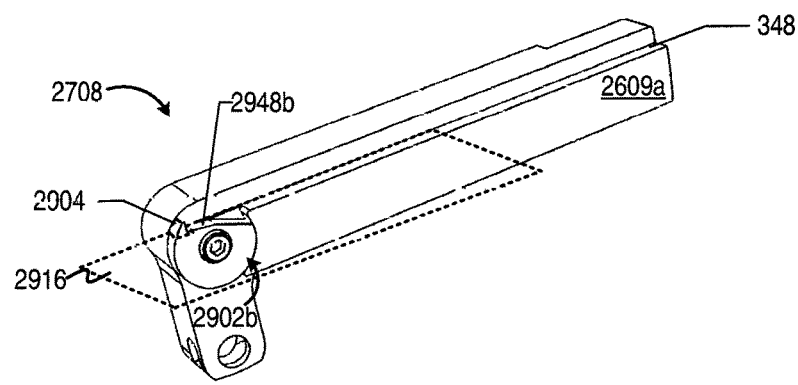
Figure 29C:
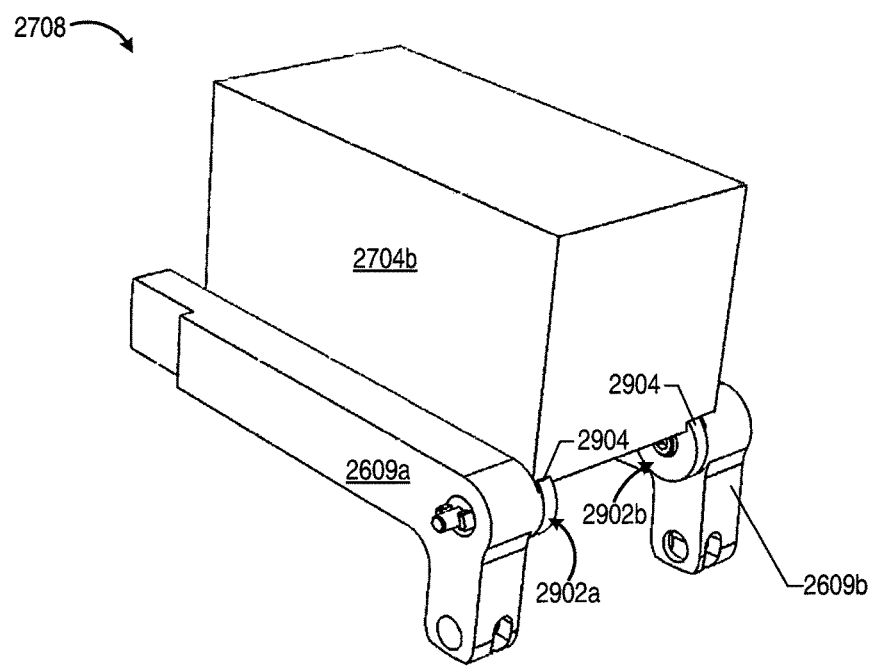

FIGS. 29A to 29C depict an obstructer member, according to some embodiments. FIG. 29A is a side perspective view 2900 of guide member 2609a including an obstructer member 2902a, according to some embodiments. Obstructer member 2902a is configured to obstruct movement of a work piece when guide member 2609a is in one orientation and to permit unobstructed movement of the work piece during another orientation of the guide member 2609a. In a second orientation, which is depicted in FIG. 29A, stop structure 2904 and an obstruction surface 2948b are configured to reside below a plane 2906 coextensive with a contacting surface, such as contacting surface 348 of FIG. 3C, of guide member 2609a. Surface 2948a of obstructer member 2902a is coextensive with contacting surface 348 to facilitate support for a work piece.

FIG. 29B is a side perspective view 2901 of guide member 2609a including an obstructer member 2902a, according to some embodiments. As shown, guide member 2609a is in a first orientation in which one end is adjacent to a storage region. While guide member 2609a rotates, obstructer member 2902a remains stationary, whereby stop structure 2904 and obstruction surface 2948b that are configured to obstruct the portion of a path by passing through plane 2916.

FIG. 29C is a perspective view 2903 of guide members 2609a and 2609 in a first orientation supporting a work piece 2704b, according to some embodiments. As shown, obstructer members 2902a and 2902b of guide members 2609a and 2609b, respectively, include stop structures 2904 to obstruct movement of work piece 2704b until the guide members rotate into another configuration.

Figure 30A:
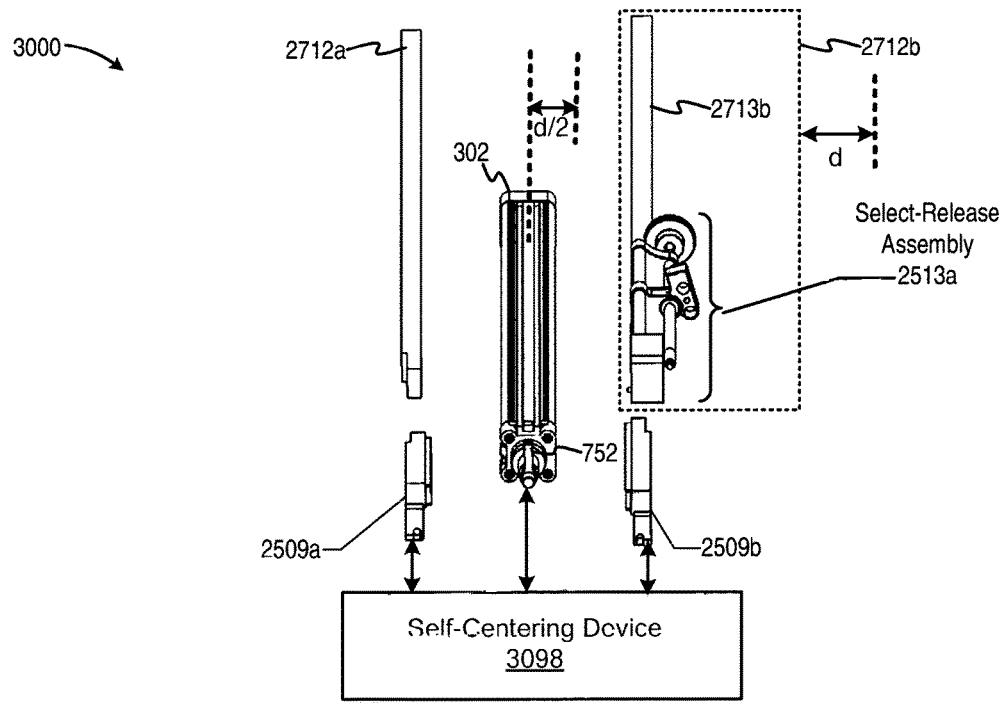
FIGS. 30A to 30D are diagrams illustrating another example of a self-centering device, according to various embodiments.
Figure 30B:
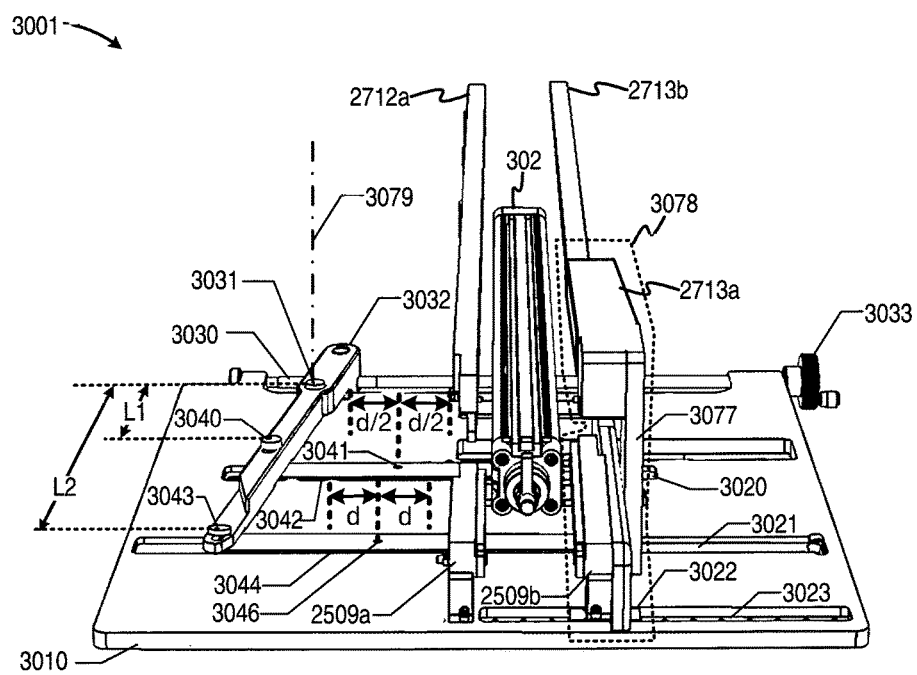
Figure 30C:
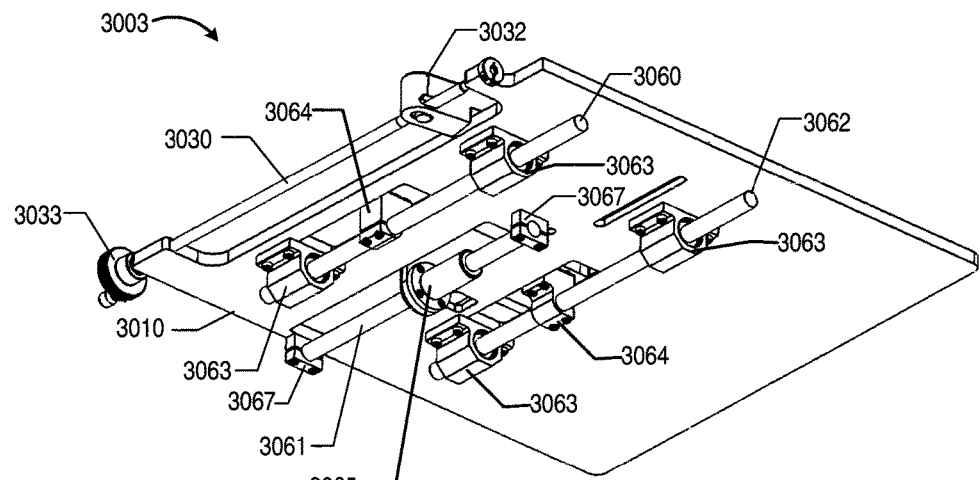
Figure 30D:
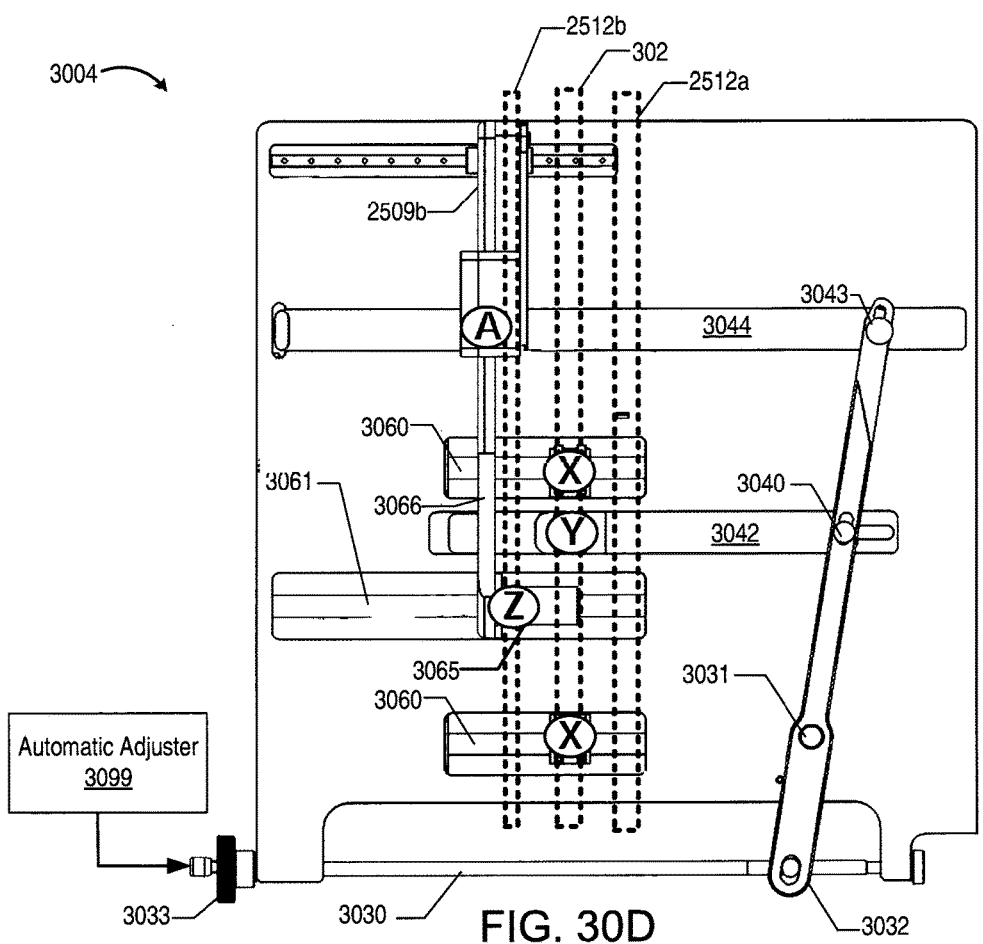

FIGS. 30A to 30D are diagrams illustrating another example of a self-centering device, according to various embodiments. FIG. 30A is diagram 3000 depicting a self-centering device 3098 configured to self-center either effector 752 or loader 302, or both, as the feeder members are adjusted to adapt to a dimension (e.g., a width) of a work piece, according to some embodiments. Self-centering device 3098 is configured to adjust the position of effector 752 by half a distance ("d/2") in the direction that, for example, a feeder member 2712b is adjusted. As shown, feeder member 2712b includes a feeder member portion 2713b and a select-release assembly 2513a. In some embodiments, self-centering device 3098 is configured to adjust the position of effector 752 at approximately one-half the distance between a pair of feeder members as the distance is modified. In some cases, the position of effector 752 at approximately 40% to 60% the distance between a pair of feeder members. The position of effector 752 is configured to engage a medial portion of a work piece. Further, self-centering device 3098 is configured to determine that the distance between the pair of feeder members is adjusted by an amount, and to adjust the position of effector 752 by approximately one-half the amount (e.g., when feed member 2712a is configured to be stationary or immobile). When effector 752 also is configured to deliver a cleaning force, self-centering device 3098 facilitates an equivalent cleaning forces to be applied to guide members when the cleaning forces originate about one-half between the feeder members or rails. According to some embodiments, self-centering device 3098 includes an adjustment member configured to impart motion to effector 752 and to at least one feeder member (e.g., feeder member 2712b or its constituent components), whereby the adjustment member is configured to displace effector 752 at a rate that is one-half (or approximately one-half) the rate that the feeder member is moving. In some embodiments, feeder member 2712a and guide member 2509a are stationary and feeder member 2712b, it components, and guide member 2509b move together at a rate that is twice that of loader 302. While FIGS. 30B to 30D depict an adjustment member as lever member 3032, an adjustment member (and its constituent components) need not be limited to translating rotational motion into linear motion of the effector 752 and a feeder member. Rather, an adjustment member can include one or more structures that are configured to accept a force to move effector 752, and optionally, a feed member. Examples of adjustment members include systems of pulleys and cables (e.g., block and tackle) designed to product displacements of "d/2" for effector 752 and "d" for a feeder member 2712b, among other examples, including rails slideably coupled via, for example, ball bearings, whereby one point of a first rail is displaced at two times the rate of another point on the second rail.

FIG. 30B is a front perspective view 3001 depicting elements for a self-centering device 3098, according to a specific embodiment. In the example shown, feeder member 2712a and guide member 2509a are affixed to side member (not shown), which, in turn, is affixed to plate 3010 to keep member 2712a and guide member 2509a stationary. Similarly, select-release assembly 2713a and guide member 2509b are affixed to a side member 3077, which, in turn, is slideably coupled to slide members 3022 for sliding in slot 3023 in plate 3010, and further coupled via a hole in plate 3010 to collar 1165 of FIG. 30C. Slide member 3022 and slot 3023 can be optional. Referring back to FIG. 30B, structure 3078 includes select-release assembly 2713a and guide member 2509b and rigid connecting structures, such as side member 3077, to ensure uniform displacement. The adjustment member in this example of a self-centering device includes a lever 3032 coupled to push-pull rods 3042 and 3044 to convey motion. In particular, push-pull rod 3044 is disposed in slot 3021 and is coupled to structure 3078, which includes select-release assembly 2713a and guide member 2509b rigidly coupled together. Push-pull rod 3044 is coupled to lever 3032 at point 3043. Push-pull rod 3042 is disposed in slot 3020 and is coupled to loader 302, and is further coupled to lever 3032 at point 3040. Lever 3032 is coupled to a pivot point 3031 so that lever can rotate about axis 3079. Point 3040 is at a length, "L1," from pivot point 3031 and point 3043 is at a length, "L2," from pivot point 3031. The ratio of the lengths L2 to L1 is determined to permit a point 3041 on push-pull rod 3042, which is coupled to loader 302, to traverse a distance, "d/2," relative to the distance, "d," that point 4046 on push-pull rod 3044 traverses. Again, push-pull rod 3044 is coupled to select-release assembly 2713a and guide member 2509b. Knob 3033 is coupled via a lead screw 3030 to lever 3032 for modifying the orientation of the lever. Again, FIG. 30B depicts but one set of elements that structurally and/or functionally can be combined to implement a self-centering device. In some embodiments, structures and/or functionalities of the elements depicted in FIG. 30B can be combined, replaced by other structures and/or functionalities, or can be removed. Therefore, more or few elements shown in FIG. 30B can be used.

FIG. 30C is a rear bottom perspective view 3003 depicting elements for a self-centering device 3098, according to a specific embodiment. Loader 302 is coupled via mounts 3064, which are configured to slide along slide members 3060 and 3062. Slide members 3060 and 3062 are rigidly affixed via fasteners 2063 to base plate 3010. Select-release assembly 2713a and guide member 2509b, as part of structure 3078, are coupled to collar 3065, which is configured to slide along slide member 3061. In another implementation, loader 302 is rigidly affixed to mounts 3064, which are rigidly coupled to slide members 3060 and 3062. In this case, slide members 3060 and 3062 can slide through and be guided by fasteners 3063, such as pillow blocks, which are affixed to base plate 3010. slide members 3060 and 3062 are rigidly affixed via fasteners 2063 to base plate 3010. Fasteners 3067 rigidly affix slide member 3061 to base plate 3010. Again, FIG. 30C depicts but one set of elements that structurally and/or functionally can be combined to implement a self-centering device. In some embodiments, structures and/or functionalities of the elements depicted in FIG. 30C can be combined, replaced by other structures and/or funclionalities, or can be removed. Therefore, more or few elements shown in FIG. 30C can be used.

FIG. 30D is a top view 3004 depicting elements for self-centering device 3098, according to a specific embodiment. In the example shown, the encircled letter "X" indicates points of attachment for loader 302, which is depicted in dotted lines, to slide members 3060 and 3062. The encircled letter "Y" indicates points of attachment for loader 302 to push-pull rod 3042. The encircled letter "Z" indicates points of attachment for select-release assembly 2713a and guide member 2509b, as part of structure 3078, to slide member 3061. The encircled letter "A" indicates a point of attachment for select-release assembly 2713a and guide member 2509b, as part of structure 3078, push-pull rod 3044

(i.e., at or near the base plate 3010). In some embodiments, an automatic adjuster 3099 can be configured to automatically turn screw member 3030 to adjust the width between feeder members 2712a and 2712b. FIG. 30D depicts but one set of elements that structurally and/or functionally can be combined to implement a self-centering device. In some embodiments, structures and/or functionalities of the elements depicted in FIG. 30D can be combined, replaced by other structures and/or functionalities, or can be removed. Therefore, more or few elements shown in FIG. 30D can be used.

Figure 31A:
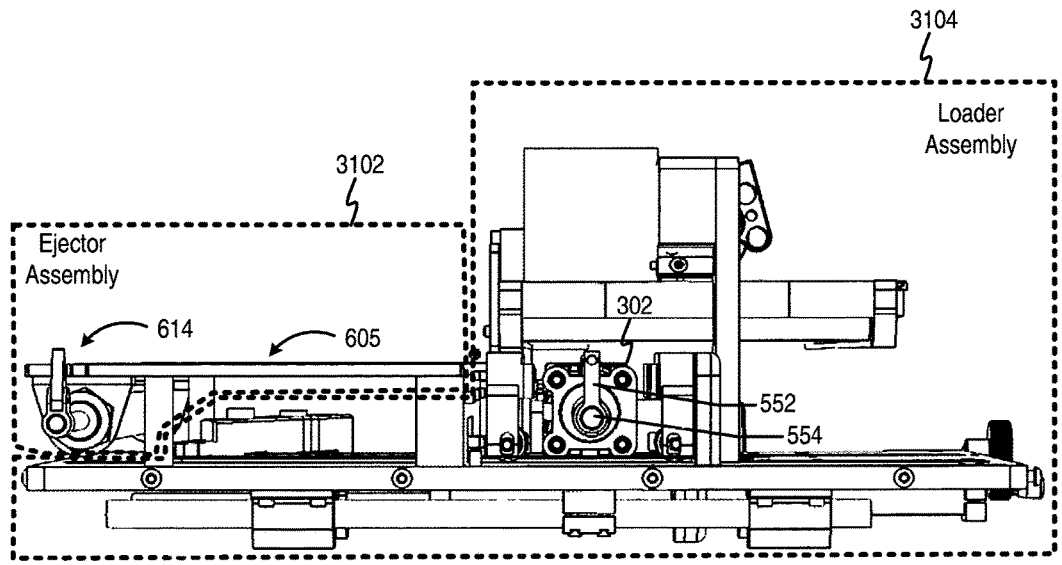
FIGS. 31A to 31C are diagrams illustrating an example of a loader and an unloader combined in a unit, according to various embodiments.
Figure 31B:
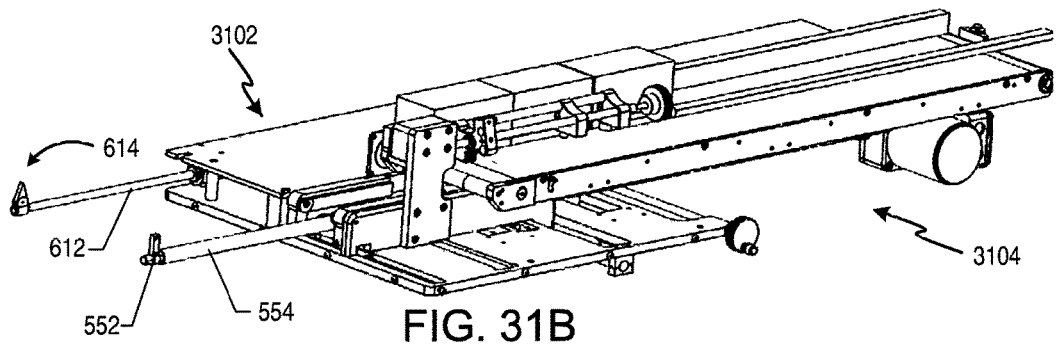
Figure 31C:
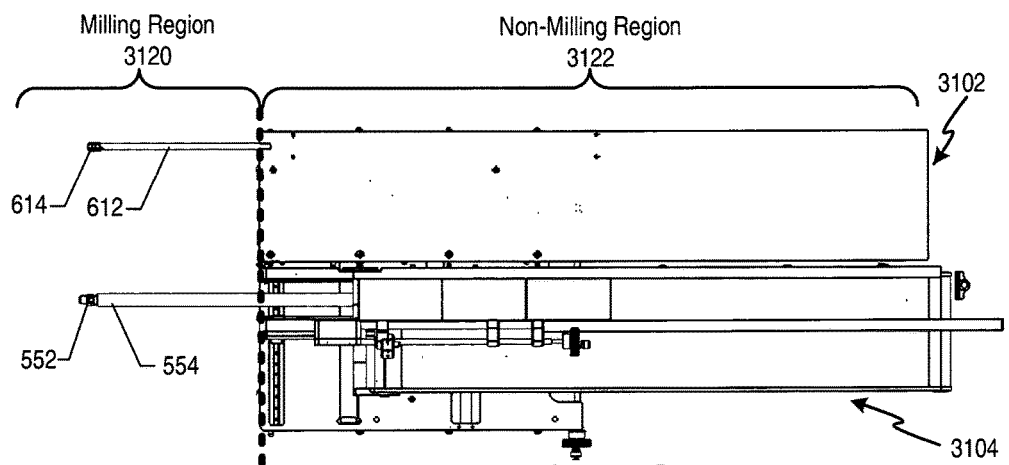

FIGS. 31A to 31C are diagrams illustrating an example of a loader and an unloader combined in a unit, according to various embodiments. FIG. 31A is a diagram depicting a loader assembly 3104 configured to cooperate with an ejector assembly 3102. In this example, ejector assembly 3102 includes an ejector actuator, an ejector member 612 (see FIG. 31B) and an engagement member 614. Ejector assembly 3102 also includes an ejection platform 605. Loader assembly 3104 can include feeder members, a loader 302, a self-centering device, a loader member 554, and an effector 552. FIG. 31B is a perspective view depicting a loader assembly 3104 of FIG. 31A configured to be co-located with an ejector assembly 3102 of FIG. 31A. In this example, ejector member 612 and engagement member 614 are configured to extend in a direction parallel to the loader member. FIG. 31C is a top view depicting a loader assembly 3104 configured to be co-located with an ejector assembly 3102. In this example, loader assembly 3104 and ejector assembly 3102a re co-located in a non-milling region 3122, such as a buffered region. Further, ejector member 612 and engagement member 614 are configured to extend in a direction parallel to loader member 554. Thus, ejector member 612 and loader member 554 can extend into milling region 3120. In some embodiments, an engagement member 614 can traverse in a plane common with effector 552. According to alternative embodiments, ejector assembly 3102 and loader assembly 3104 can be oriented radially relative to a milling site so that ejector member 612 and loader member 554, respectively, extend into milling region 3120 at a non-parallel angle with respect to each other. FIG. 31A to FIG. 31C depict but one set of elements that structurally and/or functionally can be combined to implement a self-centering device. In some embodiments, structures and/or functionalities of the elements depicted in FIG. 31A to FIG. 31C can be combined, replaced by other structures and/or functionalities, or can be removed. Therefore, more or few elements shown in FIG. 31A to FIG. 31C can be used.

Figure 32:
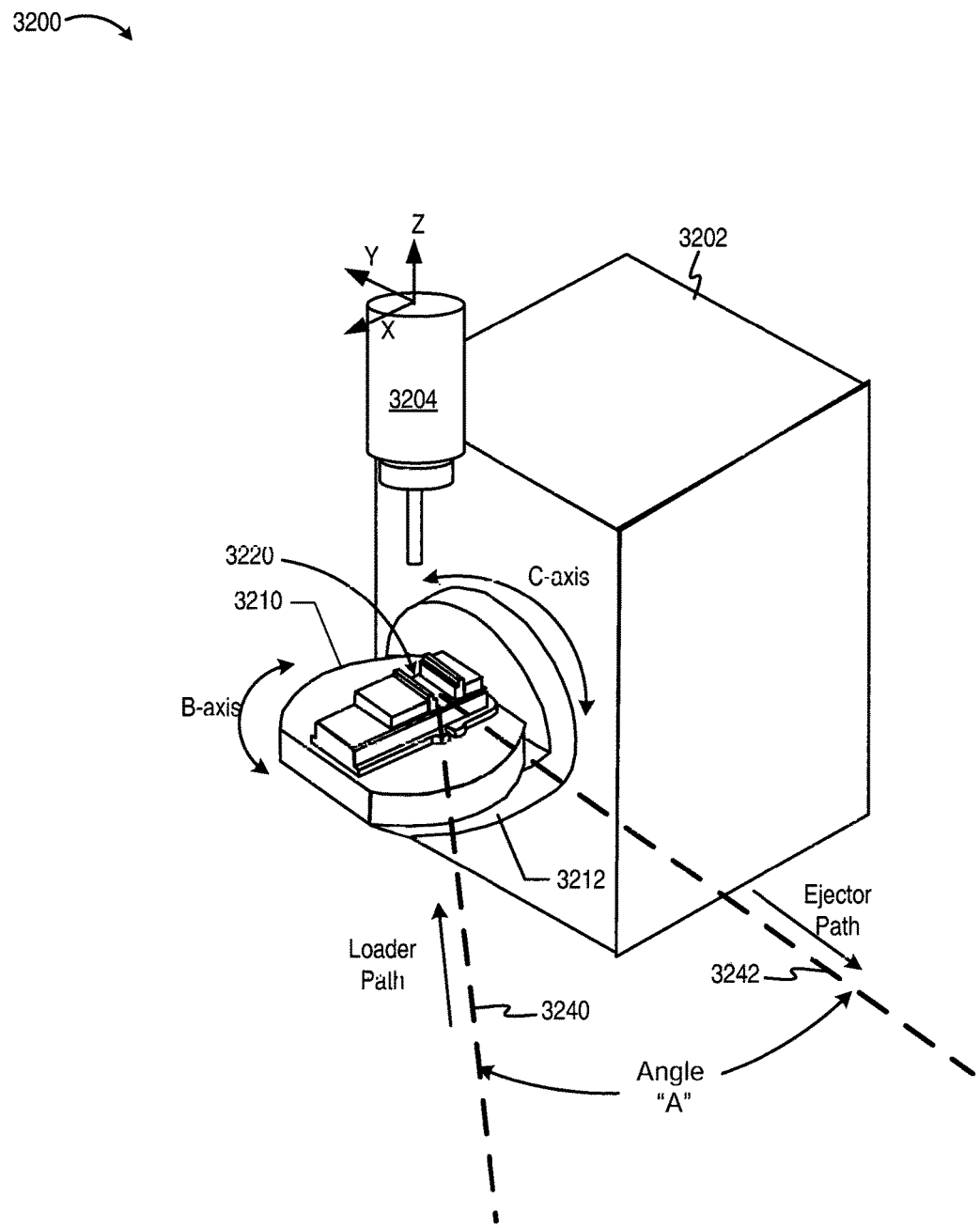
FIG. 32 depicts loading paths and ejection paths for a milling machine having more than 3 axes, according to some embodiments.

FIG. 32 depicts loading paths and ejection paths for a milling machine having more than 3 axes, according to some embodiments. Diagram 3200 depicts a milling machine 3202 providing at least 5 axes. Tool 3204 is configured to operate on three axes—the X, the Y and the Z axes. Rotatable table 3212 rotates in a C-axis, and rotatable table 3210 rotates in a B-axis. Therefore, a work piece at milling site 3220 can be machined in the X, Y, Z, B, and C axes. In one embodiment, a loader assembly of various embodiments can be implemented to load parts over loading path 3240 when rotatable table 3210 aligns the clamping members to that path. Further, an ejector assembly of various embodiments can be implemented to eject parts over ejector path 3242 when rotatable table 3210 aligns the clamping members to that path. Note that paths 3240 and 3241 can be radial to milling site 3220. According to various embodiments, loader assemblies and ejector assemblies can be implemented with various machines that can mill parts in 3 or more axes, or fewer.

In view of the foregoing, a loader can be used along with a rotatable milling table that can provide for milling of six sides, or more, a work piece during, for example, two passes through loader 2150. In some embodiments, one or more of the previously-described methods need not require manual intervention. Further, the examples shown in relation to FIGS. 19A to 32 are merely illustrative and are not limiting. Thus, a variety of structures and/or techniques can be used to unload a milled work piece and transfer that work piece back to loader 2150 for further machining. The conveyor systems described are but one example of the enhanced milling techniques described herein.

In one example a method of operating a loader includes applying a cleaning force to portions of contacting surfaces of guide members, the cleaning force originating within pairs of the guide members, and activating a loader member to displace a work piece in a plane that includes the contacting surfaces of the guide members. A method can include applying the cleaning force by moving an effector in synchronicity with the loader member and directing pressurized gas from the effector to the portions of the contacting surfaces. A method can include generating a signal to activate a pair of the guide members to clamp the work piece. A method can include activating the loader member to displace another work piece in the plane that includes the contacting surfaces of the guide members, and generating another signal to activate another pair of the guide members to clamp the another work piece. A method can include generating a first platform signal to transport the work piece and the another work piece adjacent to a milling tool. A method can include closing a deflection shield to isolate the loader member from the pair of the guide members. A method can include opening a deflection shield to provide access between the loader member and a pair of the guide members, and generating a second platform signal to transport the pair of the guide members to align with feeder members that include a group of work pieces. A method can include selecting the work piece from the group of work pieces, and enabling the work piece to slide to the plane from a distance from the plane. A method can include releasing other work pieces in the group of the work pieces to slide to a selecting member. A method can include adjusting the position of an effector at approximately one-half the distance between a pair of feeder members as the distance is modified. The position of the effector is configured to engage a medial portion of the work piece. A method can include adjusting the distance between the pair of feeder members by an amount, and adjusting the position of the effector by approximately one-half the amount. A method can include receiving a rotational force to turn a screw member coupled to the feeder members and the effector. The screw member can be a double-ended screw with one set of threads at one end being reverse threaded in relation to another set of threads at the other end. A method can include generating a third platform signal to transport the work piece and the another work piece from adjacent to a milling tool to align with an ejection platform. A method can include opening a deflection shield to provide access between an ejection platform and a pair of the guide members, and activating an ejector member to extract one or more work pieces including the work piece from a linear arrangement of the guide members including the pair of the guide members. A method can include imparting an unloading force to the work piece to unload the one or more work pieces onto the ejection platform. The ejection platform is coextensive with the plane. A method can include introducing the work piece into a milling region including a vertical milling tool. The plane is substantially orthogonal to the direction of gravity as an applied force. A method can include introducing the work piece into a milling region including a horizontal milling tool. The plane is substantially parallel to the direction of gravity as an applied force. A method can include applying the applied force to the work piece using a restraining member.

In another example, a method of controlling a milling operation includes activating a loader actuator to linearly extend a loader member and an effector between a first subset of guide members to direct pressurized gas from the effector to adjacent portions of the first subset of guide members, facilitating the flow of the pressurized via a tube from a source, activating a loader actuator to linearly extend the effector between the first subset of guide members to load a work piece in a pair of guide members, and activating an ejector actuator to linearly extend a ejector member and an engagement member between the first subset of guide members to unload the work piece from the pair of guide members. A method can include activating a door actuator to open a door before either extending the loader member or the ejector member, and activating the door actuator to close the door after the work piece is loaded in the pair of guide members. A method can include calculating a distance to extend the effector to load another work piece in another pair of work pieces, and activating the loader actuator to linearly extend the effector to the distance to load the another work piece in the another pair of guide members. A method can include activating a platform moving device to align a second subset of guide members with the effector, and activating the loader actuator to linearly extend the effector to load one or more work pieces in the second subset of guide members. The second subset of guide members is arranged in parallel with the first subset of guide members. A method can include activating a select actuator to disengage the work piece from a selecting member to slide to a plane in which the effector engages the work piece, the selecting member configured to select the work piece from a subset of work pieces stored at an angle to the first and the second subsets of the guide members, and a release actuator including a release member, the release member configured to release other work pieces from the subset of the work pieces to slide to engage the select member. A method can include activating a platform moving device to move the first subset of guide members between a milling site and positions linearly adjacent to either the loader actuator or the ejector actuator. The loader actuator or the ejector actuator in a buffered region. A method can include activating a tool to mill the work piece.

The description, for purposes of explanation, uses specific nomenclature to provide a thorough understanding of the various embodiments of the invention. However, it will be apparent that specific details are not required in order to practice the invention. In fact, this description should not be read to limit any feature or aspect of to any embodiment; rather features and aspects of one example can readily be interchanged with other examples. Notably, not every benefit described herein need be realized by each example of the invention; rather any specific example may provide one or more of the advantages discussed above. In the claims, elements and/or operations do not imply any particular order of operation, unless explicitly stated in the claims. It is intended that the following claims and their equivalents define the scope of the invention.

The invention claimed is:

1. An apparatus comprising:
   a first subset of one or more guide members including one or more surfaces configured to contact a first surface of a work piece in a staging region;
   a loader actuator comprising:
      a loader member,
      an effector coupled to an end of the loader member, the loader actuator being configured to impart a linear force unto the work piece at a the first subset of one or more guide members to transport the work piece to a second subset of one or more guide members in a milling region of a horizontal milling machine,
      a path cleaner configured to remove material on at least the second subset of one or more guide members, wherein the effector includes the path cleaner, and
      a restraining member extending from the loader actuator in a direction toward the milling region, the restraining member configured to engage a second surface of the work piece to maintain the contact of portions of the first surface of the work piece to the one or more surfaces of the first subset of one or more guide members.

2. The apparatus of claim 1 wherein the restraining member is coupled to the loader member.

3. The apparatus of claim 1 wherein the first subset of one or more guide members being disposed in a plane substantially parallel to a direction of gravity.

4. The apparatus of claim 1 wherein the first subset of one or more guide members being disposed in a plane including directions of guiding forces applied to other surfaces of the work piece that substantially parallel to a direction of gravity.

5. The apparatus of claim 1 wherein the restraining member comprises:
   a resilient force-generating member configured to apply an applied force to the second surface of the work piece.

6. The apparatus of claim 1 wherein the restraining member comprises:
   a spring member.

7. The apparatus of claim 1 further comprising:
   one or more frame members configured to couple to the horizontal milling machine.

8. The apparatus of claim 1, further comprising:
   an engagement surface configured to engage a portion of the work piece to transfer the loading force from the loader member to the work piece in a second interval of time.

9. The apparatus of claim 1 further comprising:
   a centering device coupled to at least the first subset of one or more guide members and the effector, the centering device being configured to concurrently adjust the spatial positions of at least one guide member of the first subset of one or more guide members to approximate a dimension of the work piece, and align the effector to a plane passing through a medial portion of the work piece.

10. The apparatus of claim 1 further comprising:
    an alignment device configured to align the effector and at least an end of the first subset of guide members in a first plane in a first mode, and to align the effector in a second plane in a second mode.

11. The apparatus of claim 1 wherein the restraining member is coupled to the loader actuator.

12. The apparatus of claim 11 wherein the loader actuator further comprises:
   a spring bracket to which the restraining member is coupled.

13. The apparatus of claim 1 wherein the effector further comprises:
   the path cleaner configured to apply a cleaning force to contacting surfaces of one or more other guide members in a milling region disposed in a path that the work piece traverses from the staging region to the milling region in a first interval of time.

14. The apparatus of claim 13, wherein the path cleaner is further configured to apply cleaning elements to the contacting surfaces.

15. The apparatus of claim 14 wherein the cleaning elements comprise:
   one or more of a solid, a liquid, or a gas.

16. The apparatus of claim 14 wherein the cleaning elements comprise:
   one or more brushes.

17. A method comprising:
   applying a cleaning force during a first interval of interval to portions of contacting surfaces of a subset of one or more guide members disposed in a milling region, the portions of the contacting surfaces configured to contact a first surface of a work piece, the cleaning force originating within subset of one or more guide members, wherein applying the cleaning force including:
      moving an effector in synchronicity with a loader member, and
      directing cleaning elements from the effector to the portions of the contacting surfaces;
   implementing a loader member to displace the work piece linearly during a second interval of time in a plane, which includes the contacting surfaces of the guide members, from another subset of one or more guide members in a staging region; and
   applying an applied force to the work piece via a restraining member that engages a second surface of the work piece to maintain contact of the portions of the contacting surfaces to the first surface of the work piece as the work piece is displaced from the staging region to the milling region.

18. The method of claim 17 wherein the milling region includes a horizontal milling tool.

19. The method of claim 17 wherein the plane is substantially parallel to the direction of gravity.

* * * * *